(12) United States Patent
Parker et al.

(10) Patent No.: US 11,072,731 B2
(45) Date of Patent: Jul. 27, 2021

(54) PROTEIN-CONTAINING ADHESIVES, AND MANUFACTURE AND USE THEREOF

(71) Applicant: Evertree, Venette (FR)

(72) Inventors: Anthony A. Parker, Newtown, PA (US); Joseph J. Marcinko, West Deptford, NJ (US)

(73) Assignee: Evertree, Venette (FR)

( * ) Notice: Subject to any disclaimer, the term of this patent is extended or adjusted under 35 U.S.C. 154(b) by 0 days.

(21) Appl. No.: 16/152,620

(22) Filed: Oct. 5, 2018

(65) Prior Publication Data

US 2019/0048239 A1 Feb. 14, 2019

Related U.S. Application Data

(60) Division of application No. 14/964,856, filed on Dec. 10, 2015, now Pat. No. 10,125,295, which is a continuation of application No. 13/606,470, filed on Sep. 7, 2012, now abandoned.

(60) Provisional application No. 61/532,832, filed on Sep. 9, 2011, provisional application No. 61/567,769, filed on Dec. 7, 2011.

(51) Int. Cl.
| | |
|---|---|
| *C09J 189/00* | (2006.01) |
| *B32B 21/14* | (2006.01) |
| *B32B 7/12* | (2006.01) |
| *B32B 21/13* | (2006.01) |
| *C09J 197/00* | (2006.01) |
| *C08L 89/00* | (2006.01) |
| *C08L 97/00* | (2006.01) |
| *B32B 37/06* | (2006.01) |
| *B32B 37/10* | (2006.01) |
| *B32B 37/12* | (2006.01) |

(52) U.S. Cl.
CPC .............. *C09J 189/00* (2013.01); *B32B 7/12* (2013.01); *B32B 21/13* (2013.01); *B32B 21/14* (2013.01); *B32B 37/06* (2013.01); *B32B 37/10* (2013.01); *B32B 37/12* (2013.01); *C08L 89/00* (2013.01); *C08L 97/005* (2013.01); *C09J 197/005* (2013.01); *B32B 2305/72* (2013.01); *Y10T 428/24066* (2015.01); *Y10T 428/31623* (2015.04); *Y10T 428/31768* (2015.04); *Y10T 428/31772* (2015.04)

(58) Field of Classification Search
CPC .......... C09J 189/00; C08L 89/00; B32B 7/12; B32B 21/13; B32B 21/14; B32B 37/06; B32B 37/10; B32B 37/12
See application file for complete search history.

(56) References Cited

U.S. PATENT DOCUMENTS

| | | | |
|---|---|---|---|
| 1,460,757 A | 7/1923 | Johnson et al. | |
| 1,892,486 A * | 12/1932 | Dunham | ............ C09J 189/005 |
| | | | 106/126.2 |
| 2,271,620 A | 2/1942 | Brier et al. | |
| 2,323,357 A | 7/1943 | Rosenblum | |
| 2,381,407 A | 8/1945 | Levinson et al. | |
| 2,431,256 A | 11/1947 | Keil et al. | |
| 2,727,869 A | 12/1955 | Ash et al. | |
| 2,810,657 A * | 10/1957 | Preusser | ................ C09J 189/00 |
| | | | 106/134.1 |
| 2,881,076 A | 4/1959 | Sair | |
| 3,017,303 A * | 1/1962 | Ayers | ..................... C09J 163/00 |
| | | | 428/529 |
| 3,053,784 A | 9/1962 | Herrick et al. | |
| 3,075,930 A | 1/1963 | Stewart et al. | |
| 3,258,436 A | 6/1966 | Stephens | |
| 3,441,528 A | 4/1969 | Dede, Jr. | |
| 3,450,651 A | 6/1969 | Carstensen | |
| 3,489,633 A | 1/1970 | Holmquist | |
| 3,507,662 A | 4/1970 | Leroy et al. | |
| 3,629,162 A | 12/1971 | Richardson et al. | |
| 3,642,490 A | 2/1972 | Hawley et al. | |
| 3,658,731 A | 4/1972 | Richardson et al. | |
| 3,689,288 A | 9/1972 | Duren | |
| 3,694,221 A | 9/1972 | Hoer | |
| 3,764,309 A | 10/1973 | Tamai et al. | |
| 3,805,532 A | 4/1974 | Kistner | |
| 3,814,823 A | 6/1974 | Yang | |
| 3,821,443 A | 6/1974 | Halladay | |
| 3,897,581 A | 7/1975 | Nakatsuka et al. | |
| 3,931,088 A | 1/1976 | Sakurada et al. | |
| 3,965,051 A | 6/1976 | Markusch et al. | |

(Continued)

FOREIGN PATENT DOCUMENTS

| | | |
|---|---|---|
| CN | 001418562 A | 5/2003 |
| CN | 001698453 A | 11/2005 |

(Continued)

OTHER PUBLICATIONS

Glen E. Babcock & Allan K. Smith, "Extending Phenolic Resin Plywood Glues with Proteinaceous Materials," Industrial and Engineering Chemistry, Jan. 1947, at 85.*
Bodo Saake & Ralph Lehnen, "Lignin," in 21 Ullmann's Encyclopedia of Industrial Chemistry 21, published online Jul. 15, 2007.*
Ruptal Mehta, "Stick Together—Protein-Based Adhesives," Wood Focus Magazine, Aug. 27, 2010, published online at http://www.iom3.org/print/32104.*
I. Yang et al., "Development of Adhesive for Plywood Formulated with Alkaline Hydrolyzate of Rapeseed Flour," 38 Mokchae Konghak (Wood Engineering) 323, Jul. 2010.*
English-language translation of I. Yang et al., "Development of Adhesive for Plywood Formulated with Alkaline Hydrolyzate of Rapeseed Flour," 38 Mokchae Konghak (Wood Engineering) 323, Jul. 2010.*

(Continued)

*Primary Examiner* — Nicholas E Hill
(74) *Attorney, Agent, or Firm* — Dechert LLP

(57) ABSTRACT

The invention provides protein adhesives and methods of making and using such adhesives. One type of protein adhesive described herein contains lignin and ground plant meal or an isolated polypeptide composition obtained from plant biomass. Other types of protein adhesives described herein contain a plant protein composition and either a hydroxyaromatic/aldehyde, urea/aldehyde, or amine/aldehyde component.

15 Claims, 22 Drawing Sheets

(56) References Cited

U.S. PATENT DOCUMENTS

| | | |
|---|---|---|
| 3,965,056 A | 6/1976 | Stout et al. |
| 3,966,658 A | 6/1976 | Robitschek et al. |
| 3,966,971 A | 6/1976 | Morehouse et al. |
| 3,981,831 A | 9/1976 | Markusch et al. |
| 3,983,081 A | 9/1976 | Dieterich et al. |
| 4,052,347 A | 10/1977 | Dieterich et al. |
| 4,097,422 A | 6/1978 | Markusch |
| 4,097,423 A | 6/1978 | Dieterich |
| 4,098,645 A | 7/1978 | Hartdegen et al. |
| 4,105,594 A | 8/1978 | Dieterich et al. |
| 4,109,057 A | 8/1978 | Nakamura et al. |
| 4,129,696 A | 12/1978 | Markusch et al. |
| 4,144,205 A | 3/1979 | Hartman et al. |
| 4,153,764 A | 5/1979 | Blount |
| 4,170,697 A | 10/1979 | Blount |
| 4,185,147 A | 1/1980 | Blount |
| 4,211,795 A | 7/1980 | Leroy et al. |
| 4,211,848 A | 7/1980 | Blount |
| 4,220,757 A | 9/1980 | Blount |
| 4,226,982 A | 10/1980 | Blount |
| 4,241,194 A | 12/1980 | Blount |
| 4,243,757 A | 1/1981 | Blount |
| 4,246,360 A | 1/1981 | Brown et al. |
| 4,247,657 A | 1/1981 | Blount |
| 4,251,638 A | 2/1981 | Reischl |
| 4,283,311 A | 8/1981 | Blount |
| 4,293,456 A | 10/1981 | Reischl |
| 4,316,745 A | 2/1982 | Blount |
| 4,320,208 A | 3/1982 | Reischl et al. |
| 4,322,364 A | 3/1982 | Hughes et al. |
| 4,327,195 A | 4/1982 | Cioca et al. |
| 4,336,340 A | 6/1982 | Blount |
| 4,339,366 A | 7/1982 | Blount |
| 4,367,326 A | 1/1983 | Blount |
| 4,376,173 A | 3/1983 | Blount |
| 4,377,646 A | 3/1983 | Blount |
| 4,377,659 A | 3/1983 | Blount |
| 4,377,674 A | 3/1983 | Blount |
| 4,380,592 A | 4/1983 | Blount |
| 4,382,136 A | 5/1983 | Blount |
| 4,383,049 A | 5/1983 | Blount |
| 4,383,089 A | 5/1983 | Blount |
| 4,390,450 A | 6/1983 | Gibson et al. |
| RE31,340 E | 8/1983 | Blount |
| 4,451,638 A | 5/1984 | Blount |
| 4,478,938 A | 10/1984 | Freedman |
| 4,497,862 A | 2/1985 | Cioca et al. |
| 4,528,154 A | 7/1985 | Nguyen et al. |
| 4,609,690 A | 9/1986 | Gruber et al. |
| RE32,476 E | 8/1987 | Kistner |
| 4,689,381 A | 8/1987 | Krinski et al. |
| 4,711,911 A | 12/1987 | Blount |
| 4,795,655 A | 1/1989 | Spiel et al. |
| 5,015,677 A | 5/1991 | Benedict et al. |
| 5,035,902 A | 7/1991 | Bilinski et al. |
| 5,072,039 A | 12/1991 | Worsley |
| 5,130,404 A | 7/1992 | Freeland |
| 5,133,991 A | 7/1992 | Norman et al. |
| 5,273,773 A | 12/1993 | Katayama et al. |
| 5,348,760 A | 9/1994 | Parker et al. |
| 5,366,550 A | 11/1994 | Schad |
| 5,506,285 A | 4/1996 | Timm et al. |
| 5,523,293 A | 6/1996 | Jane et al. |
| 5,607,633 A | 3/1997 | Sleeter et al. |
| 5,648,420 A | 7/1997 | Fujiwara et al. |
| 5,656,689 A | 8/1997 | Fujiwara et al. |
| 5,681,505 A | 10/1997 | Phillips et al. |
| 5,703,157 A | 12/1997 | Fujiwara et al. |
| 5,710,190 A | 1/1998 | Jane et al. |
| 5,719,301 A | 2/1998 | Sleeter |
| 5,756,450 A | 5/1998 | Hahn et al. |
| 5,766,331 A | 6/1998 | Krinski et al. |
| 5,962,541 A | 10/1999 | Peterson et al. |
| 5,968,995 A | 10/1999 | Rizk et al. |
| 6,033,654 A | 3/2000 | Stedronsky et al. |
| 6,080,405 A | 6/2000 | Ishibashi et al. |
| 6,176,891 B1 | 1/2001 | Komoriya et al. |
| 6,194,512 B1 | 2/2001 | Chen et al. |
| 6,231,985 B1 | 5/2001 | Chen et al. |
| 6,284,838 B1* | 9/2001 | Silbiger .......... C08L 89/00 524/13 |
| 6,291,559 B1 | 9/2001 | Krinski et al. |
| 6,306,997 B1 | 10/2001 | Kuo et al. |
| 6,335,043 B1 | 1/2002 | Jiang et al. |
| 6,352,661 B1 | 3/2002 | Thompson et al. |
| 6,365,650 B1 | 4/2002 | Chen et al. |
| 6,420,443 B1 | 7/2002 | Clark et al. |
| 6,465,569 B1 | 10/2002 | Kurth |
| 6,489,391 B1 | 12/2002 | Schilling et al. |
| 6,495,056 B2 | 12/2002 | Kubo et al. |
| 6,497,760 B2 | 12/2002 | Sun et al. |
| 6,518,387 B2 | 2/2003 | Kuo et al. |
| 6,649,667 B2 | 11/2003 | Clatty |
| 6,730,299 B1 | 5/2004 | Tayot et al. |
| 6,797,318 B2 | 9/2004 | Takeuchi et al. |
| 6,841,101 B2 | 1/2005 | Nakos et al. |
| 6,852,407 B2 | 2/2005 | Yasue |
| 6,866,880 B2 | 3/2005 | Bhattacharya et al. |
| 6,884,756 B2 | 4/2005 | Lynch et al. |
| 6,893,579 B2 | 5/2005 | Espiard et al. |
| 7,049,269 B2 | 5/2006 | Hara |
| 7,060,798 B2 | 6/2006 | Li et al. |
| 7,071,248 B2 | 7/2006 | Chen et al. |
| 7,081,159 B2 | 7/2006 | Thames et al. |
| 7,153,812 B2 | 12/2006 | Hara |
| 7,175,701 B2 | 2/2007 | Oyasato et al. |
| 7,226,615 B2 | 6/2007 | Yuksel et al. |
| 7,252,735 B2 | 8/2007 | Li |
| 7,253,244 B2 | 8/2007 | Gruenewaelder et al. |
| 7,265,169 B2 | 9/2007 | Li et al. |
| 7,285,583 B2 | 10/2007 | Stumphauzer et al. |
| 7,345,136 B2 | 3/2008 | Wescott et al. |
| 7,387,795 B2 | 6/2008 | Hollenberg et al. |
| 7,393,930 B2 | 7/2008 | Li et al. |
| 7,410,744 B2 | 8/2008 | Watanabe et al. |
| 7,416,598 B2 | 8/2008 | Sun et al. |
| 7,625,441 B2 | 12/2009 | Gagnon et al. |
| 7,704,537 B2 | 4/2010 | Lopez et al. |
| 7,722,712 B2* | 5/2010 | Li .......... B32B 21/14 106/126.2 |
| 7,736,559 B2 | 6/2010 | Rivers et al. |
| 7,772,313 B2 | 8/2010 | Stumphauzer et al. |
| 7,781,501 B2 | 8/2010 | Dopico et al. |
| 7,785,440 B2 | 8/2010 | Li |
| 7,789,932 B2 | 9/2010 | Anderson et al. |
| 7,803,855 B2 | 9/2010 | Kintzley et al. |
| 8,057,892 B2 | 11/2011 | Yang et al. |
| 8,147,968 B2 | 4/2012 | Brady et al. |
| 8,378,010 B2 | 2/2013 | Browning et al. |
| 8,399,544 B2 | 3/2013 | Varnell et al. |
| 8,465,581 B2 | 6/2013 | Wescott et al. |
| 8,519,031 B2 | 8/2013 | Parker et al. |
| 8,623,931 B2 | 1/2014 | Parker et al. |
| 8,916,668 B2 | 12/2014 | Parker et al. |
| 9,309,444 B2 | 4/2016 | Parker et al. |
| 9,416,303 B2 | 8/2016 | Parker et al. |
| 9,816,019 B2 | 11/2017 | Parker et al. |
| 9,909,044 B2 | 3/2018 | Parker et al. |
| 10,125,295 B2 | 11/2018 | Parker et al. |
| 10,160,842 B2 | 12/2018 | Parker et al. |
| 10,465,103 B2 | 11/2019 | Parker et al. |
| 10,526,516 B2 | 1/2020 | Parker et al. |
| 2001/0048934 A1 | 12/2001 | Reust |
| 2002/0005251 A1 | 1/2002 | Sun et al. |
| 2002/0010233 A1 | 1/2002 | Yasue |
| 2003/0059607 A1 | 3/2003 | Schumann et al. |
| 2003/0085012 A1 | 5/2003 | Jones et al. |
| 2003/0148084 A1 | 8/2003 | Trocino |
| 2003/0203136 A1 | 10/2003 | Takeuchi |
| 2003/0212227 A1 | 11/2003 | Stroobants et al. |
| 2003/0219615 A1 | 11/2003 | Kikuchi et al. |
| 2003/0224179 A1 | 12/2003 | Skinner et al. |
| 2004/0007156 A1 | 1/2004 | Thames et al. |
| 2004/0025657 A1 | 2/2004 | Hosoi et al. |

(56) References Cited

U.S. PATENT DOCUMENTS

| | | |
|---|---|---|
| 2004/0170670 A1 | 9/2004 | Smith et al. |
| 2005/0070635 A1 | 3/2005 | Breyer et al. |
| 2005/0113257 A1 | 5/2005 | Lynch et al. |
| 2005/0165220 A1 | 7/2005 | Barker et al. |
| 2005/0166796 A1* | 8/2005 | Sun ................. C09J 189/00 106/140.1 |
| 2005/0222358 A1 | 10/2005 | Wescott et al. |
| 2005/0234156 A1* | 10/2005 | Thames ................. B27N 3/002 524/19 |
| 2005/0250900 A1 | 11/2005 | Stofko |
| 2005/0257905 A1 | 11/2005 | Shoseyov |
| 2005/0272892 A1 | 12/2005 | Hse et al. |
| 2005/0277733 A1 | 12/2005 | Wescott et al. |
| 2005/0282988 A1 | 12/2005 | Li |
| 2006/0116288 A1 | 6/2006 | Mori et al. |
| 2006/0135368 A1 | 6/2006 | Anderson et al. |
| 2006/0156954 A1 | 7/2006 | Li et al. |
| 2006/0194010 A1 | 8/2006 | Hiscock |
| 2006/0231968 A1 | 10/2006 | Cowan et al. |
| 2006/0292205 A1 | 12/2006 | Robinson |
| 2007/0020476 A1 | 1/2007 | Kintzley et al. |
| 2007/0128542 A1 | 6/2007 | Watanabe et al. |
| 2007/0148339 A1 | 6/2007 | Wescott et al. |
| 2007/0180877 A1 | 8/2007 | Anderson et al. |
| 2007/0244300 A1 | 10/2007 | Schweizer et al. |
| 2007/0281145 A1 | 12/2007 | Khabbaz |
| 2008/0021187 A1 | 1/2008 | Wescott et al. |
| 2008/0027159 A1 | 1/2008 | Rivers et al. |
| 2008/0050602 A1 | 2/2008 | Spraul et al. |
| 2008/0063759 A1 | 3/2008 | Raymond et al. |
| 2008/0063760 A1 | 3/2008 | Raymond et al. |
| 2008/0064852 A1 | 3/2008 | Ddamulira et al. |
| 2008/0095914 A1 | 4/2008 | Deak et al. |
| 2008/0125577 A1 | 5/2008 | Gosnell et al. |
| 2008/0213597 A1 | 9/2008 | Li |
| 2008/0234458 A1 | 9/2008 | West |
| 2008/0255333 A1 | 10/2008 | Trocino |
| 2008/0281069 A1 | 11/2008 | Jennissen |
| 2008/0287635 A1 | 11/2008 | Sun et al. |
| 2008/0292886 A1 | 11/2008 | Allen et al. |
| 2009/0013482 A1 | 1/2009 | Kennedy |
| 2009/0013743 A1 | 1/2009 | Lynch et al. |
| 2009/0081468 A1 | 3/2009 | Mortensen |
| 2009/0098387 A1 | 4/2009 | Brady et al. |
| 2009/0197036 A1 | 8/2009 | Hwang et al. |
| 2009/0209727 A1 | 8/2009 | Barbier et al. |
| 2010/0048875 A1 | 2/2010 | Segall et al. |
| 2010/0063255 A1 | 3/2010 | Logie et al. |
| 2010/0069533 A1 | 3/2010 | Brady et al. |
| 2010/0069534 A1 | 3/2010 | Wescott et al. |
| 2010/0093896 A1 | 4/2010 | Spraul et al. |
| 2010/0240805 A1 | 9/2010 | Miller et al. |
| 2010/0258033 A1 | 10/2010 | Yang et al. |
| 2010/0285295 A1 | 11/2010 | Wang et al. |
| 2010/0305227 A1 | 12/2010 | Parker et al. |
| 2010/0310877 A1 | 12/2010 | Parker et al. |
| 2011/0048280 A1 | 3/2011 | Wescott et al. |
| 2011/0132551 A1 | 6/2011 | Klapdohr et al. |
| 2011/0293934 A1 | 12/2011 | Allen et al. |
| 2011/0311833 A1 | 12/2011 | Parker et al. |
| 2012/0115992 A1 | 5/2012 | Khabbaz et al. |
| 2012/0183794 A1 | 7/2012 | Guo et al. |
| 2013/0065012 A1 | 3/2013 | Parker et al. |
| 2013/0131231 A1 | 5/2013 | Bouguettaya et al. |
| 2013/0224482 A1 | 8/2013 | Brady et al. |
| 2013/0252007 A1 | 9/2013 | Khabbaz |
| 2014/0178695 A1 | 6/2014 | Parker et al. |
| 2014/0235737 A1 | 8/2014 | Parker et al. |
| 2015/0044483 A1 | 2/2015 | Parker et al. |
| 2015/0203730 A1 | 7/2015 | Parker et al. |
| 2015/0267095 A1 | 9/2015 | Parker et al. |
| 2016/0230057 A1 | 8/2016 | Parker et al. |
| 2016/0298012 A1 | 10/2016 | Parker et al. |
| 2016/0304688 A1 | 10/2016 | Parker et al. |
| 2017/0066952 A1 | 3/2017 | Parker et al. |
| 2018/0134934 A1 | 5/2018 | Parker et al. |
| 2018/0208817 A1 | 7/2018 | Parker et al. |
| 2018/0298255 A1 | 10/2018 | Parker et al. |
| 2019/0092988 A1 | 3/2019 | Parker et al. |
| 2020/0079983 A1 | 3/2020 | Parker et al. |

FOREIGN PATENT DOCUMENTS

| | | | |
|---|---|---|---|
| CN | 101130678 A | 2/2008 | |
| EP | 0161043 A2 | 11/1985 | |
| EP | 0973640 A1 | 1/2000 | |
| EP | 1268702 A2 | 1/2003 | |
| EP | 1268702 B1 | 1/2003 | |
| EP | 1588628 A1 | 10/2005 | |
| EP | 1742542 A2 | 1/2007 | |
| EP | 0973640 B1 | 9/2007 | |
| EP | 1900642 A1 | 3/2008 | |
| EP | 1900650 A1 | 3/2008 | |
| EP | 2046880 A1 | 4/2009 | |
| EP | 1268702 B2 | 9/2009 | |
| EP | 2163590 A1 | 3/2010 | |
| EP | 2236578 A1 | 10/2010 | |
| EP | 1742542 B1 | 1/2011 | |
| GB | 0480097 A | 2/1938 | |
| GB | 1065015 A | 4/1967 | |
| GB | 2001331 A | 1/1979 | |
| JP | 51-73097 | 6/1976 | |
| JP | S61217 A | 1/1986 | |
| JP | S61233 A | 1/1986 | |
| JP | H04-502416 A | 5/1992 | |
| JP | H04214475 A | 8/1992 | |
| JP | H05-507925 A | 11/1993 | |
| JP | 2002-249987 A | 9/2002 | |
| RU | 2252238 C1 | 5/2005 | |
| RU | 2325419 C1 | 5/2008 | |
| SU | 064311 A1 | 11/1944 | |
| SU | 192330 A | 11/1967 | |
| WO | WO-1990006094 A1 | 6/1990 | |
| WO | WO-1991019470 A1 | 12/1991 | |
| WO | WO-1993019125 A1 | 9/1993 | |
| WO | WO-1998043813 A1 | 10/1998 | |
| WO | WO-2001059026 A2 | 8/2001 | |
| WO | WO-2002062866 A1 | 8/2002 | |
| WO | WO-2003075673 A1 | 9/2003 | |
| WO | WO-2005035665 A1 | 4/2005 | |
| WO | WO-2005072260 A2 | 8/2005 | |
| WO | WO-2005099477 A2 | 10/2005 | |
| WO | WO-2005100451 A2 | 10/2005 | |
| WO | WO-2005113700 A1 | 12/2005 | |
| WO | WO-2006041469 A1 | 4/2006 | |
| WO | WO-2006112672 A1 | 10/2006 | |
| WO | WO-2006132785 A2 | 12/2006 | |
| WO | WO-2007008385 A1 | 1/2007 | |
| WO | WO-2007033481 A1 | 3/2007 | |
| WO | WO-2007064970 A1 | 6/2007 | |
| WO | WO-2007086632 A1 | 8/2007 | |
| WO | WO-2008011455 A1 | 1/2008 | |
| WO | WO-2008024444 A2 * | 2/2008 | ............ C08L 97/005 |
| WO | WO-2008118741 A1 | 10/2008 | |
| WO | WO-2009013482 A2 | 1/2009 | |
| WO | WO-2009048598 A1 | 4/2009 | |
| WO | WO-2009086141 A2 | 7/2009 | |
| WO | WO-2010031165 A1 | 3/2010 | |
| WO | WO-2010065758 A2 | 6/2010 | |
| WO | WO-2010102284 A2 | 9/2010 | |
| WO | WO-2010102297 A2 | 9/2010 | |
| WO | WO-2010120356 A1 | 10/2010 | |
| WO | WO-2011025911 A1 | 3/2011 | |
| WO | WO-2011097364 A1 | 8/2011 | |
| WO | WO-2011150203 A2 | 12/2011 | |
| WO | WO-2011156380 A2 | 12/2011 | |
| WO | WO-2012076566 A2 | 6/2012 | |

(56) References Cited

FOREIGN PATENT DOCUMENTS

| WO | WO-2013036739 A1 | 3/2013 |
|----|------------------|--------|
| WO | WO-2013036774 A1 | 3/2013 |

OTHER PUBLICATIONS

U.S. Appl. No. 15/883,263, Protein-Containing Emulsions and Adhesives, and Manufacture and Use Thereof, filed Jan. 30, 2018.
U.S. Appl. No. 15/076,861, Protein-Containing Foams, Manufacture and Use Thereof, filed Mar. 22, 2016.
U.S. Appl. No. 15/711,272, Protein-Containing Adhesives, and Manufacture and Use Thereof, filed Sep. 21, 2017.
U.S. Appl. No. 14/343,521, Protein-Containing Adhesives, and Manufacture and Use Thereof, filed Aug. 22, 2014.
U.S. Appl. No. 16/129,496, Protein-Containing Adhesives, and Manufacture and Use Thereof, filed Sep. 12, 2018.
U.S. Appl. No. 14/964,856, Protein-Containing Adhesives, and Manufacture and Use Thereof, filed Dec. 10, 2015.
U.S. Appl. No. 15/844,983, Protein Adhesives Containing an Anhydride, Caboxylic Acid, and/or Carboxylate Salt Compound and Their Use, filed Dec. 18, 2017.
Chinese Office Action dated Oct. 10, 2013 for Chinese Patent Application No. 201080019599.3 (14 pages).
Deanin et al., "Synthetic Resins and Plastics," *Handbook of Industrial Chemistry and Biotechnology*, (11$^{th}$ Ed, 2007), JA Kent (Ed), Springer Publishing Co. US, New York, NY (Publ), pp. 607-9.
English Language Translation of CN1418562 (2003) (3 pages).
English Language Translation of Japanese Patent No. JP2002249987 (2002) (24 pages).
English Language Translation of the Abstract of CN1698453 (2005) (1 page).
International Preliminary Report on Patentability and Written Opinion for International Application No. PCT/US2010/026526, dated Sep. 6, 2011. (11 pages).
International Preliminary Report on Patentability and Written Opinion for International Application No. PCT/US2010/026553, dated Sep. 6, 2011. (7 pages).
International Search Report and Written Opinion for International Application No. PCT/IB2013/02188 dated Mar. 19, 2014 (8 pages).
Pizzi, (2006), "Recent Developments in Eco-Efficient Bio-Based Adhesives for Wood Bonding: Opportunities and Issues," J Adhes Sci Technol, 20(8):829-46.
Kent et al., "Handbook of Industrial Chemistry and Biotechnology," Eleventh Edition, vol. 1, pp. 607-609 (2007).
Nanofil product literature downloaded on Apr. 16, 2017 from http://zeus.plmsc.psu.edu/~manias/news/sud-chemie_nanofil_flier.pdf.
Osman et al. "Polyurethane Adhesive Nanocomposites as Gas Permeation Barrier," *Macromolecules* (2003) vol. 36, No. 26, pp. 9851-9858.
Yang, In, et al. "Development of adhesive resins formulated with rapeseed flour akali hydrolyzates for plywood panels," *Journal of the Korean Wood Science and Technology* 38.4 (2010): 323-332 (Jul. 2010).
English-language translation of Yang, In, et al. "Development of adhesive resins formulated with rapeseed flour akali hydrolyzates for plywood panels," *Journal of the Korean Wood Science and Technology* 38.4 (2010): 323-332 (Jul. 2010). (Translation is 31 pages).
Particle Size Conversion Table, http://www.sigmaaldrich.com/chemistry/stockroom-reagents/learning-center/technical-library/particle-size-conversion.html, downloaded on Jun. 22, 2017.
Allen et al. (2010) "Investigations of the Molecular Interactions of Soy-Based Adhesives," Forest Products Journal 60(6):534-540.
Derwent abstract of JPH04214475A (published 1992) (2 pages).
Hettiarachchy et al. (1995) "Alkali-Modified Soy Protein with Improved Adhesive and Hydrophobic Properties," *J. Am. Oil Chem. Soc.* 72(12):1461-1464.
Hettiarachchy et al. (1996) "Preparation and Functional Properties of a Protein Isolate from Defatted Wheat Germ," Cereal Chem. 73(3):364-367.
International Search Report of International Patent Application No. PCT/US2010/026526, dated Mar. 15, 2011 (6 pages).
International Search Report of International Patent Application No. PCT/US2010/026553, dated Nov. 16, 2010 (4 pages).
Javni et al. (2003) "Effect of Different Isocyanates on the Properties of Soy-Based Polyurethanes," Journal of Applied Polymer Science 88:2912-2916.
Kretschmer et al. (1957) "Infrared Spectroscopy and Optical Rotatory Dispersion of Zein, Wheat Gluten and Gliadin," *J. Phys. Chem.* 61:1627-1631.
Kumar et al. (2002) "Adhesives and plastics based on soy protein products," Industrial Crops and Products 16:155-172.
Lambuth, A.L., Soybean Glues, in *Handbook of Adhesives*, 2nd ed., Van Nostrand Reinhold, New York, 1977, pp. 172-180.
Lin et al. (1996) "Physical, Mechanical and Thermal Properties of Water-Blown Rigid Polyurethane Foam Containing Soy Protein Isolate," Cereal Chem 73(2):189-196.
Lin et al. (1997) "Water-Blown Flexible Polyurethane Foam Extended with Biomass Materials," Journal of Applied Polymer Science 65(4):695-703.
Mo et al. (1999) "Effects of Molding Temperature and Pressure on Properties of Soy Protein Polymers," Journal of Applied Polymer Science 73:2595-2602.
Park et al. (1999) "Physical and Mechanical Properties of Soy Protein-Based Plastic Foams," *J. Am. Oil Chem. Soc.* 76:1201-1205.
Shih (1994) "Interaction of Soy Isolate with Polysaccharide and Its Effect on Film Properties," *J. Am. Oil Chem. Soc.* 71(11):1281-1285.
Swain et al. (2005) "Biodegradable Polymers. Part II. Thermal degradation of biodegradable plastics cross-linked from formaldehyde-soy protein concentrate," J. Therm. Anal. Cal. 79:33-38.
Wang et al. (2007) "Soy Protein Adhesion Enhanced by Glutaraldehyde Crosslink," Journal of Applied Polymer Science 104:130-136.
Wang et al. (2009) "Improved Water Resistance of Soy Protein Adhesive at Isoelectric Point," Transactions of the ASABE 52(1):173-177.
Weimer et al. "Wood adhesives prepared from lucerne fiber fermentation residues of *Ruminococcus albus* and *Clostridium thermocellum*," *Appl. Microbiol. Biotechnol.*, vol. 66, pp. 635-640, 2005.
Wu et al. (2001) "Effects of the Molecular Weight on the Properties of Thermoplastics Prepared from Soy Protein Isolate," Journal of Applied Polymer Science 82:3373-3380.
Zhang et al. (2003) "Ways of Strengthening Biodegradable Soy-Dreg Plastics," Journal of Applied Polymer Science 88:422-427.
Zhong et al. (2001) "Properties of soy protein isolate/polycaprolactone blends compatibilized by methylene diphenyl diisocyanate," Polymer 42:6961-6969.
Zhong et al. (2007) "Isoelectric pH of Polyamide-Epichlorohydrin Modified Soy Protein Improved Water Resistance and Adhesion Properties," Journal of Applied Polymer Science 103:2261-2270.
International Preliminary Report on Patentability and Written Opinion of the International Searching Authority of International Patent Application No. PCT/US2011/039453, dated Dec. 10, 2012 (11 pages).
International Search Report and Written Opinion dated Feb. 5, 2013 for International Application No. PCT/US12/54116, International Filing Date Sep. 7, 2012 (9 pages).
International Search Report and Written Opinion dated Feb. 7, 2012 for International Application No. PCT/US2011/039453, International Filing Date Jun. 7, 2011 (20 pages).
International Search Report and Written Opinion dated Nov. 26, 2012 for International Application No. PCT/US12/54124, International Filing Date Sep. 7, 2012 (9 pages).
Lorenz et al., "Analysis of Soy Flour/Phenol-Formaldehyde Adhesives for Bonding Wood", Wood Adhesives Convention 2005, San Diego, CA, Nov. 2-4, 2005: Technical Forum (Poster) Session, p. 501-505, Forest Products Society, Peachtree, GA (Publ).
Mehta, "Proteins Extracted from Oilseed Rape (Canola), Soy or Castor Meals Using a New Technique are Yielding Formaldehyde-free Structural Adhesives Suitable for Use in Wood Composites, Say

(56) References Cited

OTHER PUBLICATIONS

Scientists at Advanced Biopolymer Technologies, in Mantua, USA", Wood Focus Magazine, p. 1-4, (2010).

Paulson et al., "Emulsification Properties of Succinylated Canola Protein Isolate", Journal of Food Science, vol. 53, No. 3, p. 817-820, (1988).

Paulson et al., "Functionality of Modified Plant Proteins in Model Food Systems", J. Inst. Can. Sci. Technol. Aliment., vol. 17, No. 4, p. 202-208, (1984).

Wescott et al., "Durable Soy-Based Adhesive Dispersions", Wood Adhesives Convention 2005, San Diego, CA, Nov. 2-4, 2005: Session 3A—Bio-Based Adhesives, p. 263-269, Forest Products Society, Peachtree, GA (Publ).

Willis, S. in "The Use of Soybean Meal and Full Fat Soybean Meal by the Animal Feed Industry"; 12 Australian Soybean Conference; Year 2003.

Gothwal, R. K. et al., "Synthesis of low cost adhesives from pulp & paper industry waste", J. Scientific and Industrial Research, vol. 69, p. 390-395, (2010).

\* cited by examiner

PROTEIN-CONTAINING ADHESIVES, AND MANUFACTURE AND USE THEREOF

RELATED APPLICATIONS

This application is a divisional of U.S. patent application Ser. No. 14/964,856, filed Dec. 10, 2015, which is a continuation of U.S. patent application Ser. No. 13/606,470, filed Sep. 7, 2012, which claims the benefit of and priority to U.S. Provisional Patent Application Ser. No. 61/532,832, filed Sep. 9, 2011, and to U.S. Provisional Patent Application Ser. No. 61/567,769, filed Dec. 7, 2011, the contents of each of which are hereby incorporated by reference in their entirety.

FIELD OF THE INVENTION

The invention relates to protein adhesives, and to methods of making and using such adhesives. The protein adhesives contain ground plant meal or an isolated polypeptide composition obtained from plant biomass, and are useful in the preparation of various wood products.

BACKGROUND

Adhesive compositions are used extensively in the wood products industry to make composites such as chipboard, fiberboard, and related composite wood products. Adhesive compositions are also used to make engineered lumber composites. Recent environmental concerns emphasize the need for adhesive compositions that are environmentally friendly. Adhesive compositions frequently used in the wood products industry, however, are not environmentally friendly. Thus, the need exists for adhesive compositions that reduce the need for petroleum feedstock, minimize use of toxic chemicals, and are amenable to the cure conditions and performance requirements for wood products.

In response to the need for environmentally friendly adhesive compositions, there has been renewed interest in using certain soy products to form adhesive compositions. However, there are multiple challenges in developing an adhesive composition from soy products. For example, the adhesive composition when cured to form a binder must have sufficient bond strength. The adhesive composition when cured to form a binder should, for certain applications, be sufficiently resistant to moisture. Another challenge is that the adhesive composition must have sufficient pot life so that it does not cure before being applied to components in the wood product. It is also important that the soy product be capable of production on large scale at economically feasible terms, and that it is amenable to cure conditions used to form the wood product.

Various reports describe efforts at developing an adhesive composition using certain soy products. U.S. Patent Application publication 2008/0021187 describes an adhesive composition containing urea-denatured soy flour. U.S. Pat. No. 7,416,598 describes an adhesive composition containing a protein ingredient and a modifying ingredient. Zhong and coworkers describe an adhesive composition containing certain soy protein material that has been modified. Zhong et al. in *J. Appl. Polym. Sci.* (2007) 103: 2261-2270. Yet, despite these efforts, the need exists for an environmentally friendly adhesive composition that meets the demands for widespread industrial application in the wood products industry.

The present invention addresses this need, and provides other related advantages.

SUMMARY OF THE INVENTION

The invention provides protein adhesive compositions, methods of making and using such adhesives, and articles prepared using such adhesives. The protein adhesive compositions contain a plant protein composition, such as ground plant meal or an isolated polypeptide composition obtained from plant biomass. The adhesive compositions also contain, for example, a lignin, hydroxyaromatic compound and an aldehyde source, a urea compound and an aldehyde source, and/or an amine compound and an aldehyde source. The plant protein composition is advantageous because it is prepared from plant biomass, a renewable feedstock that is generally a waste by-product of the agricultural industry. The adhesive compositions are useful in preparing wood composites, such as particle board.

Accordingly, one type of protein adhesive composition provided by the invention contains lignin and a plant protein composition. Lignin is a biopolymer that can be isolated from wood. It has been unexpectedly discovered that use of lignin in combination with plant protein compositions described herein provide an adhesive that can be applied to wood particles to form a particle board composite. Experiments using lignin alone failed to produce a formulation with sufficient cohesive strength to produce a particle board composite. Accordingly, one aspect of the invention provides an adhesive composition comprising lignin and a plant protein composition.

Another type of protein adhesive composition provided by the invention contains a hydroxyaromatic compound (e.g., phenol), an aldehyde source, and a plant protein composition selected from the group consisting of ground plant meal and isolated polypeptide composition. The plant protein composition is contemplated to provide performance benefits to the adhesive composition. The aldehyde source may be an aldehyde or a composition that releases an aldehyde (e.g., formaldehyde) in situ. Accordingly, another aspect of the invention provides a hydroxyaromatic-aldehyde adhesive composition comprising a hydroxyaromatic compound, an aldehyde source, and a plant protein composition selected from the group consisting of ground plant meal and isolated polypeptide composition. A more specific embodiment of such protein adhesives relates to a phenol-formaldehyde-plant protein adhesive composition that comprises: (a) phenol; (b) formaldehyde; (c) a plant protein composition selected from the group consisting of ground plant meal and isolated polypeptide composition; and (d) a reactive prepolymer; wherein the ratio of (i) weight percent of reactive prepolymer in the adhesive composition to (ii) the sum of the weight percent of phenol and formaldehyde in the adhesive composition is greater than 1:1. A second more specific embodiment of such protein adhesives relates to a phenol-formaldehyde-plant protein adhesive composition that comprises: (a) phenol and formaldehyde that together constitute from about 0.5% w/w to about 10% w/w of the adhesive composition; (b) ground plant meal in an amount ranging from about 10% w/w to about 30% w/w of the adhesive composition; (c) polymeric diphenylmethane diisocyanate in an amount ranging from about 10% w/w to about 30% w/w of the adhesive composition; and (d) water in an amount ranging from about 45% w/w to about 75% w/w of the adhesive composition.

Yet another type of protein adhesive composition provided by the invention contains a urea compound, an aldehyde source, and a plant protein composition selected from the group consisting of ground plant meal and isolated polypeptide composition. The plant protein composition is contemplated to provide performance benefits to the adhesive composition. The aldehyde source may be an aldehyde or a composition that releases an aldehyde (e.g., formaldehyde) in situ. Accordingly, another aspect of the invention provides a urea compound-aldehyde adhesive composition comprising a urea compound, an aldehyde source, and a plant protein composition selected from the group consisting of ground plant meal and isolated polypeptide composition.

Yet another type of protein adhesive composition provided by the invention contains an amine compound, an aldehyde source, and a plant protein composition selected from the group consisting of ground plant meal and isolated polypeptide composition. The plant protein composition is contemplated to provide performance benefits to the adhesive composition. The aldehyde source may be an aldehyde or a composition that releases an aldehyde (e.g., formaldehyde) in situ. Accordingly, another aspect of the invention provides an amine compound-aldehyde adhesive composition comprising an amine compound selected from the group consisting of a primary amine compound and second amine compound, an aldehyde source, and a plant protein composition selected from the group consisting of ground plant meal and isolated polypeptide composition.

In another aspect, the invention provides a solid binder composition formed by curing an adhesive composition described herein.

In another aspect, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first article to the second article. The method optionally also comprises the step of, after step (b), permitting the adhesive composition to cure, which can be facilitated by the application of pressure, heat or both pressure and heat.

In another aspect, the invention provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article or both the first and second articles are lignocellulosic materials, or composite materials containing lignocellulosic material. The first article, the second article or both the first and second articles can comprise a metal, a resin, a ceramic, a polymer, a glass or a combination thereof. The first article, the second article, or both the first article and the second article can be a composite. In addition, the invention provides an article produced by each of the foregoing methods of manufacture.

In addition, the invention provides an article comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. In certain other embodiments, the bonded components can be selected from the group consisting of paper, wood, glass, metal, fiberglass, wood fiber, ceramic, ceramic powder, sand, plastic (for example, a thermoset plastic), and a combination thereof. The invention provides an article (for example, a composite material, laminate, or a laminate containing composite material) produced using one or more of the adhesive compositions described herein.

The composite material can be chip board, particle board, fiber board, plywood, laminated veneer lumber, glulam, laminated whole lumber, laminated composite lumber, composite wooden I-beams, medium density fiberboard, high density fiberboard, orientated strand board, extruded wood, or fiberglass. The composite can be a thermosetting composite or a thermoplastic composite.

In certain embodiments, the article is a composite, such as a random non-oriented homogeneous composite, an oriented composite, or a laminated composite. In certain other embodiments, the article comprises a lignocellulosic component. Furthermore, the article can comprise paper, wood, glass, fiberglass, wood fiber, ceramic, ceramic powder, or a combination thereof.

In certain embodiments, the article is a particle board composite. The amount of wood and adhesive composition used to prepare the particle board composite can be adjusted to optimize the performance properties of the particle board for different applications (e.g., outdoor use where increased water resistance is desirable). In certain embodiments, the composite comprises at least about 80% (w/w) wood, at least about 90% (w/w) wood, at least about 95% (w/w) wood, or at least about 98% (w/w) wood.

Depending upon the adhesive used, the resulting article can have one or more of the following features: the article is moisture resistant; the article remains intact after boiling in water for 5 minutes; two or more components of the article remain bonded after boiling in water for 5 minutes; the article, when boiled in water for 5 minutes, displays less than a 20% increase in volume relative to the article prior to exposure to the water; and when the article (for example, a composite material, laminate, or a laminate containing a composite material) contains a lignocellulosic material in the composite material or laminate, the article exhibits no less than 50%, optionally no less than 75%, cohesive failure of the lignocellulosic component when the article is placed under a loading stress sufficient to break the article. In certain embodiments, the article exhibits no less than 50% cohesive failure of the lignocellulosic component when the article is placed under a loading stress sufficient to break the article.

BRIEF DESCRIPTION OF THE DRAWINGS

The foregoing and other objects, features and advantages of the invention will become apparent from the following description of preferred embodiments, as illustrated in the accompanying drawings. Like-referenced elements identify common features in the corresponding drawings. The drawings are not necessarily to scale, with emphasis instead being placed on illustrating the principles of the present invention, in which.

DETAILED DESCRIPTION

Figure 1:
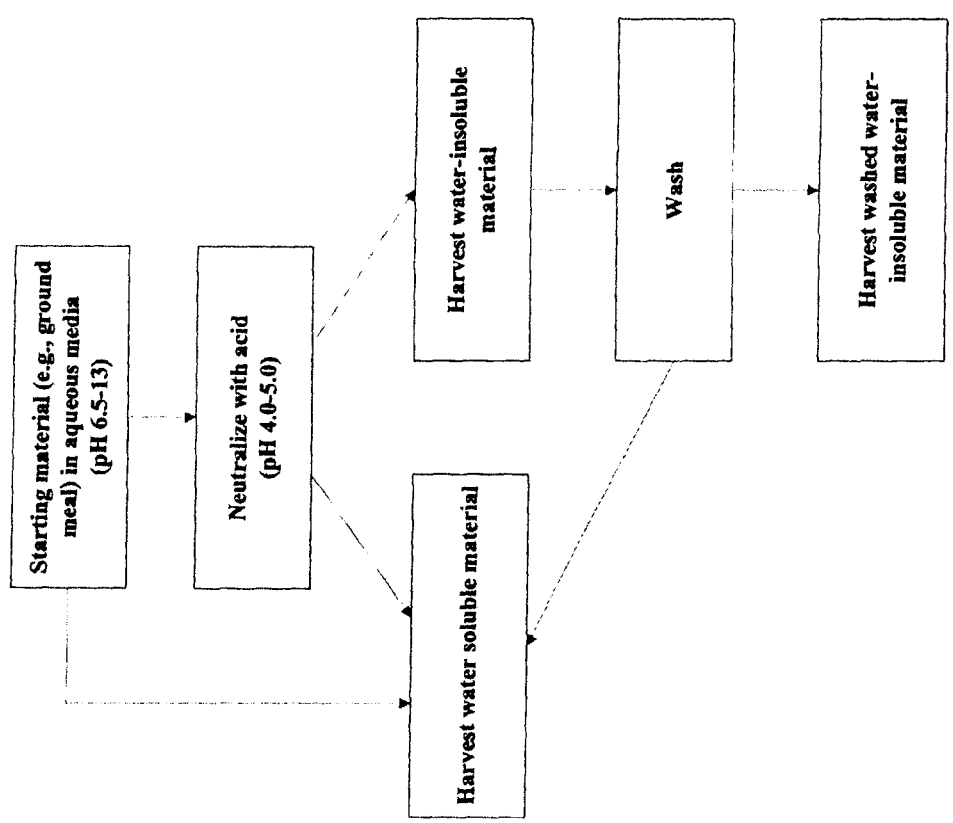
FIG. 1 is a flow chart showing the steps of an exemplary method for producing isolated polypeptide compositions useful in the practice of the invention.

The invention provides protein adhesive compositions and methods of making and using such adhesives. Also, the invention provides articles, such as wood composites, made using the protein adhesive compositions. The protein adhesive compositions described herein contain a plant protein composition. The plant protein composition is obtained from a renewable feedstock and provides multiple advantages in the preparation of adhesive compositions. The protein component is preferably ground plant meal or an isolated polypeptide composition derived from plant meal. The adhesive compositions also contain, for example, a lignin, hydroxyaromatic compound and an aldehyde source, a urea compound and an aldehyde source, and/or an amine compound and an aldehyde source.

One type of protein adhesive composition provided by the invention contains lignin and a plant protein composition. Another type of protein adhesive composition provided by the invention contains a hydroxyaromatic compound, an aldehyde source, and a plant protein composition selected from the group consisting of ground plant meal and isolated polypeptide composition. Yet another type of protein adhesive composition provided by the invention contains a urea compound, an aldehyde source, and a plant protein composition selected from the group consisting of ground plant meal and isolated polypeptide composition. Yet another type of protein adhesive composition provided by the invention contains an amine compound, an aldehyde source, and a plant protein composition selected from the group consisting of ground plant meal and isolated polypeptide composition. Features of these protein adhesive compositions are described in more detail in the sections below.

The adhesives described herein can be used in the production of a variety of wood-based products including composite materials, laminates, and laminates that contain composite materials. For example, the adhesives can be used in the production of consolidated wood composites, for example, chipboard (also known as OSB), fiberboard, and related composite wood products, as well as in the production of engineered lumber composites, for example, I-beams (I-joists), laminated veneer lumber (LVL), and other types of structural lumber composites.

The following sections describe lignin-containing protein adhesives, hydroxyaromatic-aldehyde adhesive composition (e.g., phenol/formaldehyde adhesive compositions), urea compound-aldehyde adhesive composition (e.g., urea/formaldehyde adhesive compositions), amine compound-aldehyde adhesive composition (e.g., melamine/formaldehyde adhesive compositions), additives that may be included in the adhesive compositions, and methods of using such adhesives, and articles formed from such adhesives.

I. Lignin-Containing Protein Adhesives

It has been unexpectedly discovered that use of lignin in combination with plant protein compositions described herein provide an adhesive. The adhesive can be applied to wood particles to form, for example, a particle board composite. As explained in Example 6, experiments using lignin alone failed to produce a formulation with sufficient cohesive strength to produce a particle board composite.

Accordingly, one aspect of the invention provides an adhesive composition comprising lignin and a plant protein composition. Further description of lignin and plant protein compositions is described in the sections below. The adhesive composition may be in the form of a liquid. Alternatively, the adhesive composition may be in the form of a dry mixture. The adhesive composition may further comprise one or more additives, such as the additives described in Section VIII below, which include, for example, an intercalated clay, an exfoliated clay, and a partially exfoliated clay.

In certain embodiments, the adhesive composition may further comprise a reactive prepolymer. In certain other embodiments, the adhesive composition may further comprise a hydroxyaromatic compound (e.g., phenol) and an aldehyde source, such as those described in Section II below. In certain other embodiments, the adhesive composition may further comprise a urea compound (e.g., $H_2NC(O)NH_2$) and an aldehyde source, such as those described in Section III below. In certain other embodiments, the adhesive composition may further comprise an amine compound (e.g., melamine) and an aldehyde source, such as those described in Section IV below. In yet other embodiments, the adhesive composition further comprises an aldehyde source, such as an aldehyde source described in Section IV below.

In certain embodiments, the adhesive composition further comprises water. For example, in certain embodiments, water is present in an amount of from about 30% w/w to about 65% w/w of the adhesive composition. In certain other embodiments, water is present in an amount of from about 20% w/w to about 50% w/w, about 30% w/w to about 60% w/w, about 40% w/w to about 70% w/w, about 50% w/w to about 80% w/w, or about 10% w/w to about 90% w/w of the adhesive composition.

The amount of lignin in the adhesive composition may be adjusted to achieve certain performance properties. For example, in certain embodiments, the adhesive composition comprises from about 1% w/w to about 50% w/w lignin, from about 1% w/w to about 35% w/w lignin, from about 1% w/w to about 15% w/w lignin, from about 5% w/w to about 35% w/w lignin, from about 15% w/w to about 35% w/w lignin, or from about 20% w/w to about 45% w/w lignin. In certain other embodiments, the adhesive composition comprises from about 5% w/w to about 35% w/w lignin.

The amount of plant protein composition in the adhesive composition may be adjusted to achieve certain performance properties. For example, in certain embodiments, the adhesive composition comprises from about 5% w/w to about 50% w/w plant protein composition, from about 5% w/w to about 35% w/w plant protein composition, from about 5% w/w to about 30% w/w plant protein composition, from about 15% w/w to about 35% w/w plant protein composition, or from about 20% w/w to about 30% w/w plant protein composition. In certain other embodiments, the adhesive composition comprises from about 15% w/w to about 35% w/w plant protein composition.

The amount of plant protein composition may be selected relative to the amount of lignin in the adhesive composition. For example, in certain embodiments, the ratio of weight percent plant protein composition in the adhesive composition to weight percent lignin in the adhesive composition is from (a) 99.9:0.1 to 0.1:99.9, (b) 9:1 to 1:9, (c) 5:1 to 1:5, or (d) 2:1 to 1:2.

A more specific embodiment relates an adhesive composition that comprises: (a) lignin in an amount ranging from about 5% w/w to about 30% w/w of the adhesive composition; (b) ground plant meal in an amount ranging from about 10% w/w to about 30% w/w of the adhesive composition; and (c) water in an amount ranging from about 45% w/w to about 75% w/w of the adhesive composition. In certain embodiments, the lignin has a weight average molecular weight of about 10,000 g/mol to about 70,000 g/mol.

II. Hydroxyaromatic Compound/Aldehyde-Containing Protein Adhesives

Another aspect of the invention provides a hydroxyaromatic-aldehyde protein adhesive composition. The adhesive composition comprises a hydroxyaromatic compound, an aldehyde source, and a plant protein composition selected from the group consisting of ground plant meal and isolated polypeptide composition. The adhesive composition may be in the form of a liquid. Alternatively, the adhesive composition may be in the form of a dry mixture.

The adhesive composition may further comprise one or more additives, such as the additives described in Section VIII below, which include, for example, an intercalated clay, an exfoliated clay, and a partially exfoliated clay. Further, the adhesive composition may comprise lignin, such as a lignin described below in Section V. Still further, in certain embodiments, the adhesive composition may further comprise a reactive prepolymer, such as a reactive prepolymer described below in Section VII.

The particular hydroxyaromatic compound may be selected to achieve certain performance properties. Exemplary classes of hydroxyaromatic compounds include alkyl-substituted phenols, aryl-substituted phenols, cycloalkyl-substituted phenols, alkenyl-substituted phenols, alkoxy-substituted phenols, aryloxy-substituted phenols and halogen-substituted phenols. Exemplary specific hydroxyaromatic compounds include phenol, o-cresol, m-cresol, p-cresol, 3,5-xylenol, 3,4-xylenol, 2,3,4-trimethylphenol, 3-ethylphenol, 3,5-diethylphenol, p-butylphenol, 3,5-dibutylphenol, p-amyl phenol, p-cyclohexyl phenol, p-octyl phenol, 3,5 dicyclohexylphenol, p-phenylphenol, p-crotylphenol, 3,5-dimethoxyphenol, 3,4,5-trimethoxyphenol, p-ethoxyphenol, p-butoxyphenol, 3-methyl-4-methoxyphenol, p-phenoxyphenol, resorcinol, and naphthol. In certain embodiments, the hydroxyaromatic compound is phenol.

Various aldehyde source compounds are reported in the literature and are contemplated to be amenable for use in the present invention. For example, in certain embodiments, the aldehyde source is an aldehyde compound or para-formaldehyde. Exemplary classes of aldehyde compounds include an alkyl monoaldehyde, an alkyl dialdehyde, a hydroxyalkyl monoaldehyde, a hydroxyalkyl dialdehyde, an acyl monoaldehyde, and an acyl dialdehyde. Exemplary specific aldehyde compounds include formaldehyde, acetaldehyde, glyoxal, methyl glyoxal, glycoaldehyde, propanedial, propionaldehyde, butyraldehyde, pentanal, hexanal, dodecanal, octadecanal, cinnamaldehyde, furfuraldehyde, benzaldehyde, and glutaraldehyde. In certain embodiments, the aldehyde source is formaldehyde (i.e., HC(O)H), such as in the form of formaldehyde gas. In certain other embodiments, the aldehyde source is para-formaldehyde ("paraform").

Alternatively, chemicals found in wood can serve as a source of formaldehyde, and, as such, wood can be an aldehyde source.

The ratio of aldehyde source to hydroxyaromatic compound in the adhesive composition may be adjusted to achieve certain performance properties. For example, in certain embodiments, the mole ratio of aldehyde source to hydroxyaromatic compound is from about 0.5:1 to about 4:1, about 1.5:1 to about 3.5:1, or about 1.5:1 to about 2.5:1. In certain other embodiments, the mole ratio of aldehyde source to hydroxyaromatic compound is from about 1:2 to about 2:1. In certain other embodiments, the hydroxyaromatic compound is phenol, the aldehyde source is formaldehyde, and the mole ratio of formaldehyde to phenol is from about 1:2 to about 2:1.

In certain embodiments, the hydroxyaromatic compound and aldehyde source together constitute from about 0.5% w/w to about 10% w/w, about 1% w/w to about 8% w/w, about 1% w/w to about 5 w/w, or about 2% w/w to about 5% w/w of the adhesive composition. In certain embodiments, the plant protein composition is present in an amount ranging from about 5% w/w to about 40% w/w, about 10% w/w to about 30% w/w, or about 15% w/w to about 25% w/w of the adhesive composition. In embodiments where the adhesive composition further comprises a reactive prepolymer, the reactive prepolymer may be present in an amount ranging from about 5% w/w to about 40% w/w, about 10% w/w to about 30% w/w, or about 15% w/w to about 25 w/w of the adhesive composition.

The hydroxyaromatic-aldehyde protein adhesive compositions may optionally further comprise a catalyst to facilitate polymerization. Exemplary catalysts include bases such as sodium hydroxide, caustic soda, potassium hydroxide, caustic potash, calcium hydroxide, tetraalkyl ammonium hydroxides, barium hydroxide, and other basic alkaline salts such as alkali metal carbonate. Other exemplary catalysts include (i) mineral acids, such as hydrochloric acid, hydrobromic acid, perchloric acid, sulfuric acid, and nitric acid; (ii) sulfonic acids, such as methanesulfonic acid, ethanesulfonic acid, cyclohexanesulfonic acid, benzenesulfonic acid, p-toluenesulfonic acid, trifluoromethane sulfonic acid, and camphorsulfonic acid; and (iii) organic acids, such as formic acid, acetic acid, propionic acid, cyclohexanecarboxylic acid, oxalic acid, malonic acid, maleic acid, fumaric acid, citric acid, tartaric acid, and 3-mercaptopropionic acid.

In certain embodiments, the adhesive composition further comprises water. For example, in certain embodiments, water is present in an amount of from about 30% w/w to about 65% w/w of the adhesive composition. In certain other embodiments, water is present in an amount of from about 20% w/w to about 50% w/w, about 30% w/w to about 60% w/w, about 40% w/w to about 70% w/w, about 50% w/w to about 80% w/w, or about 10% w/w to about 90% w/w of the adhesive composition.

A more specific embodiment relates to a phenol-formaldehyde-plant protein adhesive composition that comprises: (a) phenol; (b) formaldehyde; (c) a plant protein composition selected from the group consisting of ground plant meal and isolated polypeptide composition; and (d) a reactive prepolymer; wherein the ratio of (i) weight percent of reactive prepolymer in the adhesive composition to (ii) the sum of the weight percent of phenol and formaldehyde in the adhesive composition is greater than 1:1. In certain embodiments, the ratio of (i) weight percent of reactive prepolymer in the adhesive composition to (ii) the sum of the weight percent of phenol and formaldehyde in the adhesive composition is in the range of about 3:1 to about 20:1. In certain embodiments, the ratio of (i) weight percent of reactive prepolymer in the adhesive composition to (ii) weight percent plant protein composition in the adhesive composition is in the range of about 4:1 to about 1:4. In certain embodiments, the composition further comprises water, such as where the water is present in an amount ranging from about 45% w/w to about 75% w/w of the adhesive composition. In certain embodiments, the composition further comprises urea (i.e., $H_2NC(O)NH_2$), such as where the urea is present in an amount ranging from about 0.5% w/w to about 5% w/w of the adhesive composition.

Exemplary reactive prepolymers are described in Section VII below. In certain embodiments, the reactive prepolymer is a polyisocyanate-based prepolymer, an epoxy-based prepolymer, a latex-based prepolymer, a latex prepolymer, or a combination thereof. In certain other embodiments, the reactive prepolymer is a polyisocyanate-based prepolymer. In certain other embodiments, the polyisocyanate-based prepolymer is an organic polyisocyanate; or a reaction product between an organic polyisocyanate and a polypeptide, a polyol, an amine based polyol, an amine containing compound, a hydroxy containing compound, or a combination thereof. In certain other embodiments, the reactive prepolymer is polymeric diphenylmethane diisocyanate.

In certain embodiments, the plant protein composition is ground plant meal.

Another more specific embodiment relates phenol-formaldehyde-plant protein adhesive composition that comprises: (a) phenol and formaldehyde that together constitute from about 0.5% w/w to about 10% w/w of the adhesive composition; (b) ground plant meal in an amount ranging from about 10% w/w to about 30% w/w of the adhesive composition; (c) polymeric diphenylmethane diisocyanate in an amount ranging from about 10% w/w to about 30% w/w of the adhesive composition; and (d) water in an amount ranging from about 45% w/w to about 75% w/w of the adhesive composition. In certain embodiments, the composition further comprises urea (i.e., $H_2NC(O)NH_2$) in an amount ranging from about 0.5% w/w to about 5% w/w of the adhesive composition. In certain embodiments, the ratio of (i) weight percent of polymeric diphenylmethane diisocyanate in the adhesive composition to (ii) the sum of the weight percent of phenol and formaldehyde in the adhesive composition is in the range of about 2:1 to about 5:1. In certain embodiments, the ratio of (i) weight percent of polymeric diphenylmethane diisocyanate in the adhesive composition to (ii) weight percent plant protein composition in the adhesive composition is in the range of about 3:1 to about 1:2.

Another more specific embodiment relates phenol-formaldehyde-plant protein adhesive composition that comprises: (a) phenol and para-formaldehyde that together constitute from about 0.5 w/w to about 10% w/w of the adhesive composition; (b) ground plant meal in an amount ranging from about 10% w/w to about 30% w/w of the adhesive composition; (c) polymeric diphenylmethane diisocyanate in an amount ranging from about 10% w/w to about 30% w/w of the adhesive composition; and (d) water in an amount ranging from about 45% w/w to about 75% w/w of the adhesive composition. In certain embodiments, the composition further comprises urea (i.e., $H_2NC(O)NH_2$) in an amount ranging from about 0.5% w/w to about 5% w/w of the adhesive composition. In certain embodiments, the ratio of (i) weight percent of polymeric diphenylmethane diisocyanate in the adhesive composition to (ii) the sum of the weight percent of phenol and para-formaldehyde in the adhesive composition is in the range of about 2:1 to about 5:1. In certain embodiments, the ratio of (i) weight percent of polymeric diphenylmethane diisocyanate in the adhesive composition to (ii) weight percent plant protein composition in the adhesive composition is in the range of about 3:1 to about 1:2.

III. Urea Compound/Aldehyde-Containing Protein Adhesives

Another aspect of the invention provides a urea compound-aldehyde protein adhesive composition. The adhesive composition comprises a urea compound, an aldehyde source, and a plant protein composition selected from the group consisting of ground plant meal and isolated polypeptide composition.

The adhesive composition may further comprise one or more additives, such as the additives described in Section VIII below, which include, for example, an intercalated clay, an exfoliated clay, and a partially exfoliated clay. Further, the adhesive composition may comprise lignin, such as a lignin described below in Section V. Still further, in certain embodiments, the adhesive composition may further comprise a reactive prepolymer, such as a reactive prepolymer described below in Section VII.

The particular urea compound may be selected to achieve certain performance properties. Exemplary classes of urea compounds include alkyl ureas, aralkyl ureas, aryl ureas, mono-methylolurea, a di-methylolurea, a tri-methylolurea, and substituted noncyclic ureas. Exemplary specific urea compounds include $H_2NC(O)NH_2$, ethylene urea, propylene urea, tetrahydro-5-(2-hydroxyethyl)-1,3,5-triazin-2-one, 4,5-dihydroxy-2-imidazolidone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, dihydro-5-methyl-2(1H, 3H)pyrimidinone, dihydro-5,5-dimethyl-2 (1H)pyrimidinone, tetrahydro-4,5-methyl-2(1H) pyrimidinone, and tetrahydro-4-(2-hydroxyethyl)-5,5-dimethyl-2(1H) pyrimidinone. Additional urea compounds include those represented by $RN(H)C(O)NH_2$, $R_2NC(O)NH_2$, or $RN(H)C(O)N(H)R$, wherein R represents independently for each occurrence H, alkyl, aryl, or aralkyl. In certain embodiments, the urea compound has the formula $RN(H)C(O)N(H)R$, wherein R represents independently for each occurrence H, alkyl, aryl, or aralkyl. In certain other embodiments, the urea compound is $H_2NC(O)NH_2$, $H_2NC(O)N(H)Me$, $MeN(H)C(O)N(H)Me$, or $H_2NC(O)N(CH_3)_2$. In certain other embodiments the urea compound is $[CH_3CH_2N(H)]_2C(O)$, $[(CH_3)_2N]_2C(O)$, or $CH_3CH_2N(H)C(O)NH_2$. In still other embodiments, the urea compound is $H_2NC(O)NH_2$.

Various aldehyde source compounds are reported in the literature and are contemplated to be amenable for use in the present invention. For example, in certain embodiments, the aldehyde source is an aldehyde compound or para-formaldehyde. Exemplary classes of aldehyde compounds include an alkyl monoaldehyde, an alkyl dialdehyde, a hydroxyalkyl monoaldehyde, a hydroxyalkyl dialdehyde, an acyl monoaldehyde, and an acyl dialdehyde. Exemplary specific aldehyde compounds include formaldehyde, acetaldehyde, glyoxal, methyl glyoxal, glycoaldehyde, propanedial, propionaldehyde, butyraldehyde, pentanal, hexanal, dodecanal, octadecanal, cinnamaldehyde, furfuraldehyde, benzaldehyde, and glutaraldehyde. In certain embodiments, the aldehyde source is formaldehyde (i.e., HC(O)H), such as in the form of formaldehyde gas. In certain other embodiments, the aldehyde source is para-formaldehyde ("paraform"). Alternatively, chemicals found in wood can serve as a source of formaldehyde, and, as such, wood can be an aldehyde source.

The ratio of aldehyde source to urea compound in the adhesive composition may be adjusted to achieve certain performance properties. For example, in certain embodiments, the mole ratio of aldehyde source to urea compound is from about 0.5:1 to about 4:1, about 1.5:1 to about 3.5:1, or about 1.5:1 to about 2.5:1.

The urea compound-aldehyde protein adhesive compositions may optionally further comprise a catalyst to facilitate polymerization. Exemplary catalysts include Lewis acids, Bronsted acids, ammonium salts, substituted ammonium salts, or a combination thereof. In certain embodiments, the catalyst is $AlCl_3$, $AlBr_3$, $Al_2(SO_4)_3$, $MgCl_2$, $MgBr_2$, Ca, Sr, Ti, Fe, Zn, Sn, Sb, Zr, Hg, Tl, Pb, Bi, HCl, $H_2SO_4$, $HNO_3$, $H_3PO_4$, or $HClO_4$.

IV. Amine Compound—Aldehyde-Containing Protein Adhesives

Another aspect of the invention provides an amine compound-aldehyde adhesive composition. The adhesive composition comprises an amine compound selected from the group consisting of a primary amine compound and a secondary amine compound, an aldehyde source, and a plant protein composition selected from the group consisting of ground plant meal and isolated polypeptide composition.

The adhesive composition may further comprise one or more additives, such as the additives described in Section VIII below, which include, for example, an intercalated clay, an exfoliated clay, and a partially exfoliated clay. Further, the adhesive composition may comprise lignin, such as a lignin described below in Section V. Still further, in certain embodiments, the adhesive composition may further comprise a reactive prepolymer, such as a reactive prepolymer described below in Section VII.

The particular amine compound may be selected to achieve certain performance properties. In certain embodiments, the amine compound is a primary amine compound, such as a primary alkyl amine, primary arylamine, primary heteroarylamine, or primary aralkyl amine. In certain embodiments, the amine compound is melamine.

Various aldehyde source compounds are reported in the literature and are contemplated to be amenable for use in the present invention. For example, in certain embodiments, the aldehyde source is an aldehyde compound or para-formaldehyde. Exemplary classes of aldehyde compounds include an alkyl monoaldehyde, an alkyl dialdehyde, a hydroxyalkyl monoaldehyde, a hydroxyalkyl dialdehyde, an acyl monoaldehyde, and an acyl dialdehyde. Exemplary specific aldehyde compounds include formaldehyde, acetaldehyde, glyoxal, methyl glyoxal, glycoaldehyde, propanedial, propionaldehyde, butyraldehyde, pentanal, hexanal, dodecanal, octadecanal, cinnamaldehyde, furfuraldehyde, benzaldehyde, and glutaraldehyde. In certain embodiments, the aldehyde source is formaldehyde (i.e., HC(O)H), such as in the form of formaldehyde gas. In certain other embodiments, the aldehyde source is para-formaldehyde ("paraform"). Alternatively, chemicals found in wood can serve as a source of formaldehyde, and, as such, wood can be an aldehyde source.

The ratio of aldehyde source to amine compound in the adhesive composition may be adjusted to achieve certain performance properties. For example, in certain embodiments, the mole ratio of aldehyde source to amine compound is from about 0.5:1 to about 4:1, about 1.5:1 to about 3.5:1, or about 1.5:1 to about 2.5:1.

V. Lignin

Lignin is a polyphenolic polymer that can be isolated from wood. Lignin can be characterized according to the natural source from which it is obtained. In addition, lignin can be characterized according to physical properties such as solubility, molecular weight, temperature stability, salt tolerance, surface tension, sulphonic sulphur content, presence of cations, quantity of calcitrant, its phenoxy radical signal, and amount of p-hydroxyphenyl, guaiacyl, and/or synringal moieties in its structure.

One type of lignin contemplated to be amenable for use in the adhesive compositions described herein is lignin obtained from hardwood trees, such as Acacia, Afzelia, Synsepalum duloificum, *Albizia*, Alder, Applewood, Arbutus, Ash, Aspen, Australian Red Cedar, Ayna, Balsa, Basswood, Beech, Birch, Blackbean, Blackwood, Bocote, Boxelder, Boxwood, Brazilwood, Bubinga, Buckeye, Butternut, *Catalpa*, Cherry, Crabwood, Chestnut, Coachwood, Cocobolo, Corkwood, Cottonwood, Cucumbertree, Dogwood, Ebony, Elm, *Eucalyptus*, Greenheart, Grenadilla, Gum, Hickory, Hornbeam, Hophombeam, Ipe, Iroko, Ironwood, *Jacaranda*, Jotoba, Lacewood, Laurel, Limba, Lignum vitae, Locust, Mahogany, Maple, Meranti, Mpingo, Oak, Obeche, Okoume, Oregon Myrtle, California Bay Laurel, Pear, Poplar, Ramin, Red cedar, Rosewood, Sal, Sandalwood, *Sassafras*, Satinwood, Silky Oak, Silver Watde, Snakewood, Sourwood, Spanish cedar, American sycamore, Teak, Walnut, Willow, Yellow poplar, Bamboo, and Palmwood.

Another type of lignin contemplated to be amenable for use in the adhesive compositions described herein is lignin obtained from softwood trees, such as *Araucaria*, softwood Cedar, Cypress, Rocky Mountain Douglas fir, European Yew, Fir, Hemlock, Kauri, Kaya, Larch, Pine, Redwood, Rimu, Spruce, and Sugi.

Another type of lignin contemplated to be amenable for use in the adhesive compositions described herein is lignin obtained from annual fibre, such as flax, wheat, barley, oats, sugarcane bagasse, rice straw, corn stover, hemp, fruit pulp, alfa grass, switchgrass, corn cobs, and fruit peals.

Another type of lignin contemplated to be amenable for use in the adhesive compositions described herein is lignin having one or more of the following physical properties: (i) a weight average molecular weight of about 1,000 g/mol to about 100,000 g/mol, about 10,000 g/mol to about 70,000 g/mol, or about 5,000 to about 50,000; (ii) a temperature stability of about 50° C. to about 400° C., about 70° C. to about 250° C., or about 90° C. to about 200° C.; (iii) a salt tolerance of less than 0.1% precipitate in a salt solution containing sodium chloride, magnesium chloride, and/or calcium chloride with concentrations of about 70 ppm to about 270 ppm total dissolved solids; (iv) when mixed with water to produce a 1% aqueous solution, the aqueous solution has a surface tension of 35 to 75 dynes/cm; and (v) has a phenoxy radical signal of about 500 gauss to about 5,000 gauss, about 1000 gauss to about 3000 gauss, or about 2000 gauss to about 4000 gauss. In certain embodiments, the lignin has one or more of the following physical properties: (i) at least 20% by weight p-hydroxyphenyl, (ii) at least 40% by weight p-hydroxyphenyl, (iii) at least 20% by weight guaiacyl, (iv) at least 40% by weight guaiacyl, (v) at least 20% by weight synringal, and (vi) at least 40% by weight synringal.

Lignin can be isolated from wood and annual fibre using procedures reported in the literature. Exemplary isolation procedures include sulfite pulping, the Kraft process, organosolv pulping (e.g., ASAM organosolv pulping), acid hydrolysis, soda pulping, steam explosion, Alcell® pulping, Organocell pulping, and Acetosolv pulping. In particular, the sulphate, sulphite, ORGANOSOLV and MILOX processes can be used to isolate lignin. Isolation procedures described in the literature can also be used to obtain lignin sulfonates (also known as lignosulphonates and sulfite lignins), kraft lignins (also called sulfate lignins), alkali lignins, and oxylignins.

VI. Plant Protein Composition

The plant protein composition is derived from plant biomass and, as such, provides the benefit that it is a renewable feedstock. The plant protein composition may be ground plant meal or an isolated polypeptide composition as described in more detail below.

A. Ground Plant Meal

Plant meal can be obtained from commercial sources or derived from corn, wheat, sunflower, cotton, rapeseed, canola, castor, soy, camelina, flax, jatropha, mallow, peanuts, algae, sugarcane bagasse, tobacco, whey, or a combination thereof. Plant meal can be ground using techniques known in the art, such as hammer mill (cryogenic or ambient) or ball mill. In certain embodiments, the plant meal is ground and screened to isolate plant meal particles having a particle size in the range of from about 1 µm to about 400 µm, from about 1 µm to about 350 µm, from about 1 µm to about 300 µm, from about 1 µm to about 250 µm, from about 1 µm to about 200 µm, from about 1 µm to about 100 µm, from about 1 µm to about 50 µm, from about 5 µm to about 250 µm, from about 5 µm to about 200 µm, from about 5 µm to about 150 µm, from about 5 µm to about 100 µm, from about 5 µm to about 50 µm, from about 10 µm to about 250 µm, from about 10 µm to about 100 µm, from about 10 µm to about 90 µm, from about 10 µm to about 70 µm, from about 10 µm to about 50 µm, from about 20 µm to about 150 µm, from about 20 µm to about 100 µm, from about 20 µm to about 80 µm, from about 20 µm to about 70 µm, from about 20 µm to about 60 µm, from about 25 µm to about 150 µm, from about 25 µm to about 100 µm, from about 25 µm to about 50 µm, from about 50 µm to about 150 µm, or from about 50 µm to about 100 µm. In certain embodiments, the plant meal is ground and has a particle size in the range of from about 1 µm to about 200 µm. In certain other embodiments, the plant meal is ground and has a particle size in the range of from about 1 µm to about 100 µm, Preferred types of ground plant meal are characterized by their ability to suspend or emulsify oil in water or water in oil to produce a homogeneous suspension or emulsion stable, by visual inspection, for least 5 minutes. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the ground plant meal with the oil. One assay that can be used to identify such preferred ground plant meals involves mixing 26 parts (by weight) of a ground plant meal sample with 74 parts (by weight) of water. The resulting solution or dispersion is mixed with 26 parts (by weight) of oil, for example, PMDI. Under these conditions, the ground plant meal produces a dispersion or emulsion that exhibits substantially no phase separation by visual inspection for at least 5 minutes after mixing the ground plant meal with the oil. This assay can be performed with oils other than PMDI, such as mineral oil, soybean oil, derivatized soybean oil, motor oil, castor oil, derivatized castor oil, dibutyl phthalate, epoxidized soybean oil, corn oil, vegetable oil, caprylic triglyceride, *Eucalyptus* oil, tributyl o-acetylcitrate, or an organic polyisocyanate other than PMDI.

An additive may be added to the plant meal prior to grinding to aid in the grinding process or produce a ground plant meal with superior physical properties for use in manufacturing an adhesive composition, e.g., providing a ground plant meal with improved flow properties, superior packing density, reduced tendency to cake, reduced tendency to bridge, superior particle dispersibility in aqueous mixtures, modulation of particle coupling and/or wetting characteristics with other materials in the adhesive composition, and the like. Alternatively, the additive may be added to the plant meal during the grinding process used to produce ground plant meal.

Additives that impart superior performance properties to the adhesive composition or the wood composite formed from the adhesive composition may be added to the plant meal before or during grinding or may be added to the ground plant meal produced from the grinding process. Exemplary additives include those described in sections below, and, in particular, include agents that improve moisture resistance of the wood composite, formaldehyde scavenging agents, and composite-release promoting agents. The additive may be in solid or liquid form, and the additive may be characterized according to whether it reacts with materials in the adhesive composition or does not react with materials in the adhesive composition.

Exemplary solid additives include (i) inorganic additives such as silica, pigments, catalysts, clays (including intercalated clays, exfoliated clays, and partially exfoliated clays), and the like, and (ii) organic compounds such as fatty acids (e.g., stearic acid, lauric acid) lignin, tannins, amine-containing compounds, urea, hydrocarbon waxes/liquids, and fluorocarbon waxes/liquids. Solid additives may be used in amounts ranging, for example, from about 0.001% w/w to 40% w/w of the ground plant meal mixture, from about 0.1% w/w to about 20% w/w of the ground plant meal mixture, or from about 0.5% w/w to about 15% w/w of the ground plant meal mixture.

Liquid additives may be dry blended with ground plant meal. The amount of liquid additive should be less than that which causes the ground plant meal to cake or bridge during a manufacturing process. Accordingly, in certain embodiments, the amount of liquid additive(s) is less than about 10% by weight of the ground plant meal mixture containing the additive(s). In certain other embodiments, the amount of liquid additive(s) is less than about 5% by weight, or even less than about 2% by weight, of the ground plant meal mixture containing the additive. The liquid additive may be characterized as reactive or non-reactive. Reactive liquid additives may include organosilanes, low molecular weight alcohols such as glycerin or propylene glycol, liquid polyol oligomers, liquid polyurethane oligomers, addition-polymerizable monomers, condensation-polymerizable monomers, and reactive oils such as epoxidized soy oil or castor oil. Other liquid additives include amalgams of a carrier oil and a partially exfoliated clay as described herein.

B. Isolated Polypeptide Composition

The isolated polypeptide composition can be derived from renewable plant biomass, such as corn, wheat, sunflower, cotton, rapeseed, canola, castor, soy, camelina, flax, jatropha, mallow, peanuts, algae, sugarcane bagasse, tobacco, whey, or a combination thereof, using procedures described herein. The isolated polypeptide composition contains water-insoluble/water-dispersible protein fraction, optionally in combination with a water-soluble protein fraction. It is understood that the water-insoluble/water-dispersible protein fraction can disperse oils (for example, reactive oils, or an organic polyisocyanate, which is a reactive prepolymer). Thus, in embodiments where the isolated polypeptide composition contains a mixture of i) water-insoluble/water-dispersible protein fraction and ii) water-soluble protein fraction, the ratio of i) water-insoluble/water-dispersible protein fraction to ii) water-soluble protein fraction is such that the isolated polypeptide composition is able to disperse a prepolymer in an aqueous medium.

The terms "protein" and "polypeptide" are used synonymously and refer to polymers containing amino acids that are joined together, for example, via peptide bonds or other bonds, and may contain naturally occurring amino acids or modified amino acids. The polypeptides can be isolated from natural sources or synthesized using standard chemistries. The polypeptides may be modified or derivatized by either natural processes, such as post-translational processing, or by chemical modification techniques well known in the art. Modifications or derivatizations may occur anywhere in the polypeptide, including, for example, the peptide backbone, the amino acid side-chains and the amino or carboxyl termini. Modifications include, for example, cyclization, disulfide bond formation, demethylation, deamination, formation of covalent cross-links, formation of pyroglutamate, formylation, gamma-carboxylation, glycosylation, GPI anchor formation, hydroxylation, iodination, methylation, myristolyation, oxidation, pegylation, proteolytic digestion, phosphorylation, etc. As used throughout, the term "isolated" refers to material that is removed from its original environment (e.g., the natural environment if it is naturally occurring).

1. Preparation of Isolated Polypeptide Composition

The starting material for producing an isolated polypeptide composition can be derived from one or more of corn, wheat, sunflower, cotton, rapeseed, canola, castor, soy, camelina, flax, jatropha, mallow, peanuts, algae, sugarcane bagasse, tobacco, or whey. For example, the starting material for producing an isolated polypeptide composition can be plant meal or a protein isolate. Depending on the properties desired for the adhesive, the isolated polypeptide composition may contain a mixture of i) water-insoluble/water-dispersible protein fraction and ii) water-soluble protein fraction. The water-insoluble/water-dispersible protein fraction and the water-soluble protein fraction can be obtained from plant material using a Water Washing Method or an Acid Precipitation Method, such as those described in more detail below. In certain instances, the composition obtained from the Water Washing Method and or Acid Precipitation Method may be further modified by enzymatic digestion and/or chemical modification.

Water Washing Method

Water-insoluble/water-dispersible protein fraction can be isolated from plant meal (e.g., castor meal, soy meal, or canola meal) by washing with water to remove water-soluble proteins and water-soluble components. The residue left after the water wash is the water-insoluble/water-dispersible protein fraction. A water-soluble protein fraction can be isolated by concentrating aqueous extracts from the water washing. Plant meal used in the process can be ground to reduce particle size, which may, in certain instances, provide processing advantages.

Water-insoluble/water-dispersible protein fraction can also be isolated from, for example, soy protein isolate or from soy flour. The procedure involves washing the soy protein isolate or soy flour with water to remove water-soluble proteins and water-soluble components from the respective soy protein isolate or the water-flour mixture.

The water-insoluble/water-dispersible protein fraction described above may be used directly as a wet slurry in an adhesive composition, or it may be dried and optionally ground to form a particulate mixture.

In certain embodiments, the pH of the water used to wash the plant meal is about 7. In certain other embodiments, the pH of the water used to perform one or more of the washes may be alkaline. Conditions (e.g., number of water washes) for the Water Washing Method may be adjusted in order to maximize the performance properties of the water-insoluble/water-dispersible protein fraction, such as its ability to disperse an oil in water or water in oil.

The Water Washing Method is a simple and economical procedure for obtaining water-insoluble/water-dispersible protein fraction. Due to the simplicity of the method, it is contemplated that the Water Washing Method can be used to provide large quantities of water-insoluble/water-dispersible protein fraction for manufacture of adhesive compositions.

It is appreciated that the water-insoluble/water-dispersible protein fraction obtained using the Water Washing Method may, in certain instances, contain water-insoluble components in addition to water-insoluble protein. If the performance requirements of an adhesive require a water-insoluble/water-dispersible protein fraction having a larger amount of water-insoluble protein, then the Acid Precipitation Method can be used to prepare the water-insoluble/water-dispersible protein fraction.

Acid Precipitation Method

Water-insoluble/water-dispersible protein fraction comprising a relatively higher quantity of water-insoluble protein can be prepared using the Acid Precipitation Method. The Acid Precipitation Method is shown schematically in FIG. 1. This method can also be used to obtain water-soluble protein fraction.

As shown in FIG. 1, the starting material (for example, ground meal) is dispersed in alkaline, aqueous media at pH 6.5-13 for at least 5 minutes, at least 20 minutes, at least 40 minutes or at least 1 hour, to form a mixture. Starting materials include, for example, canola meal, canola protein isolate, castor meal, castor protein isolate, soy meal, or soy protein isolate, or a combination thereof. Then, the pH of the mixture is lowered by the addition of acid (to provide a mixture with a pH in the range of, for example, 4.0-5.0) to precipitate both a portion of water-soluble proteins and water-insoluble proteins. Then, the water-insoluble material (i.e., the precipitate) is harvested. The harvested material is washed with water and the remaining water-insoluble/water-dispersible material is harvested. The resulting water-insoluble/water-dispersible material can be used as is or dried using drying techniques known in the art.

Further, as shown in FIG. 1, the water-soluble proteins can be harvested at a number of places. For example, water-soluble proteins can be harvested after the starting material is mixed in aqueous media, after neutralization, and as a supernatant from the washing steps. The resulting protein can be used as is or dried using drying techniques known in the art.

The water-insoluble/water-dispersible material produced according to the method in FIG. 1 can disperse or emulsify oil in water or water in oil. The physical and chemical properties of the water-soluble/water-dispersible fraction are described in more detail below. In addition, the physical and chemical properties of the water-soluble protein fraction are described in more detail below.

Enzymatic Digestion/Chemical Hydrolysis

The Water Washing Method and Acid Precipitation Method can include one or more enzyme digestion and/or chemical hydrolysis steps. Digestion can be facilitated using one or more enzymes, and hydrolysis can be facilitated using one or more chemicals, for example, acid- or alkali-based hydrolysis. For example, in the Acid Precipitation Method, the starting material (for example, the ground meal) can be exposed to enzymatic digestion before or after, or both before and after the incubation of the starting material in the alkaline aqueous media. Alternatively, or in addition, an enzymatic digestion step can be performed on the material following addition of acid to provide a mixture with a pH in the range of 4.0 to 5.0. Alternatively, or in addition, the harvested water-insoluble/water-dispersible material can be exposed to enzymatic digestion prior to washing. Alternatively, or in addition, the material harvested after washing can be exposed to enzymatic digestion. Chemical hydrolysis, however, can occur with or replace the enzymatic digestion steps noted above.

Under certain circumstances residual basic species and alkali metals present in chemically digested proteins are not compatible with polyisocyanates and can cause trimerization of the isocyanate groups, leading to stability problems in the final polyisocyanate compositions. Enzymatic digestion, however, can be used to avoid or reduce isocyanate stability problems associated with some chemical hydrolysis steps.

It is understood that enzymes useful in the digestion of the protein fractions include endo- or exo-protease of bacterial, fungal, animal or vegetable origin or a mixture of thereof. Useful enzymes include, for example, a serine-, leucine-, lysine-, or arginine-specific protease. Exemplary enzymes include trypsin, chymotrypsins A, B and C, pepsin, rennin, microbial alkaline proteases, papain, ficin, bromelain, cathepsin B, collagenase, microbial neutral proteases, carboxypeptidases A, B and C, camosinase, anserinase, V8 protease from *Staphylococcus aureus* and many more known in the art. Also combinations of these proteases may be used.

Also commercially available enzyme preparations such as, for example, Alcalase®, Chymotrypsine 800s, Savinase®, Kannase®, Everlase®, Neutrase®, Flavourzyme® (all available from Novo Nordisk, Denmark), Protex 6.0L, Peptidase FP, Purafect®, Purastar OxAm®, Properase® (available from Genencor, USA), Corolase L10 (Rohm, Germany), Pepsin (Merck, Germany), papain, pancreatin, proleather N and Protease N (Amano, Japan), BLAP and BLAP variants available from Henkel, K-16-like proteases available from KAO, or combinations thereof. Table 1 describes the amino acid specificity of certain useful endonucleases.

TABLE 1

| No. | Amino Acid | Notation | Commercial Endopeptidase(s) |
|---|---|---|---|
| 1 | Alanine | A | Pronase ®; Neutrase ®: |
| 2 | Cysteine | C | Papain |
| 3 | Aspartic | D | Fromase ®; |
| 4 | Glutamic | E | Alcalase ®; |
| 5 | Phenylalanine | F | Neutrase ®: Fromase ® |
| 6 | Glycine | G | Flavorzyme ®; Neutrase ®: |
| 7 | Histidine | H | Properase ®; |
| 8 | Isoleucine | I | Neutrase ®: |
| 9 | Lysine | K | Alcalase ®; Trypsin; Properase ® |
| 10 | Leucine | L | Alcalase ®; Esperase ®; Neutrase ®: |
| 11 | Methionine | M | Alcalase ®; Neutrase ®: |
| 12 | Asparigine | N | Savinase ®; Flavourzyme ®; Duralase ®; |
| 13 | Proline | P | Pronase ®; Neutrase ®: |
| 14 | Glutamine | Q | Alcalase ® |
| 15 | Arginine | R | Trypsin; Properase ®; |
| 16 | Serine | S | Savinase ®; Flavourzyme ®; Duralase ®; |

TABLE 1-continued

| No. | Amino Acid | Notation | Commercial Endopeptidase(s) |
|---|---|---|---|
| 17 | Threonine | T | Savinase ®; Flavourzyme ®; Duralase ®; |
| 18 | Valine | V | Neutrase ®: |
| 19 | Tryptophane | W | Neutrase ®: Fromase ® |
| 20 | Tyrosine | Y | Alcalase ®; Esperase ®; Fromase ® |

Depending upon the choice of enzyme(s), enzymatic digestion usually is conducted under aqueous conditions at the appropriate pH conditions (for example, depending upon the enzyme or enzyme mixture at neutral or at low pH). In certain digestion systems, the digestion optimally occurs at a pH less than 9, or less than 8. For certain applications the pH of the aqueous protein digestion system is in the range of 3-9, 4-8 or 5-7.5.

Once digestion has proceeded to the desired extent, the resulting product optionally is washed and used as is or dried to form a powder. The drying can be performed by techniques known in the art, including spray drying, freeze drying, oven drying, vacuum drying, or exposure to desiccating salts (such as phosphorous pentoxide or lithium chloride).

Chemical Modification of Proteins

In certain embodiments, the proteins in the isolated protein fractions are further derivatized. Suitable processes for derivatization of the polypeptide fractions are provided in the literature. The nature and extent of modification will depend in large part on the composition of the starting material. The derivative can be produced by, for example, replacing at least a portion of primary amine groups of said isolated protein with hydroxyl groups, deaminating the protein, or replacing a portion of amide groups of the protein with carboxyl groups, etc. In other embodiments, the isolated polypeptide compositions described herein are obtained by reacting the protein with protein modifying agents, for example, nitrous oxide, nitrous acid, salts of nitrous acid, or a combination thereof.

2. Characterization of the Water-Insoluble/Water-Dispersible Protein Fraction

The water-insoluble/water-dispersible protein fraction can be characterized accordingly to multiple physical properties. For example, the water-insoluble/water-dispersible protein fraction can be characterized according to its capacity to disperse oil in water or water in oil. The water-insoluble/water-dispersible protein fraction should, at a minimum, disperse at least some oil in water or water in oil. The amount of oil that can be dispersed in water or the amount of water that can be dispersed in oil is a physical property that characterizes a water-insoluble/water-dispersible protein fraction.

The water-insoluble/water-dispersible protein fraction can also be characterized according to i) absortion band(s) observed by solid state FTIR, ii) molecular weight range of the proteins in the fraction, and iii) features in a solution state, two-dimensional proton-nitrogen coupled NMR spectrum of the fraction.

Accordingly, in certain embodiments, the water-insoluble/water-dispersible fraction is characterized by one or more of the following features: (i) a prominent amide-I absorption band between about 1620 $cm^{-1}$ and 1645 $cm^{-1}$, (ii) an amide-II band between approximately 1514 $cm^{-1}$ and 1545 $cm^{-1}$, as determined by solid state FTIR, and (iii) is capable of dispersing an oil-in-water or water-in-oil to produce a homogeneous emulsion that is stable for least 5 minutes.

In certain other embodiments, the water-insoluble/water-dispersible fraction is characterized by one or more of the following features: (i) an amide-I absorption band between about 1620 $cm^{-1}$ and 1642 $cm^{-1}$ and an amide-II band between approximately 1514 $cm^{-1}$ and 1540 $cm^{-1}$, as determined by solid state FTIR, (ii) a prominent 2° amide N—H stretch absorption band centered at about 3272 $cm^{-1}$, as determined by solid state FTIR, and (iii) is capable of dispersing an oil-in-water or water-in-oil to produce a homogeneous emulsion that is stable for least 5 minutes.

In certain other embodiments, the water-insoluble/water-dispersible fraction is characterized by one or more of the following features: (i) an amide-I absorption band between about 1620 $cm^{-1}$ and 1632 $cm^{-1}$ and an amide-II band between approximately 1514 $cm^{-1}$ and 1521 $cm^{-1}$, as determined by solid state FTIR, (ii) a prominent 2° amide N—H stretch absorption band centered at about 3272 $cm^{-1}$, as determined by solid state FTIR, (iii) an average molecular weight of between about 600 and about 2,500 Daltons (determined using, for example, MALDI mass spectrometry), (iv) two protonated nitrogen clusters defined by $^{15}N$ chemical shift boundaries at about 86.2 ppm and about 87.3 ppm, and $^{1}H$ chemical shift boundaries at about 7.14 ppm and 7.29 ppm for the first cluster, and $^{1}H$ chemical shift boundaries at about 6.66 ppm and 6.81 ppm for the second cluster, as determined by solution state, two-dimensional proton-nitrogen coupled NMR.

As described above, water-insoluble/water-dispersible fraction is capable of suspending or emulsifying oil in water or water in oil to produce a homogeneous suspension or emulsion stable, by visual inspection, for least 5 minutes. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the oil. As shown in Example 4, the water-insoluble/water-dispersible fraction is capable of emulsifying or dispersing a wide selection of oils, including, for example, an organic polyisocyanate (for example, PMDI) mineral oil, soybean oil, derivatized soybean oil, motor oil, castor oil, derivatized castor oil, dibutyl phthalate, epoxidized soybean oil, corn oil, vegetable oil, caprylic triglyceride, *Eucalyptus* oil, and tributyl o-acetylcitrate. In an exemplary assay, 14 parts (by weight) of a protein sample of interest is mixed with 86 parts (by weight) of water and the resulting solution or dispersion is mixed with 14 parts (by weight) of oil, for example, PMDI. Under these conditions, the water-insoluble/water-dispersible protein fraction produces a dispersion or emulsion that exhibits substantially no phase separation by visual inspection for at least 5 minutes after mixing the polypeptide composition with the oil. The assay can be performed with the other oils. Another assay that can be used involves mixing 26 parts (by weight) of a protein sample with 74 parts (by weight) of water. The resulting solution or dispersion is mixed with 26 parts (by weight) of oil, for example, PMDI. Under these conditions, the water-insoluble/water-dispersible protein fraction produces a dispersion or emulsion that exhibits substantially no phase separation by visual inspection for at least 5 minutes after mixing the polypeptide composition with the oil. This assay using 26 parts (by weight) of a protein can be performed with oils other than PMDI, such as the oils described above in connection with the assay using 14 parts (by weight) of protein sample.

In certain other embodiments, the water-insoluble/water-dispersible fraction is further characterized by its ability to emulsify or disperse, in water, one or more of the following hydrophobic liquids and hydrophobic solids: a silicone (e.g., a silicone oil or a silicone gel), a fluorocarbon (e.g., a solid wax fluorocarbon or a liquid oil fluorocarbon), a fluorinated polyol, a wax (e.g., a solid carboxylic acid ester (e.g., an ester of stearic acid), a salt of a carboxylic acid (e.g., a salt of stearic acid, e.g., zinc stearate), a hydrocarbon wax, and a fluorinated hydrocarbon wax), a liquid carboxylic acid ester that is hydrophobic, and a liquid hydrocarbon.

In yet other embodiments, the water-insoluble/water-dispersible fraction is further characterized by its ability to emulsify or disperse one or more of the following agents in water: BE Square 165 Amber Petroleum Microcrystalline Wax from Baker Hughes, Inc.; limonene; FluoroLink D-10 Fluorinated polyol from Solvay Solexis, Inc; Tego Protect-5000 functionalized silicone fluid from Evonik Tego Chemie GmbH; Soy Lecithin; Castor Oil; Zinc Stearate; Dow Corning FS-1265 Fluid, 300 cST (Trifluoropropyl Methicone) from Dow Corning; and T-Sil-80, hydroxy terminated polydimethylsiloxane from Siovation, Inc.

In yet other embodiments, the water-insoluble/water-dispersible fraction is further characterized by its ability to emulsify or disperse an amalgam comprising a partially exfoliated clay in an oil carrier. In yet other embodiments, the water-insoluble/water-dispersible fraction is further characterized by its ability to emulsify or disperse a melted wax in water. In certain embodiments, the dispersion or emulsion exhibits substantially no phase separation by visual inspection for at least 10, 15, 20, 25, or 30 minutes, or even 1, 2, 3, 4, 5, 6, 9, 12, 18, or 24 hours after mixing the polypeptide composition with the agent.

In certain embodiments, the water-insoluble/water-dispersible fraction is substantially free of primary amines, carboxylic acids, amine salts, and carboxylate salts.

The water-insoluble/water-dispersible protein fraction can act as a surfactant to an organic polyisocyanate (e.g., PMDI), lowering interfacial tension to the point where the water insoluble organic polyisocyante is readily emulsified with minimal energy input, creating an oil-in-water or water-in-oil emulsion. When the source material is a whole meal or a protein isolate derived from soy, castor or canola, a stable emulsion can be obtained using undigested substantially insoluble (fractionated) protein. In certain embodiments, a stable emulsion of polyisocyanate (e.g., PMDI) in water can be achieved when the isolated fractionated polypeptide is comprised of a water-insoluble/water-dispersible fraction, either alone, or in combination with a water soluble component. The acceptable level of the water-soluble component will depend in large part upon the adhesive performance characteristics that are needed for the end-use application.

Under certain circumstances, for example, an adhesive prepared with digested castor protein extracted from castor meal, the process of isolating and digesting a protein can lead to a polypeptide composition that implicitly contains both water-soluble and water-insoluble fractions at ratios sufficient to simultaneously disperse oil in water. The process of digesting a whole meal can lead to a mixture that includes a polypeptide composition that implicitly contains both water-soluble and water-insoluble fractions at ratios sufficient to simultaneously disperse oil in water. Where the process of digestion or extraction does not lead to a polypeptide composition that implicitly comprises both water-soluble and water-insoluble fractions at ratios which are sufficient to simultaneously disperse oil in water while yielding high bond strength adhesives, an additional fractionation step can be used to isolate sufficient levels of the water-insoluble/water-dispersible fraction from the polypeptide composition, so that the ratio of the water-insoluble fraction to the water-soluble fraction can be adjusted in the formulated adhesive for the purpose of achieving the desired combination of end-use properties. In certain embodiments, it may be desirable to obtain an isolated polypeptide composition containing very little or no water-soluble protein fraction, such as through water washing of plant meal, optimization of the Acid Precipitation Method, or enzymatic digestion to reduce the amount of water-soluble protein.

The isolated polypeptide composition obtained using the Water Washing Method may contain a mixture of i) water-insoluble/water-dispersible protein fraction and ii) water-soluble protein fraction. Depending on the composition of the protein source material (e.g., soy meal, castor meal, or canola meal), the isolated polypeptide composition obtained using the Water Washing Method may contain a sufficient amount of water-insoluble/water-dispersible protein fraction to disperse oil or water. If, however, the isolated polypeptide composition obtained using the Water Washing Method contains insufficient water-insoluble/water-dispersible protein fraction, then higher purity water-insoluble/water-dispersible protein fraction obtained from the Acid Precipitation Method can be added to the isolated polypeptide composition in order to increase the relative amount of water-insoluble/water-dispersible protein fraction.

In certain embodiments, the polypeptide fractions used in the compositions and methods provided herein, can have a weight average molecular weight of between about 500 and 25,000 Daltons. Useful polypeptide fractions can have a weight average molecular weight of between about 500 and 2,500 Daltons, between about 700 and 2,300 Da., between about 900 and 2,100 Da., between about 1,100 and 1,900 Da., between about 1,300 and 1,700 Da., or between about 1,000 and 1,300 Da., between about 2,000 and 2,500 Da., or between about 1,000 and 2,500 Da.

In certain embodiments, the water-insoluble/water-dispersible protein fraction provides a stable emulsion, dispersion or suspension, for example, an aqueous emulsion, dispersion or suspension, comprising from about 1% to about 90% (w/w) of an oil and from about 1% to about 99% (w/w) of an isolated polypeptide composition, wherein the isolated polypeptide composition produces a stable emulsion or dispersion of the oil in an aqueous medium. The aqueous emulsion, dispersion or suspension optionally comprises from about 1% to about 50% (w/w) of oil and from about 1% to about 99% (w/w) of the isolated polypeptide composition. The term "stable" when used in reference to the emulsions, suspensions and dispersions refers to the ability of the polypeptide fraction described herein to create a kinetically stable emulsion for the duration of the intended application of the dispersion or emulsion. The terms "emulsion," "dispersion," and "suspension" are used interchangeably herein.

In certain embodiments, the polypeptide composition has a polydispersity index (PDI) of between about 1 and 1.15. In certain embodiments, the PDI of the adhesives provided created using the polypeptides described herein is between about 1 and about 3, between 1 and 1.5, between 1.5 and 2, between 2 and 2.5, between 2.5 and 3, between 1 and 2, between 1.5 and 2.5, or between 2 and 3.

3. Characterization of Water-Soluble Protein Fraction

The water-soluble protein fractions, for example, the water-soluble protein fractions isolated pursuant to the protocol set forth in FIG. 1, are substantially or completely soluble in water.

The water-soluble protein fractions have one or more of the following six features. (i) An amide-I absorption band between about 1633 cm$^{-1}$ and 1680 cm$^{-1}$, as determined by solid state FTIR. (ii) An amide-II band between approximately 1522 cm$^{-1}$ and 1580 cm$^{-1}$, as determined by solid state FTIR. (iii) Two prominent 1° amide N—H stretch absorption bands in the range of from about 3100-3200 cm$^{-1}$, and in the range of from about 3300-3400 cm$^{-1}$, as determined by solid state FTIR. (iv) A prominent cluster of protonated nitrogen nuclei defined by $^{15}$N chemical shift boundaries at about 94 ppm and about 100 ppm, and $^1$H chemical shift boundaries at about 7.6 ppm and 8.1 ppm, as determined by solution state, two-dimensional proton-nitrogen coupled NMR. (v) An average molecular weight of between about 600 and about 2,500 Daltons, for example, as determined by MALDI. (vi) An inability to stabilize an oil-in-water or water-in-oil dispersion or emulsion, where the water and oil components of the mixture form an unstable suspension that macroscopically phase separates under static conditions within five minutes after mixing. This can be tested by dissolving or dispersing 14 parts (by weight) of a protein sample of interest in 86 parts (by weight) of water and then mixing the resulting solution with 14 parts (by weight) of oil, for example, PMDI. Under these conditions, a water-soluble protein is characterized by an inability to stabilize an oil-in-water emulsion, where the oil and water components form an unstable suspension that macroscopically phase separates under static conditions within five minutes after mixing. Another procedure for evaluating the inability of a protein sample to stabilize an oil-in-water or water-in-oil dispersion or emulsion is to mix 26 parts by weight of a water-soluble protein-containing fraction isolated from whole ground meal in 74 parts (by weight) of water, and then mix the resulting solution with 26 parts (by weight) of oil, for example, PMDI. Under these conditions, a water-soluble protein-containing fraction is characterized by an inability to stabilize an oil-in-water emulsion, where the oil and water components form an unstable suspension that macroscopically phase separates under static conditions within five minutes after mixing.

VII. Reactive Prepolymer

The adhesive compositions may optionally comprise a reactive prepolymer. The term "prepolymer" is understood to mean a compound, material or mixture that is capable of reacting with a plant protein composition described herein to form an adhesive polymer. Exemplary prepolymers include, for example, isocyanate-based prepolymers, epoxy-based prepolymers, and latex prepolymers. Further exemplary prepolymers include an organic polyisocyanate; a reaction product between an organic polyisocyanate and a polypeptide, a polyol, an amine based polyol, an amine containing compound, a hydroxy containing compound, or a combination thereof; an epoxy containing compound; a reaction product between an epoxy containing compound and a polypeptide, a polyol, an amine based polyol, an amine containing compound, a hydroxy containing compound, or a combination thereof; an organosilane; a polymer latex; a polyurethane; and a mixture thereof.

The term "prepolymer" includes full prepolymers and partial prepolymers (referred to as semiprepolymers, pseudoprepolymers, or quasiprepolymers in certain embodiments). One example of a quasi prepolymer is a NCO-terminated product prepared from a diisocyanate and polyol in which the prepolymer is a mixture of (i) a product prepared from the diisocyanate and polyol, and (ii) unreacted diisocyanate. On the other hand, an example of a full prepolymer is the product formed by reacting an isocyanate with a particular polyol blend so that there are substantially no residual monomeric isocyanates in the finished product.

An isocyanate-based prepolymer can be an organic polyisocyanate, which can be (i) a polyisocyanate (or monomeric diisocyanate) that has not been reacted with another compound, (ii) a polyisocyanate modified by various known self-condensation reactions of polyisocyanates, such as carbodiimide modification, uretonimine modification, trimer (isocyanurate) modification or a combination thereof, so long as the modified polyisocyanate still contains free isocyanate groups available for further reaction, or (iii) the product formed by reaction of a polyisocyanate base with a compound having nucleophilic functional groups capable of reacting with an isocyanate group. Exemplary compounds containing a nucleophilic functional group capable of reacting with an isocyanate group include a polypeptide (for example, one or more of the protein fractions described herein), a polyol, an amine based polyol, an amine containing compound, a hydroxy containing compound, carboxylic acid containing compound, carboxylate salt containing compound, or a combination thereof. The term "polyisocyanate" refers to difunctional isocyanate species, higher functionality isocyanate species, and mixtures thereof.

One desirable feature of an isocyanate-based prepolymer is that the prepolymer remain stable enough for storage and use, desirably liquid and of reasonable viscosity at ambient temperatures (25° C.), and contains free isocyanate (—NCO) groups which can participate in forming adhesive bonds.

As noted above, the organic polyisocyanate can be prepared from a "base polyisocyanate." The term "base isocyanate" as used herein refers to a monomeric or polymeric compound containing at least two isocyanate groups. The particular compound used as the base polyisocyanate can be selected so as to provide an adhesive having certain desired properties. For example, base polyisocyanate can be selected based on the number-average isocyanate functionality of the compound. For example, in certain embodiments, the base polyisocyanate can have a number-average isocyanate functionality of 2.0 or greater, or greater than 2.1, 2.3 or 2.4. In certain embodiments, the reactive group functionality of the polyisocyanate component ranges from greater than 1 to several hundred, 2 to 20, or 2 to 10. In certain other embodiments, the reactive group functionality of the polyisocyanate component is at least 1.9. In certain other embodiments, the reactive group functionality of the polyisocyanate component is about 2. Typical commercial polyisocyanates (having an isocyanate group functionality in the range of 2 to 3) may be pure compounds, mixtures of pure compounds, oligomeric mixtures (an important example being polymeric MDI), and mixtures of these.

Useful base polyisocyanates have, in one embodiment, a number average molecular weight of from about 100 to about 5,000 g/mol, from about 120 to about 1,800 g/mol, from about 150 to about 1,000 g/mol, from about 170 to about 700 g/mol, from about 180 to about 500 g/mol, or from about 200 to about 400 g/mol. In certain other embodiments, at least 80 mole percent or, greater than 95 mole percent of the isocyanate groups of the base polyisocyanate composition are bonded directly to an aromatic group. In certain embodiments, the adhesives described herein have a concentration of free organically bound isocyanate (—NCO) groups in the range of from about 5% to 35% (wt/wt), about 7% to 31% (wt/wt), 10% to 25% (wt/wt), 10% to 20% (wt/wt), 15% to 27% (wt/wt).

In certain embodiments, the base polyisocyanate is an aromatic polyisocyanate, such as p-phenylene diisocyanate; m-phenylene diisocyanate; 2,4-toluene diisocyanate; 2,6-toluene diisocyanate; naphthalene diisocyanates; dianisidine diisocyanate; polymethylene polyphenyl polyisocyanates; 2,4'-diphenylmethane diisocyanate (2,4'-MDI); 4,4'-diphenylmethane diisocyanate (4,4'-MDI); 2,2'-diphenylmethane diisocyanate (2,2'-MDI); 3,3'-dimethyl-4,4'-biphenylenediisocyanate; mixtures of these; and the like. In certain embodiments, polymethylene polyphenyl polyisocyanates (MDI series polyisocyanates) having a number averaged functionality greater than 2 are utilized as the base polyisocyanate.

In certain embodiments, the MDI base polyisocyanate comprises a combined 2,4'-MDI and 2,2'-MDI content of less than 18.0%, less than 15.0%, less than 10.0%, or less than 5.0%.

In certain other embodiments, the MDI diisocyanate isomers, mixtures of these isomers with tri- and higher functionality polymethylene polyphenyl polyisocyanates, the tri- or higher functionality polymethylene polyphenyl polyisocyanates themselves, and non-prepolymer derivatives of MDI series polyisocyanates (such as the carbodiimide, uretonimine, and/or isocyanurate modified derivatives) are utilized as polyisocyanates for use as the base polyisocyanate. In certain other embodiments, the base polyisocyanate composition comprises an aliphatic polyisocyanate (e.g., in a minor amount), e.g., an aliphatic polyisocyanate comprising an isophorone diisocyanate, 1,6-hexamethylene diisocyanate, 1,4-cyclohexyl diisocyanate, or saturated analogues of the above-mentioned aromatic polyisocyanates, or mixtures thereof.

In certain other embodiments, the base polyisocyanate comprises a polymeric polyisocyanate, e.g., a polymeric diphenylmethane diisocyanate (polymethylene polyphenyl polyisocyanate) species of functionality 3, 4, 5, or greater. In certain embodiments, the polymeric polyisocyanates of the MDI series comprise RUBINATE-M® polyisocyanate, or a mixture of MDI diisocyanate isomers and higher functionality oligomers of the MDI series. In certain embodiments, the base polyisocyanate product has a free —NCO content of about 31.5% by weight and a number averaged functionality of about 2.7.

In certain embodiments, the isocyanate group terminated prepolymers are urethane prepolymers. These can be produced by reaction of a hydroxyl-functional compound with an isocyanate functional compound. In certain other embodiments, allophanate prepolymers are utilized. Allophanate prepolymers typically require higher temperatures (or allophanate catalysts) to facilitate reaction of the polyol with the polyisocyanate to form the allophanate prepolymer.

Polyisocyanates used in the compositions described can have the formula $R(NCO)_n$, where n is 2 and R can be an aromatic, a cycloaliphatic, an aliphatic, each having from 2 to about 20 carbon atoms. Examples of polyisocyanates include, but are not limited to, diphenylmethane-4,4'-diisocyanate (MDI), toluene-2,4-diisocyanate (TDI), toluene-2,6-diisocyanate (TDI), methylene bis(4-cyclohexylisocyanate (CHMDI), 3-isocyanatomethyl-3,5,5-trimethylcyclohexyl isocyanate (IPDI), 1,6-hexane diisocyanate (HDI), naphthalene-1,5-diisocyanate (NDI), 1,3- and 1,4-phenylenediisocyanate, triphenylmethane-4,4',4"-triisocyanate, polymeric diphenylmethane diisocyanate (PMDI), m-xylene diisocyanate (XDI), 1,4-cyclohexyl diisocyanate (CHDI), isophorone diisocyanate, isomers, dimers, trimers and mixtures or combinations of two or more thereof. The term "PMDI" encompasses PMDI mixtures in which monomeric MDI, for example 4,4'-, 2,2'- and/or 2,4'-MDI, is present. PMDI is, in one embodiment, prepared by phosgenation of the corresponding PMDA in the presence of an inert organic solvent. PMDA is in turn obtained by means of an acid aniline-formaldehyde condensation which can be carried out industrially either continuously or batchwise. The proportions of diphenylmethanediamines and the homologous polyphenylpolymethylenepolyamines and their positional isomerism in the PMDA are controlled by selection of the ratios of aniline, formaldehyde and acid catalyst and also by means of a suitable temperature and residence time profile. High contents of 4,4'-diphenylmethanediamine together with a simultaneously low proportion of the 2,4' isomer of diphenylmethanediamine are obtained on an industrial scale by the use of strong mineral acids such as hydrochloric acid as catalyst in the aniline-formaldehyde condensation.

Accordingly, in certain more specific embodiments, the reactive prepolymer is a polyisocyanate-based prepolymer, an epoxy-based prepolymer, a latex-based prepolymer, a latex prepolymer, or a combination thereof. In certain other embodiments, the reactive prepolymer is a polyisocyanate-based prepolymer. In certain other embodiments, the polyisocyanate-based prepolymer is an organic polyisocyanate; or a reaction product between an organic polyisocyanate and a polypeptide, a polyol, an amine based polyol, an amine containing compound, a hydroxy containing compound, or a combination thereof. In certain other embodiments, the reactive prepolymer is polymeric diphenylmethane diisocyanate.

The epoxy-based prepolymer can be an epoxide containing compound. Alternatively, the epoxy-based prepolymer can be a reaction product between an epoxy and a polypeptide, a polyol, an amine based polyol, an amine containing compound, a hydroxy containing compound, or a combination thereof.

In certain embodiments, the composition is an epoxy resin comprising free epoxy groups. Alternatively, the epoxy resin composition is prepared by combining a precursor epoxy resin composition with the isolated and fractionated polypeptide compositions described herein. The epoxy resin composition can comprise derivatives of digested proteins as described herein.

Epoxy resins refer to molecular species comprising two or more epoxide (oxirane) groups per molecule. Epoxy resins can contain mono-epoxides as reactive diluents, but the main constituents by weight of such resins are still di- and/or higher functionality species (containing two or more epoxide groups per molecule).

Epoxy resins useful as precursor epoxy resins can include those which comprise difunctional epoxide and/or higher functionality polyepoxide species. Precursor epoxy resins include but are not limited to diglycidyl ether of bisphenol-A, diglycidyl ethers of bisphenol-A alkoxylates, epoxy novolac resins, expoxidized soy oil, epoxidized linseed oil, epichlorohydrin, a glycidyl ether type epoxy resin derived from a polyphenol by reaction with epichlorohydrin, and combinations thereof. In another embodiment, precursor epoxy resins are modified by combining them with the polypeptide compositions described herein, either in bulk or in aqueous suspension.

The modified epoxy resins can be used in multi-part mixing-activated adhesive formulations. Alternatively, multi-part formulations can comprise polyisocyanates and/or known amine based epoxy curatives as additional components. Alternatively, modified epoxy resins can be used with any cure catalysts or other additives known in the epoxy resin art. The polypeptide compositions described herein contain functional groups which react with epoxide groups in the epoxy resin. The extent of this reaction depends upon the preparative conditions, use or non-use of catalysts, the specific resins and protein component described herein selected, etc.

An important subset of epoxy resins can be made by reacting a precursor polyol with an epihalohydrin, such as epichlorohydrin. The products of the reaction are called glycidyl ethers (or sometimes as polyglycidyl ethers or diglycidyl ethers). In certain embodiments, all the hydroxyl groups in the precursor polyols are converted to the corresponding glycidyl ethers.

An important class of glycidyl ether type epoxy resins are derived from polyphenols, by reaction with epichlorohydrin. The starting polyphenols are di- or higher functionality phenols. Industrially important examples of this type of epoxy resin comprise, for example, diglycidyl ether of bisphenol-A (also known as DGEB-A); diglycidyl ether of 2,6,2',6'-tetrachloro bisphenol A; diglycidyl ether of bisphenol-F (DGEB-F); epoxidized novolac resins; mixtures of these, and the like.

Partially or fully saturated (hydrogenated) analogs of these epoxy resins may also be used. A non limiting example of a known saturated epoxy resin of this type is DGEB-H, which is the fully hydrogenated (ring saturated) aliphatic analog of DGEB-A.

Amines, which contain active hydrogen atoms may also be reacted with epichlorohydrin to form epoxy resins. Examples of these types of resins include, for example, N,N,N',N'-tetraglycidyl diphenylmethane diamine (such as the 4,4' isomer); p-glycidyloxy-N,N-diglycidylaniline; N,N-diglycidylaniline; mixtures of these; and the like.

Heterocyclic nitrogen compounds that contain active hydrogen atoms may likewise be converted into the corresponding epoxy resins by reaction with epichlorohydrin. Non limiting examples of such resins include, for example, N,N',N"-triglycidyl isocyanurate; N,N'-diglycidyl-5,5-dimethylhydantoin; mixtures of these; and the like.

Many other kinds of epoxy resins are known which are not made by reaction of an active hydrogen precursor with an epihalohydrin. Non-limiting examples of these types of epoxy resins, known in the art, include, for example, dicyclopentadiene diepoxide (also known as DCPD dioxide), vinycyclohexene diepoxide (dioxide), epoxidized polyunsaturated vegetable oils (such as epoxidized linseed oil, epoxidized soy oil, etc.), epoxidized polydiene resins (such as epoxidized polybutadienes), 3,4-epoxy-6-methyl cyclohexylmethyl-3,4-epoxy-6-methyl cyclohexane carboxylate, mixtures of these, and the like. In principle, any precursor molecule which contains two or more units of reactive aliphatic "C═C" unsaturation per molecule might be converted into an epoxy resin.

It should be understood that any of the base epoxy resins known in the art, such as those listed above, are frequently modified with diluents, flexibilizers, and/or other additives. The optional possibility of using one or more known art modifiers or additives, in addition to the required protein derivatives, is within the level of skill in the art. Those skilled in the art of formulating adhesive systems using epoxy resins will appreciate how and when to use known optional additives and modifiers.

In addition, the prepolymers can include one, two or more polyol compounds. Exemplary polyol compounds include an amine alkoxylate, polyoxypropylene glycol, propylene glycol, polyoxyethylene glycol, polytetramethylene glycol, polyethylene glycol, propane diol, glycerin, or a mixture thereof.

Polyols useful in preparing the adhesives described herein include all known polyols, for example, polyols used in the polyurethanes art. In certain embodiments, the polyol comprises primary and/or secondary hydroxyl (i.e., —OH) groups. In certain other embodiments, the polyol comprises at least two primary and/or secondary hydroxyl (i.e., —OH) groups per molecule. Mono functional alcohols (such as aliphatic alcohols, aromatic alcohols, or hydroxyl functional monomers such as hydroxyl functional acrylates (to yield UV or thermally curable materials) can be used to cap an isocyanate group. In certain other embodiments, the polyol comprises a hydroxyl (i.e., —OH) group functionality between 1.6 and 10, between 1.7 to 6, between 2 to 4, or between 2 to 3. In certain other embodiments, the weight average molecular weight range for the optional polyols is from 100 to 10,000 g/mol, from 400 to 6,000 g/mol, or from 800 to 6,000 g/mol.

In certain other embodiments, useful polyols are polyester polyols or polyether polyols, such as an aliphatic polyether polyol. One exemplary aliphatic polyether polyol is polyoxypropylene glycol, with a number average molecular weight in the range of from 1,500 to 2,500 g/mol.

In certain embodiments, the total amount of all polyol, or polyols, in the isocyanate reactive component is from 1% to 80%, or from 3% to 70%, or from 5% to 60% by weight of the total.

In certain other embodiments, alkanolamines comprising primary, secondary, and/or tertiary amine groups can be used.

In certain embodiments, useful water-dispersible polymer latexes can include latexes of polymethylmethacrylate and its copolymers, latexes of polymethacrylate and its copolymers, latexes of polyvinylchloride and its copolymers, latexes of polyvinylacetate and its copolymers, polyvinyl alcohol and its copolymers, etc.

Further, as discussed above, the prepolymer species can comprise a terminated isocyanate. Here, for example, a polyol is reacted with the base polyisocyanate composition prior to or during mixing with the polypeptide fractions herein. Those skilled in the art will recognize many variations on the use of optional prepolymers in preparing wood adhesive compositions.

The amount of reactive prepolymer used in the adhesive compositions can be selected based on the desired properties of the adhesive composition. For example, when optimizing the viscosity of a one-part adhesive, the ratio of prepolymer (e.g., PMDI, Epoxy and the like) to protein component (i.e., ground plant meal or isolated polypeptide composition) can be from about 10:1 and 4:1 in order to form an adhesive composition that is relatively less viscous.

VIII. Additives

One or more additives can be included in the adhesive composition in order to achieve particular performance properties. Exemplary additives include an intercalated clay, partially exfoliated clay, exfoliated clay, cellulose nanoparticles, catalysts, tacking agents, extenders, fillers, viscosifying agents, surfactants, adhesion promoters, antioxidants, antifoaming agents, antimicrobial agents, antibacterial agents, fungicides, pigments, inorganic particulates, gelling agents, cross-linking agents, agents that improve moisture resistance, pH modulators, composite-release promoters, fire retardants, and wood preservatives.

In certain embodiments, the additive is a water-dispersible additive or a water-soluble additive. Water-soluble additives include hydroxyl-functional or amine-functional compounds (such as glycerin, propylene glycol, polypropylene glycol, polyethylene glycol, trimethylol propane and its adducts, phenols, polyphenols, etc.). One benefit of using glycerin and various low-viscosity polyols is that they allow less water to be used in the adhesive composition. Reducing the amount of water, while retaining a low-viscosity adhesive composition, desirably reduces the risk that the composite formed therefrom is damaged by steam generated during formation of the composite at high temperature.

In certain other embodiments, the additive is a non-volatile (e.g., having a boiling point of greater than about 180° C. at 760 mmHg), inert viscosity-reducing diluent. In yet other embodiments, the additive is an antioxidant, antifoaming agent, anti-bacterial agent, fungicide, pigment, viscosifying agent, gelling agent, aereosolozing agent, inorganic particulate (e.g., titanium dioxide, yellow iron oxide, red iron oxide, black iron oxide, zinc oxide, aluminum oxide, aluminum trihydrate, calcium carbonate), clay such as montmorillonite, a wetting agent, and the like.

In certain embodiments, the additive is an agent that improves moisture-resistance. In certain other embodiments, the additive is a composite-release promoter (such as a composite-release promoter selected from the group consisting of a $C_{10-25}$ alkanoic acid, a salt of a $C_{10-25}$ alkanoic acid, a $C_{10-25}$ alkenoic acid, a salt of an $C_{10-25}$ alkenoic acid, and a silicone). In certain other embodiments, the additive is a pH modulator. In certain other embodiments, the additive is a fire retardant or wood preservative. In certain other embodiments, the additive is a fire retardant, wood preservative, antimicrobial agent, antibacterial agent, or fungicide, any of which may be in the form of nanoparticles.

Exemplary classes of additives are described in more detail in the sections below.

Intercalated Clay

Intercalated clays can be obtained from commercial sources or prepared by exposing a clay to an intercalating agent. Exemplary types of clay that may be converted to intercalated form include, for example, smectite clays, illite clays, chlorite clays, layered polysilicates, synthetic clays, and phyllosilicates. Exemplary specific clays that may be converted to intercalated form include, for example, montmorillonite (e.g., sodium montmorillonite, magnesium montmorillonite, and calcium montmorillonite), beidellite, pyrophyllite, talc, vermiculite, sobockite, stevensite, svinfordite, sauconite, saponite, volkonskoite, hectorite, nontronite, kaolinite, dickite, nacrite, halloysite, hisingerite, rectorite, tarosovite, ledikite, amesite, baileychlore, chamosite, clinochlore, kaemmererite, cookeite, corundophilite, daphnite, delessite, gonyerite, nimite, odinite, orthochamosite, penninite, pannantite, rhipidolite, prochlore, sudoite, thuringite, kanemite, makatite, ilerite, octosilicate, magadiite, and kenyaite. In certain embodiments, the clay converted to intercalated form is montmorillonite.

Exemplary intercalating agents include, for example, quaternary amine compounds (such as a tetra-alkylammoniun salt), polymers (e.g., a polycaprolactone, maleated polyethylene, or maleated polypropylene) an acrylic monomer, phosphonium compounds, arsonium compounds, stibonium compounds, oxonium compounds, sulfonium compounds, polypropene, fatty acid esters of pentaerythritol, a steroyl citric acid ester, and alcohols (such as aliphatic alcohols, aromatic alcohols (e.g., phenols), aryl substituted aliphatic alcohols, alkyl substituted aromatic alcohols, and polyhydric alcohols).

Intercalated clays can be characterized by, for example, the following physical properties: interlayer spacing, d-spacings, clay particle size, particle size distribution, peak degradation temperature, and thickness of layers. Exemplary physical property features for intercalated clays contemplated to be amenable for use in the present invention include, for example, one or more of the following: (i) an intercalated clay having an interlayer spacing of about 0.5 Å to about 100 Å (or about 1 Å to about 20 Å), (ii) a mean particle size of about 1 μm to about 150 μm (or about 20 μm to about 100 μm), (iii) a particle size distribution where about 90 percent to about 50 percent of the intercalated clay particles have a particle size of from about 20 μm to about 100 μm (or about 85 percent to about 65 percent of the intercalated clay particles have a particle size of about 20 μm to about 100 μm), (iv) a peak degradation temperature of about 200° C. to about 600° C. (or from about 300° C. to about 500° C.), and (v) layers in the intercalated clay have a thickness of about 0.5 Å to about 100 Å (or about 5 Å to about 50 Å).

In certain other embodiments, the intercalated clay is intercalated montmorillonite having a particle size of less than about 500 nm, or less than about 100 nm. In certain other embodiments, the intercalated clay is intercalated montmorillonite having a particle size of about 60 nm to about 400 nm.

The clay (e.g., an intercalated clay) may be surface treated with an organic compound, such as a hydrophobic organic compound or hydrophilic organic compound, in order to promote dispersion of the clay in a formulation, such as an adhesive composition described herein. Surface treatment methods and compositions are described in the literature and are contemplated to be amenable for use in the present invention.

Different intercalated clays may impart different performance properties to the adhesive composition. Accordingly, in certain embodiments, the intercalated clay is an intercalated smectite. In certain other embodiments, intercalated clay is a smectite that has been intercalated with a quaternary ammonium compound. In certain other embodiments, the intercalated clay is an intercalated montmorillonite. In yet other embodiments, the intercalated clay is montmorillonite intercalated with a dimethyl-di($C_{14}$-$C_{18}$)alkyl ammonium salt.

Exfoliated Clay & Partially Exfoliated Clay

Exfoliated clay or a partially exfoliated clay can be prepared by exposing an intercalated clay to exfoliation conditions using procedures described in the literature. One procedure for preparing a partially exfoliated clay is to subject an intercalated clay to high shear mixing and/or sonication (e.g., using ultrasound) until the intercalated clay has partially exfoliated. The procedure may be performed by placing the intercalated clay (e.g., quaternary amine intercalated montmorillonite) in a hydrophobic liquid medium (such as mineral oil, soy oil, castor oil, silicone oil, a terpene (e.g., limonene), plant oil alkyl esters (e.g., soy methyl ester and canola methyl ester), mixtures thereof (e.g., a mixture of a silicone oil and limonene), etc.) to form a mixture, and then subjecting the mixture to high shear mixing and/or ultrasound until the intercalated clay has partially exfoliated. Partial exfoliation occurs when clay platelets separate from the intercalated clay particles. Partial exfoliation can be observed macroscopically in many instances because it can cause a low viscosity mixture of intercalated clay and hydrophobic liquid medium to form a gel. This gel can be added to protein adhesives or components used to form a protein adhesive described herein. Alternatively, the intercalated clay may be added to a protein adhesive composition, and the protein adhesive composition is subjected to exfoliation conditions to generate the partially exfoliated clay in situ.

An exfoliated clay can be prepared by exposing an intercalated clay to high shear mixing and/or sonication (e.g., using ultrasound) until substantially all (e.g., greater than 90% w/w, 95% w/w, or 98% w/w) the intercalated clay has exfoliated. The exfoliation procedure can be performed by placing the intercalated clay (e.g., quaternary amine intercalated montmorillonite) in a hydrophobic liquid medium (such as mineral oil, soy oil, castor oil, silicone oil, a terpene (e.g., limonene), plant oil alkyl esters (e.g., soy methyl ester and canola methyl ester), mixtures thereof (e.g., a mixture of a silicone oil and limonene), etc.) to form a mixture, and then subjecting the mixture to high shear mixing and/or sonication (e.g., using ultrasound) until substantially all the intercalated clay has exfoliated. Alternatively, the intercalated clay may be added to a protein adhesive composition, and the protein adhesive composition is subjected to exfoliation conditions to generate the exfoliated clay in situ. Alternatively, a clay (such as sodium montmorrilonite) may be added to an adhesive composition, together with a quaternary ammonium compound, and optionally together with a satisfactory oil carrier (e.g., one that has the ability to solvate the quaternary compound), and the resulting adhesive composition is subjected to conditions to intercalate the clay and to generate the exfoliated clay or partially exfoliated clay in situ. In addition, if so desired, the quaternary ammonium compound can be pre-dissolved in the oil carrier before it is added to the adhesive composition together with a clay.

Exemplary partially exfoliated clays contemplated to be amenable for use in present invention include partially exfoliated forms of smectite clay, illite clay, chlorite clay, layered polysilicates, synthetic clay, and phyllosilicates. Exemplary specific partially exfoliated clays contemplated to be amenable for use in present invention include partially exfoliated forms of, for example, montmorillonite (e.g., sodium montmorillonite, magnesium montmorillonite, and calcium montmorillonite), beidellite, pyrophyllite, talc, vermiculite, sobockite, stevensite, svinfordite, sauconite, saponite, volkonskoite, hectorite, nontronite, kaolinite, dickite, nacrite, halloysite, hisingerite, rectorite, tarosovite, ledikite, amesite, baileychlore, chamosite, clinochlore, kaemmererite, cookeite, corundophilite, daphnite, delessite, gonyerite, nimite, odinite, orthochamosite, penninite, pannantite, rhipidolite, prochlore, sudoite, thuringite, kanemite, makatite, ilerite, octosilicate, magadiite, and kenyaite. In certain embodiments, the partially exfoliated clay is partially exfoliated clay montmorillonite.

A partially exfoliated clay can be characterized by, for example, the amount of clay particles that are in the form of platelets. In certain embodiments, about 0.1% w/w to about 40% w/w, about 0.1% w/w to about 20% w/w, about 0.1% w/w to about 10% w/w, about 0.1% w/w to about 5% w/w, or about 5% w/w to about 20% w/w of the clay particles are in the form of platelets. In certain embodiments, about 0.1% w/w to about 40% w/w of the clay particles are in the form of platelets having a size of about 1 Å to about 50 Å, about 30 Å to about 50 Å, or about 5 Å to about 20 Å.

Exemplary exfoliated clays contemplated to be amenable for use in present invention include exfoliated forms of smectite clay, illite clay, chlorite clay, layered polysilicates, synthetic clay, and phyllosilicates. Exemplary specific exfoliated clays contemplated to be amenable for use in present invention include exfoliated forms of, for example, montmorillonite (e.g., sodium montmorillonite, magnesium montmorillonite, and calcium montmorillonite), beidellite, pyrophyllite, talc, vermiculite, sobockite, stevensite, svinfordite, sauconite, saponite, volkonskoite, hectorite, nontronite, kaolinite, dickite, nacrite, halloysite, hisingerite, rectorite, tarosovite, ledikite, amesite, baileychlore, chamosite, clinochlore, kaemmererite, cookeite, corundophilite, daphnite, delessite, gonyerite, nimite, odinite, orthochamosite, penninite, pannantite, rhipidolite, prochlore, sudoite, thuringite, kanemite, makatite, ilerite, octosilicate, magadiite, and kenyaite. In certain embodiments, the exfoliated clay is an exfoliated smectite. In certain embodiments, the exfoliated clay is exfoliated montmorillonite.

An exfoliated clay can be characterized by, for example, the size of platelets and the aspect ratio of platelets. In certain embodiments, the size of the platelets is about 1 Å to about 50 Å, about 30 Å to about 50 Å, or about 5 Å to about 20 Å. In certain embodiments, aspect ratio of the platelets is about 100 to about 10,000, about 100 to about 5,000, or about 200 to about 2,000. In certain other embodiments, the exfoliated clay has a mean particle size of less than about 500 nm, less than 100 nm, or less than 25 nm. In certain other embodiments, the exfoliated clay has a mean particle size of from about 60 nm to about 400 nm, about 50 nm to about 300 nm, about 40 nm to about 200 nm, or about 20 nm to about 150 nm.

In certain other embodiments, a partially exfoliated clay is formed by exposing a clay to an effective amount of plant protein composition (e.g., an isolated polypeptide composition) to form a mixture and subjecting the mixture to exfoliation conditions, such as high shear mixing and/or sonication. In certain other embodiments, an exfoliated clay is formed by exposing a clay to an effective amount of plant protein composition (e.g., an isolated polypeptide composition) to form a mixture and subjecting the mixture to exfoliation conditions, such as high shear mixing and/or sonication.

Cellulose Nanoparticles

Cellulose nanoparticles can be added to the adhesive composition to achieve certain performance properties, such as to provide an adhesive with increased toughness and/or bond strength. Cellulose nanoparticles can be obtained from commercial sources or isolated from plant-based fibers by acid-hydrolysis. Cellulose nanoparticles can be characterized by, for example, the size of the nanoparticle, the cross-sectional shape of the nanoparticle, and/or the cross-sectional length and aspect ratio of the nanoparticle. Accordingly, in certain embodiments, the cellulose nanoparticle has a size of from about 1 nm to about 2000 nm, about 10 nm to about 1000 nm, about 10 nm to about 500 nm, or about 10 nm to about 200 nm. In certain embodiments, the cross-sectional shape of the nanoparticle may be triangular, square, pentagonal, hexagonal, octagonal, circular, or oval. In certain other embodiments, the average cross-sectional length of the cellulose nanoparticle is about 0.1 nm to about 100 nm, or about 1 nm to about 10 nm.

One type of cellulose nanoparticles that may provide certain advantages are cellulose nanofibers. Exemplary cellulose nanofibers are described in, for example, U.S. Patent Application Publication Nos. 2010/0233481, 2010/0240806, and 2010/0282422, each of which is hereby incorporated by reference.

Catalyst

A catalyst may be added to the adhesive composition to facilitate polymerization. Exemplary catalysts include, for example, a primary amine, a secondary amine, a tertiary amine, an organometallic compound, or a combination thereof. Exemplary primary amines include, for example, methylamine, ethylamine, propylamine, cyclohexylamine, and benzylamine. Exemplary secondary amines include, for example, dimethylamine, diethylamine, and diisopropylamine. Exemplary tertiary amines include, for example, diazabicyclooctane (Dabco), triethylamine, dimethyl benzylamine, bis-dimethylaminoethyl ether, tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-diaminoethyl)-ether, N,N-dimethyl piperazine, N-(2-hydroxyethoxyethyl)-2-azanorbornane, Tacat DP-914 (Texaco Chemical), Jeffcat®, N,N,N,N-tetramethyl butane-1,3-diamine, N,N,N,N-tetramethyl propane-1,3-diamine, N,N,N,N-tetramethyl hexane-1,6-diamine, 2,2'-dimorpholinodiethyl ether (DMDEE), or a mixture thereof. Exemplary organometallic compounds include, for example, di-n-octyl tin mercaptide, dibutyl tin maleate, diacetate, dilaurate, dichloride, bis-dodecyl mercaptide, tin(II)acetate, ethyl hexoate and diethyl hexoate, $Fe^{+3}$ 2,4-pentanedionate (FeAcAc), or lead phenyl ethyl dithiocarbamate.

In certain other embodiments, the catalyst is a transition metal acetylacetonates, e.g., an acetylacetonate compound comprising iron, copper, or nickel. In certain embodiments, the transition metal acetylacetonate comprises a tertiary amine, e.g., 2,2'-dimorpholino diethyl ether.

The amount of catalyst used in the adhesive composition can be varied in order to optimize the features of the adhesive. In certain embodiments, the catalyst is present in less than 1% (wt/wt), 0.5% (wt/wt), or 0.1% (wt/wt) of the adhesive composition. In certain other embodiments, the catalyst is present in a range from 0.001% (wt/wt) to 0.75% (wt/wt), 0.001% (wt/wt) to 0.01% (wt/wt), 0.01% (wt/wt) to 0.05% (wt/wt), or 0.05% (wt/wt) to 0.5% (wt/wt) of the adhesive composition.

Tacking Agent

Exemplary tacking agents include, for example, glycerin, corn syrup, soy oil, a poly($C_2$-$C_6$)alkylene, mineral oil, an ethylene/propylene/styrene copolymer, a butylene/ethylene/styrene copolymer, or a mixture of one or more of the foregoing. Other exemplary tacking agents are copolymers that have a low glass transition temperature (Tg) (e.g., a latex-based, acrylic copolymer with a Tg of less than about 0° C., and preferably less than about −20° C.). In certain embodiments, the additive is polybutene. In certain embodiments, the polybutene has a weight average molecular weight of from about 200 g/mol to about 20,000 g/mol, from about 200 g/mol to about 10,000 g/mol, from about 200 g/mol to about 5,000 g/mol, from about 200 g/mol to about 2,000 g/mol, from about 200 g/mol to about 1,000 g/mol, from about 500 g/mol to about 2,000 g/mol, or from about 500 g/mol to about 1,000 g/mol. Other tacking agents include a solid selected from the group consisting of a terpene resin, a rosin ester derivative, and a hydrocarbon-based derivative. When the tacking agent is a solid, the tacking agent may optionally be pre-dissolved in an oil-phase of the adhesive composition (e.g., in PMDI). Alternatively, the solid tacking agent can be pre-melted and dispersed in water by means of the protein component, or the solid tacking agent can be ground and dispersed as fine particulates directly into the adhesive composition.

Extender

Exemplary extenders include, for example, inert extenders or active extenders. In certain embodiments, the inert extender is vegetable particulate matter, limonene, vegetable oil, mineral oil, dibasic esters, propylene carbonate, non-reactive modified aromatic petroleum hydrocarbons, soy oil, castor oil, and in general any non-active hydrogen containing liquid that can be incorporated into an isocyanate based adhesive. Another inert extender is any non-active hydrogen containing solid that is soluble, e.g., soluble in oil or soluble in water. The active extender can be a pyrrolidone monomer or polymers, an oxizolidone monomer or polymers, an epoxidized oil, or an unsaturated oil, such as linseed oil. Another active extender is a vinyl monomer or mixture of vinyl monomers.

Surfactants & Adhesion Promoters

Exemplary surfactants include, for example, monomeric types, polymeric types, or mixtures thereof. Exemplary adhesion promoters include, for example, organosilanes and titanates.

Antimicrobial Agent

Antimicrobial agents known in the art that do not substantially react with PMDI are contemplated for use in the adhesive compositions and composites described herein. One exemplary antimicrobial agent is polyalkylene glycol polymers, such as polypropylene glycol.

Crosslinking Agent

In other embodiments, the additive can be a crosslinking agent, for example, a crosslinking agent that can be used to bond lignocellulosic material to glass. Exemplary crosslinking agents include an organosilane, such as dimethyldichlorosilane (DMDCS), alkyltrichlorosilane, methyltrichlorosilane (MTCS), N-(2-aminoethyl)-3-aminopropyl trimethoxysilane (AAPS), or a combination thereof. In other embodiments the polypeptide fractions are combined with an organosilane to form an adhesive for bonding one or more substrates together in any combination, said substrates including glass, paper, wood, ceramic, steel, aluminum, copper, brass, etc. The term "organosilane" refers to any group of molecules including monomers, hydrolyzed monomers, hydrolyzed dimers, oligomers, and condensation products of a trialkoxysilane having a general formula:

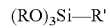

$(RO)_3Si$—R' where R is preferably a propyl, ethyl, methyl, isopropyl, butyl, isobutyl, sec-butyl, t-butyl, or acetyl group, and R' is an organofunctional group where the functionality may include an aminopropyl group, an aminoethylaminopropyl group, an alkyl group, a vinyl group, a phenyl group, a mercapto group, a styrylamino group, a methacryloxypropyl group, a glycidoxy group, an isocyante group, or others.

Similarly, a bis-trialkoxysilane having the general formula $(RO)_3Si$—R'—$Si(OR)_3$ can also be employed as an "organosilane" either alone or in combination with a trialkoxysilane, where R is preferably a propyl, ethyl, methyl, isopropyl, butyl, isobutyl, sec-butyl, t-butyl, or acetyl group, and R' is a bridging organofunctional residue which may contain functionality selected from the group consisting of amino groups, alky groups, vinyl groups, phenyl groups, mercapto groups, and others. Similarly, a tetraalkoxysilane having the general formula $(RO)_4Si$ can also be employed as an "organosilane" either alone or in combination with a trialkoxysilane, or a bis-trialkoxysilane, where R is preferably a propyl, ethyl, methyl, isopropyl, butyl, isobutyl, sec-butyl, t-butyl, or acetyl group.

Agent that Improves Moisture Resistance

Agents that improve moisture-resistance refer to those materials that, when added to adhesive compositions described herein, improve the ability of a wood composite formed from the adhesive to be resistant to water, i.e., not absorb water. Exemplary types of agents that improve moisture resistance include fluorinated polyol compounds, silicones, siloxanes (including functionalized siloxane polymers, such as hydroxy-terminated siloxane polymers or hydroxyl alkyl siloxane polymers), polyolefin polymers, wax (e.g., fatty acids (such as an alkyl carboxylic acid), salts of a fatty acid (e.g., an alkali metal salt of an alkyl carboxylic acid), esters of a fatty acid (e.g., an alkyl ester of a carboxylic acid, an aryl ester of a carboxylic acid, an alkyl ester of an alkanoic acid, or an aryl ester of an alkanoic acid), fatty alcohols, mixtures of hydrophobic hydrocarbons, water-based emulsions containing hydrophobic hydrocarbons dispersed therein, a hydrocarbon wax, a fluoroalkylphosphate wax, a fluorinated hydrocarbon wax, and a fluoroalkyl functionalized wax), and hydrophobic oils. Another agent that improves moisture-resistance is a fluorinated silicone. When an agent that improves moisture-resistance is present in an adhesive composition, it is desirably present in an amount effective to increase moisture resistance (e.g., an increase in moisture resistance of at least about 2%, 5%, 10%, or 20% compared to the moisture resistance of a composite formed from an adhesive composition lacking the agent that improves moisture-resistance).

Agents that improve moisture-resistance may be present in the final composite at a weight percent in the range of about 0.01% (w/w) to about 5% (w/w), about 0.01% (w/w) to about 2% (w/w), about 0.01% (w/w) to about 1% (w/w), about 0.01% (w/w) to about 0.5%, about 0.1% (w/w) to about 2% (w/w), (w/w), about 0.1% (w/w) to about 1% (w/w), (w/w), about or 0.5% (w/w) to about 1% (w/w).

One exemplary fluorinated polyol compound is Fluoro-Link D-10 fluorinated polyol that is commercially available from Solvay Solexis, Inc. Exemplary silicones include Dow Corning FS-1265 Fluid, 300 cST (Trifluoropropyl Methicone) from Dow Corning), and T-Sil-6011 SE Emulsion (60% Solids), from Siovation, Inc. which is a emulsion containing 60% w/w silicones. The silicone may be organically modified, such as $C_{20-24}$ Alkyl Methicone, $C_{24-28}$ Alkyl Methicone, $C_{30-45}$ Alkyl Methicone, Stearyl Dimethicone, Biphenyl Dimethicone, Stearoxy Dimethicone, $C_{20-24}$ Alkyl Dimethicone, or $C_{24-28}$ Alkyl Dimethicone.

Exemplary types of functionalized siloxane polymers include (1) a hydroxy-terminated siloxane polymer such as hydroxy-terminated polydimethylsiloxane (e.g., T-Sil-80, a linear hydroxy terminated polydimethylsiloxane from Siovation, Inc.), (2) a hydroxyl alkyl polydimethylsiloxane (e.g., Tego Protect-5000 functionalized silicone fluid commercially available from Evonik Tego Chemie GmbH), and (3) a fluorinated siloxane. Exemplary waxes include Hexion EW-58H; BE Square 165 Amber Petroleum Microcrystalline Wax commercially available from Baker Hughes, Inc., which is a mixture comprising paraffinic, isoparaffinic, and naphthenic hydrocarbons; Masurf FS 115 Emulsion (a fluoroalkylphosphate wax dispersion in water—28% Solids) commercially available from Mason Chemical Company; camauba wax; candelilla wax; japan wax; beeswax; rice bran wax; montan wax; paraffin; ceresin; lanolin; ozokerita; slack wax (which is semi-refined wax having an oil content up to about 30 mass percent, and often produced by chilling and solvent filter-pressing wax distillate); polyethylene wax; a fatty acid or salt thereof (e.g., $C_{10-25}$ alkanoic acid, a salt of a $C_{10-25}$ alkanoic acid, a $C_{10-25}$ alkenoic acid, a salt of an $C_{10-25}$ alkenoic acid; such as stearic acid, zinc stearate, or lauric acid), a fatty ester (e.g., an ester of an $C_{10-25}$ alkanoic acid or $C_{10-25}$ alkenoic acid); or fatty alcohol (e.g., $C_{10-25}$ hydroxy alkane or $C_{10-25}$ hydroxy alkene).

Exemplary hydrophobic polymers include a polyolefin (e.g., polyethylene, polypropylene, polybutylene, polystyrene, copolymers of the foregoing, polyethylene/polyvinyl acetate copolymer, and polyethylene/polyacrylic acid copolymer).

Exemplary hydrophobic oils include soy lecithin, caster oil, and a fluorinated hydrocarbon liquid.

Another agent that improves moisture resistance is a mixture of a silicone and a terpene compound. An exemplary silicone is Tego Protect-5000 functionalized silicone fluid sold by Evonik Tego Chemie GmbH. Exemplary terpene compounds contemplated for use include terpene compounds that are a solid at room temperature, a liquid at room temperature, and/or have a molecular weight of less than about 2000 g/mol, about 1000 gmol, about 500 g/mol, or about 200 g/mol. In certain embodiments, the terpene compound is limonene. In certain embodiments, the agent that improves moisture resistance is a mixture of Tego Protect-5000 functionalized silicone fluid and limonene. In certain other embodiments, the agent that improves moisture resistance is a silicone and limonene. It is understood that an agent that improves moistures resistance (e.g., a silicone and limonene) can be used in combination with other additives, such as montmorillonite that has been at least partially exfoliated.

In certain embodiments, the agent that improves moisture-resistance is a polymer agent that improves moisture-resistance, a wax agent that improves moisture-resistance, or a mixture thereof. In certain other embodiments, the agent that improves moisture-resistance is a silicone, a siloxane, a fluorinated polyol, a fluoroalkyl phosphate ester, a fluoroalkyl carboxylic ester, a salt of a fluoroalkanoic acid, a wax that improves moisture-resistance, or a mixture thereof. In certain other embodiments, the agent that improves moisture-resistance is a wax that improves moisture-resistance, such as a mixture of hydrophobic hydrocarbons, water-based emulsions containing hydrophobic hydrocarbons dispersed therein, a fluoroalkylphosphate wax, a fluorinated hydrocarbon wax, or a fluoroalkyl functionalized wax. In certain other embodiments, the agent that improves moisture-resistance is a silicone, a siloxane, a fluorinated polyol, a fluoroalkyl phosphate ester, or a fluoroalkyl carboxylic ester. In certain other embodiments, the agent that improves moisture-resistance is a silicone, a siloxane, a fluorinated polyol, a fluoroalkyl phosphate ester, a fluoroalkyl carboxylic ester, a salt of a fluoroalkanoic acid, or a mixture thereof. In certain other embodiments, the agent that improves moisture-resistance is a silicone, a siloxane, a fluorinated polyol, a fluoroalkyl phosphate ester, a fluoroalkyl carboxylic ester, or a wax that improves moisture-resistance. In certain other embodiments, the agent that improves moisture-resistance is a fluorinated polyol, a silicone, a siloxane, or wax that improves moisture-resistance. In yet other embodiments, the agent that improves moisture-resistance is a mixture comprising hydrophobic hydrocarbons.

The term "fluoroalkyl phosphate ester" as used herein refers to a compound comprising a phosphate group bonded to at least one fluoroalkyl group, such as represented by $P(O)(OR^1)(OR^2)_2$, wherein $R^1$ is a fluoroalkyl group, and $R^2$ represents independently for each occurrence hydrogen, alkyl, fluoroalkyl, aryl, aralkyl, heteroalkyl, heteroaryl, heteroaralkyl, an alkali metal, ammonium, or a quaternary amine, or two occurrences of $R^2$ are taken together to form an alkaline earth metal.

pH Modulator

The pH modulator can be an acid or base. In certain embodiments, the pH modulator is an alkali metal hydroxide (e.g., sodium hydroxide or calcium hydroxide) or an alkali metal salt of a carboxylate organic compound (e.g., an alkali metal salt of citrate, such as di-sodium citrate).

Composite-Release Promoter

The composite-release promoter acts to facilitate release of the wood composite from the press apparatus used to make the composite. In the absence of a composite-release promoter, certain composites may stick to the press apparatus, making it difficult to separate the composite from the press apparatus. The composite-release promoter solves this problem by facilitating release of the wood composite. Exemplary composite-release promoters include silicones (e.g., silicones described above), fatty acids, a salt of a fatty acid, waxes, and amide compounds. Exemplary fatty acids or salts thereof include a $C_{10-25}$ alkanoic acid, a salt of a $C_{10-25}$ alkanoic acid, a $C_{10-25}$ alkenoic acid, a salt of an $C_{10-25}$ alkenoic acid; e.g., stearic acid, zinc stearate, lauric acid, oleic acid or a salt thereof (such as an alkali metal salt of oleic acid, such as potassium oleate). It is understood that a mixture of two or more of the aforementioned exemplary composite-release promoters can also be used in the adhesive compositions herein. An exemplary amide compound is N,N'-ethylenebisstearamide. Exemplary waxes include those described above for the agent that improves moisture resistance, and in particular, Hexion EW-58H; E Square 165 Amber Petroleum Microcrystalline Wax commercially available from Baker Hughes, Inc.; and Masurf FS 115 Emulsion (28% Solids) commercially available from Mason Chemical Company. One additional advantage of the protein component in the adhesive composition is that it can facilitate dispersion of the composite-release promoter—this feature allows less composite-release promoter to be used in the adhesive composition and final composite product. Reducing the amount of composite-release promoter is advantageous for agents that are relatively more expensive, such as certain silicone composite-release promoters.

In certain embodiments, the composite-release promoter is a silicone.

Further, in certain embodiments, a composite-release promoter is present in the final composite at a weight percent in the range of about 0.01% (w/w) to about 5% (w/w), about 0.01% (w/w) to about 2% (w/w), or about 0.01% (w/w) to about 1% (w/w).

Formaldehyde Scavenging Agent

A variety of formaldehyde scavenging agents are described in the literature and are contemplated to be amenable to the present invention. Different formaldehyde scavenging agents have different reactivity profiles, and a particular formaldehyde scavenging agent (e.g., $H_2NC(O)NH_2$, $Me_2NC(O)NH_2$, or $CH_3CH_2NH_2$) can be selected to optimize the performance properties of the adhesive composition and/or binder composition formed by the adhesive. Accordingly, in certain embodiments, the formaldehyde scavenging agent has the formula $RNH_2$, $R_2NH$, $RC(O)NH_2$, $RN(H)C(O)NH_2$, $R_2NC(O)NH_2$, or $RN(H)C(O)N(H)R$, wherein R represents independently for each occurrence H, alkyl, aryl, or aralkyl. In certain embodiments, the formaldehyde scavenging agent has the formula $RN(H)C(O)N(H)R$, wherein R represents independently for each occurrence H, alkyl, aryl, or aralkyl. In certain other embodiments, the formaldehyde scavenging agent is $H_2NC(O)NH_2$, $H_2NC(O)N(H)Me$, $MeN(H)C(O)N(H)Me$, $H_2NC(O)N(CH_3)_2$, $CH_3C(O)NH_2$, $CH_3CH_2C(O)NH_2$, $CH_3NH_2$, $CH_3CH_2NH_2$, $(CH_3)_2NH$, or $(CH_3CH_2)_2NH$. In still other embodiments, the formaldehyde scavenging agent is $H_2NC(O)NH_2$.

The term "alkyl" as used herein refers to a saturated straight or branched hydrocarbon, such as a straight or branched group of 1-12, 1-10, or 1-6 carbon atoms, referred to herein as $C_1$-$C_{12}$alkyl, $C_1$-$C_{10}$alkyl, and $C_1$-$C_6$alkyl, respectively. Exemplary alkyl groups include, but are not limited to, methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl, octyl, etc.

The term "aryl" as used herein refers to refers to a mono-, bi-, or other multi-carbocyclic, aromatic ring system. Unless specified otherwise, the aromatic ring is optionally substituted at one or more ring positions with substituents selected from alkanoyl, alkoxy, alkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl and thiocarbonyl. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, and/or aryls. Exemplary aryl groups include, but are not limited to, phenyl, tolyl, anthracenyl, fluorenyl, indenyl, azulenyl, and naphthyl, as well as benzo-fused carbocyclic moieties such as 5,6,7,8-tetrahydronaphthyl. In certain embodiments, the aryl group is not substituted, i.e., it is unsubstituted.

The term "aralkyl" as used herein refers to an aryl group having at least one alkyl substituent, e.g. aryl-alkyl-. Exemplary aralkyl groups include, but are not limited to, arylalkyls having a monocyclic aromatic ring system, wherein the ring comprises 6 carbon atoms. For example, "phenylalkyl" includes phenyl$C_4$alkyl, benzyl, 1-phenylethyl, 2-phenylethyl, etc.

The amount of formaldehyde scavenging agent in the adhesive formulation can adjusted to optimize the performance properties of the adhesive composition and/or binder composition formed by the adhesive. In certain embodiments, the mole ratio of formaldehyde scavenging agent to reactive prepolymer is at least about 0.1:1, at least about 0.5:1, at least about 1:1, at least about 2:1, at least about 3:1, at least about 4:1 or at least about 5:1. In certain embodiments, the mole ratio of formaldehyde scavenging agent to reactive prepolymer is in the range of from about 0.01: to about 0.5:1, from about 0.5:1 to about 5:1, or from about 1:1 to about 4:1. In still other embodiments, the mole ratio of formaldehyde scavenging agent to reactive prepolymer is at least 0.05:1. In still other embodiments, the mole ratio of formaldehyde scavenging agent to reactive prepolymer is at least 5:1.

In certain embodiments, the formaldehyde scavenging agent is present in an amount from about 1% to about 50% (w/w), from about 1% to about 30% (w/w), from about 1% to about 20% (w/w), from about 5% to about 50% (w/w), from about 5% to about 30% (w/w), from about 5% to about 20% (w/w), from about 10% to about 50% (w/w), from about 10% to about 30% (w/w), or from about 10% to about 20% (w/w) of the adhesive composition. In certain other embodiments, the formaldehyde scavenging agent is present in an amount from about 1% to about 50% (w/w) of the adhesive composition. In still other embodiments, the formaldehyde scavenging agent is present in an amount from about 2% to about 30% (w/w) of the adhesive composition.

Additional Polymer Additives

In certain embodiments, the adhesive composition further comprises either an ethylene copolymer resin, a hydroxyl functionalized polymer, or mixtures thereof. Non-limiting examples of suitable ethylene copolymer resins include ethylene vinyl acetate (EVA), ethylene-co-vinylacetate-co-acrylic acid, ethylene-co-vinylacetate-co-methacrylic acid, ethylene-co-vinylacetate-co-vinylalcohol, carboxylated vinyl acetate-ethylene copolymers, and ethylene vinyl alcohol (EVOH) resins. Non-limiting examples of hydroxyl functionalized polymers include water soluble or partially water soluble polymers such as polyvinylalcohol, polyvinylbutyral-co-vinylalcohol, polyvinylacetate-co-vinylalcohol and the like; and carbohydrates such as carboxymethylcellulose, ethylmethylcellulose, etc.

The ethylene copolymer can be used as a water dispersion agent (i.e., an EVA latex). The dispersion agent can be a polymer latex containing a carboxylated vinyl acetate-ethylene terpolymer stabilized with poly-(vinyl alcohol), commercially known as AIRFLEX 426® from Air Products, Inc. (63% solids by weight). In certain other embodiments, the dispersion agent is Wacker VINNAPAS® 426, which is a carboxylated, high solids vinyl acetate-ethylene (VAE) copolymer dispersion with a glass transition temperature (Tg) of 0° C., sold by Wacker Chemie, AG. The ethylene copolymer can be used at a level of from 5% to 50% by weight, from 10% to 40% by weight, or from 15% or 30% by weight of the total isocyanate reactive component (the level of ethylene copolymer is expressed on a solids basis, and does not include the level of water in the latex). Additional latex polymers that may be used include, for example, acrylic homopolymers (e.g., poly(methylmethacrylate) and poly(isobutylmethacrylate)) and acrylic copolymers (e.g., poly(isobutylmethacrylate-co-methylacrylate) and poly(ethylene-co-methylmethacrylate)).

Fire Retardants

Exemplary fire retardants include, for example, (i) phosphoric acid or a salt thereof, such as a mono-ammonium phosphate, di-ammonium phosphate, ammonium poly-phosphate, melamine phosphate, guanidine phosphate, urea phosphate, alkali metal phosphate, and alkaline earth metal phosphate, (ii) a halogenated phosphate compound, (iii) a phosphate ester, such as tri-o-cresyl phosphate and tris(2,3-dibromopropyl) phosphate, (iv) a chlorinated organic compound, such as a chlorinated hydrocarbon or chlorinated paraffin, (iv) a brominated organic compound, such as a brominated hydrocarbon, bromo-bisphenol A, tetrabromobisphenol A (TBBPA), decabromobiphenyl ether, octabromobiphenyl ether, tetrabromobiphenyl ether, hexabromocyclododecane, bis(tetrabromophthalimido) ethane, tribromophenol, and bis(tribromophenoxy) ethane, (v) a brominated oligomer or brominated polymer, such as TBBPA polycarbonate oligomer, brominated polystyrene, and TBBPA epoxy oligomer, (vi) a borate compound, such as an alkali metal borate, ammonium borate, or mixture comprising one or more of borax, boric acid, boric oxide, and disodium octoborate, (vii) aluminium materials, such as aluminium trihydrate and aluminium hydroxide, (viii) an alkaline earth metal hydroxide, such as magnesium hydroxide, (ix) an alkali metal bicarbonate, such as sodium bicarbonate, (x) an alkaline earth metal carbonate, such as calcium carbonate, (xi) antimony trioxide, (xii) hydrated silica, (xiii) hydrated alumina, (xiv) dicyandiamide, (xv) ammonium sulfate, and (xvi) a mixture of guanylurea phosphate and boric acid, such as those described in International Patent Application Publication No. WO 02/070215, which is hereby incorporated by reference, (xvii) graphite, (xviii) melamine, and (xix) a phosphonate compound, such as diethyl-N,N-bis(2-hydroxyethyl) aminoethyl phosphonate; dimethyl-N,N-bis(2-hydroxyethyl) aminomethyl phosphonate; dipropyl-N,N-bis(3-hydroxypropyl) aminoethyl phosphonate; and dimethyl-N,N-bis(4-hydroxybutyl) aminomethyl phosphonate, such as described in U.S. Pat. No. 6,713,168, which is hereby incorporated by reference.

In certain embodiments, the fire retardant is (i) phosphoric acid or a salt thereof, such as a mono-ammonium phosphate, di-ammonium phosphate, ammonium poly-phosphate, melamine phosphate, guanidine phosphate, urea phosphate, alkali metal phosphate, and alkaline earth metal phosphate, (ii) a phosphate ester, such as tri-o-cresyl phosphate and tris(2,3-dibromopropyl) phosphate, aluminium trihydrate and aluminium hydroxide, (iii) an alkaline earth metal hydroxide, such as magnesium hydroxide, (iv) an alkali metal bicarbonate, such as sodium bicarbonate, (v) antimony trioxide, or (vi) hydrated alumina. In certain other embodiments, the fire retardant is colemanite ($CaB_3O_4(OH)_3$—$H_2O$).

Wood Preservatives

Exemplary wood preservatives include, for example, (i) chromated copper arsenate (CCA), (ii) alkaline copper quaternary, (iii) copper azole, (iv) a borate preservative compound, (v) a sodium silicate-based preservative compound, (vi) a potassium silicate-based preservative compound, (vii) a bifenthrin preservative compound, (viii) a coal-tar creosote, (ix) linseed oil, (x) tung oil, and (xi) an insecticide, such as an organochloride compound, organophosphate compound, carbamate compound, pyrethroid, neonicotinoid, and ryanoid.

IX. General Considerations for Adhesive Compositions

The adhesive composition may be in the form of a liquid or powder. Liquid form adhesives may provide advantages for certain applications, such as where it is desirable to distribute a thin film of adhesive over a large surface area. Dry blend adhesives may provide advantages for certain applications, such as those where it is desirable to minimize the amount of volatile compounds (e.g., water) in the adhesive composition. Factors that can affect the viscosity, moisture resistance, bond strength, and other properties of the adhesive composition are described below.

Dry Blend Adhesive Compositions

The adhesive composition may be in the form of a dry blend. A first type of dry blend adhesive composition may be formed by mixing ground plant meal with one or more liquid or solid additives. The liquid or solid additives are typically added in an amount less than about 10% w/w of the plant meal. Alternatively, the liquid or solid additives are may be blended with the plant meal during grinding to form the ground plant meal. The ground plant meal containing one or more additives is desirably a dry and flowable material. Exemplary additives are described above in Section VIII, and include intercalated clays, partially exfoliated clays, exfoliated clays, mixture of a silicone and a terpene compound (e.g., limonene), mineral oil, soy oil, castor oil, soy methyl ester, canola methyl ester urea, glycerin, propylene glycol, propylene carbonate, polyols, crosslinkers like PMDI, lignin, epoxies such as glycidyl end-capped poly (bisphenol-A-co-epichlorohydrin) (BPA) and trimethylolpropane triglycidyl ether, polymer latexes, and catalysts. In certain other embodiments, a phenol-formaldehyde resin or urea-formaldehyde resin may be added to the plant meal or ground plant meal. In yet other embodiments, lignin may be added to the plant meal or ground plant meal.

A second type of dry blend adhesive composition may be formed by mixing ground plant meal with a dry powder ingredient, such as an additive that is not a liquid (e.g., a clay (such as an intercalated clay, a partially exfoliated clay, or an exfoliated clay), silicone, lignin, or mixture of a hydroxyaromatic compound and an aldehyde compound, such as a phenol-formaldehyde resin).

A third type of dry blend adhesive may be formed by mixing the first type of adhesive (as described above) with any other dry or liquid ingredient that may impart beneficial properties to the adhesive composition.

The dry adhesives described above may be used as binders in the manufacture of wood composites. Such wood composites may be prepared by first mixing wood particulates with the dry blend adhesive composition to form a mixture, and then subjecting the mixture to elevated temperature and pressure to facilitate densification and curing of the adhesive. The amount of cured adhesive in the wood composite may be, for example, from about 0.2% and 20% w/w of the cured wood composite.

Amount of Plant Protein Composition

The amount of plant protein composition in the adhesive composition can be adjusted to achieve particular performance properties. For example, in certain embodiments, the adhesive composition comprises no less than about 2%, 5%, 10%, 15%, 20%, 25%, or 30% by weight of the plant protein composition (i.e., ground plant meal or isolated polypeptide composition) described herein (based on the dry weight of the protein component). The maximum loading of the protein component can be based on, for example, optimizing stability and viscosity. In certain embodiments, the total concentration of plant protein composition may be of up to 35% (wt/wt). Higher viscosity compositions formed from higher weight percentages of the plant protein composition described herein can be beneficial in applications where it is desirable for the uncured adhesive to exhibit cold-tack, flow resistance, sag resistance, and gap-filling characteristics.

Viscosity Considerations

The viscosity of the adhesive can be designed with a particular application in mind. In one embodiment, where gap filling adhesives are required, the minimum viscosity of the adhesive (e.g., polyisocyanate-containing adhesive) should be no less than (NLT) 2000 cps, 3000 cps, or NLT 4000 cps, as measured at 25° C. The viscosity of the adhesive composition (e.g., a polyisocyanate-containing adhesive) can be optimized by adjusting the amount of protein component (i.e., ground plant meal or isolated polypeptide composition) described herein and/or the conditions used for preparing the composition. Typical conditions are in the range from 25 to 100° C. at ambient pressure, with agitation of the mixture until a sufficiently homogeneous composition is achieved. In addition, the viscosity of the adhesive composition can be optimized by adjusting the amount of water in the adhesive. For example, in certain embodiments, the adhesive composition contains water in an amount that is less than about 70% w/w, 60% w/w, 50% w/w, 40% w/w, 30% w/w, 20% w/w, or 10% w/w of the adhesive composition. In certain other embodiments, the adhesive composition contains water in an amount ranging from about 10% w/w to about 40% w/w, 20% w/w to about 50% w/w, about 30% w/w to about 60% w/w, about 40% w/w to about 70% w/w, about 50% w/w to about 80% w/w, or about 50% w/w to about 60% w/w of the adhesive composition.

In order to optimize the viscosity of the adhesive composition, the adhesive composition may contain ground plant meal in an amount such that the viscosity of the adhesive formulation increases by no more than about 25% within about 20 minutes, or no more than about 50% within about 20 minutes, after mixing the prepolymer and ground plant meal with a nucleophile. In certain other embodiments, the ground plant meal is present in an amount such that the viscosity of the adhesive formulation increases by no more than about 40% within about 30 minutes (or no more than about 40% with about 100 minutes) after mixing the prepolymer and ground plant meal with a nucleophile. In certain other embodiments, the ground plant meal is present in an amount such that the viscosity of the adhesive formulation remains less than about 1100 cps within about 150 minutes after mixing, less than about 1100 cps within about 200 minutes after mixing, less than about 1500 cps within about 150 minutes after mixing, less than about 1500 cps within about 225 minutes after mixing, less than about 50,000 cps within about 150 minutes after mixing, less than about 50,000 cps within about 20 minutes after mixing, less than about 30,000 cps within about 20 minutes after mixing, less than about 300,000 cps within about 60 minutes after mixing, or less than about 100,000 cps within about 60 minutes after mixing the prepolymer and ground plant meal with a nucleophile.

In certain embodiments, the viscosity of the adhesive composition is no more than (NMT) 500,000 cps, NMT 300,000 cps, NMT 200,000 cps, or NMT 100,000 cps, NMR 50,000 cps, NMT 25,000 cps, NMT 10,000 cps, or NMT 5,000 cps as measured at 25° C. until the adhesive composition is cured. In certain other embodiments, the viscosity of all the types of polyisocyanate compositions as described herein, is no more than (NMT) 500,000 cps, NMT 300,000 cps, NMT 200,000 cps, or NMT 100,000 cps, NMR 50,000 cps, NMT 25,000 cps, NMT 10,000 cps, or NMT 5,000 cps as measured at 25° C. until the polyisocyanate composition is cured.

Certain of the adhesives described herein are liquids having viscosities low enough to render them pourable, sprayable, or curtain-coatable. For pourable or sprayable adhesive compositions, the viscosity of the adhesive composition is desirably no more than (NMT) 500 cps, NMT 1000 cps, NMT 2000 cps, or NMT 5000 cps, as measured at 25° C. The viscosity of the adhesive composition can be optimized by adjusting the amount of protein component (i.e., ground plant meal or isolated polypeptide composition) described herein and/or the conditions used for preparing the composition. Alternatively, certain of the adhesives described herein are non-pourable, extrudable, spreadable gels or pastes. Non-pourable, extrudable, spreadable gels, or pastes may become pourable, sprayable, or curtain-coatable liquids at elevated temperature, and may optionally revert to non-pourable, extrudable or spreadable gels or pastes upon cooling.

The adhesive composition can be also characterized according to the weight percent of the ground plant meal in the composition. In certain embodiments, the ground plant meal is present in an amount from about 1% to about 90% (w/w), from about 1% to about 70% (w/w), from about 1% to about 50% (w/w), from about 1% to about 30% (w/w), from about 10% to about 90% (w/w), from about 10% to about 70% (w/w), from about 10% to about 50% (w/w), from about 10% to about 30% (w/w), from about 20% to about 90% (w/w), from about 20% to about 70% (w/w), from about 20% to about 50% (w/w), or from about 20% to about 30% (w/w) of the adhesive composition. In certain other embodiments, the ground plant meal is present in an amount from about 5% to about 35% (w/w), or from about 5% to about 50% (w/w), of the adhesive composition. In still other embodiments, the ground plant meal is present in an amount from about 15% to about 25% (w/w) of the adhesive composition.

In certain other embodiments, the polypeptide containing adhesives described herein are liquids, gels, or pastes stable enough to be stored for at least one week, at least two weeks, at least one month, or at least three months at ambient temperature (25° C.), and protected from moisture. The term "stable" in connection with the viscosity of the polyisocyanate composition refers to a viscosity that does not increase by more than 10%, 25%, or 30%, from its initial value.

In addition, the isolated polypeptide composition and the adhesive composition can be designed to have a polydispersity index. The term "polydispersity index" refers to the ratio between the weight average molecular weight and the number average molecular weight (i.e., PDI=Mw/Mn).

The terms "number average molecular weight," denoted by the symbol Mn and "weight average molecular weight," denoted by the symbol Mw, are used in accordance with their conventional definitions as can be found in the open literature. The weight average molecular weight and number average molecular weight can be determined using analytical procedures described in the art, e.g., chromatography techniques, sedimentation techniques, light scattering techniques, solution viscosity techniques, functional group analysis techniques, and mass spectroscopy techniques (e.g., MALDI mass spectroscopy). For instance, as illustrated in Example 2, average molecular weight and number average molecular weight of the polypeptide composition was determined by MALDI mass spectroscopy.

Further, it is contemplated that isolated polypeptide compositions having different molecular weights may provide adhesive compositions having different properties. As such, the weight average molecular weight, number average molecular weight, and polydispersity index can be an important indicator when optimizing the features of the adhesive composition. In particular, it is contemplated that the ability to optimize the molecular weight characteristics of the isolated polypeptide compositions provides advantages when preparing an adhesive composition for a particular use. Further advantages include obtaining adhesive compositions with similar properties even though the isolated polypeptide composition may be obtained from a different source (e.g., soy vs. castor) or when similar protein sources are harvested during different seasons, over varying periods of time, or from different parts of the world. For example, proteins isolated from soy and castor (each having different molecular weight distributions) can be made to have similar molecular weight distributions through digestion and fractionation processes described herein (see Example 2). Accordingly, the ability to measure and control the consistency of molecular weight distributions is contemplated to be beneficial when optimizing various features of the adhesive composition, e.g., long-term reproducibility of physical properties and process characteristics of formulated adhesives. The molecular weight characteristics of the ground plant meal or isolated polypeptide composition can be altered by subjecting the proteins therein to enzymatic digestion or fractionation according to the procedures described herein.

In certain embodiments, the PDI of the adhesives provided herein is from about 1 to about 3, from 1 to 1.5, from 1.5 to 2, from 2 to 2.5, from 2.5 to 3, from 1 to 2, from 1.5 to 2.5, or from 2 to 3.

Tack Strength/Bond Strength

The tack or bond strength of the pressure sensitive adhesives (PSA) can be controlled through a number of means, such as shifting the glass transition ($T_g$) to higher or lower temperatures (by controlling the levels of monomeric and/or polymeric plasticizers) or incorporating flatting agents such as silicas, glass spheres, clays, and the like; by adjusting the crosslink density to higher or lower levels; by increasing or decreasing the plasticizer concentration; by blending with higher or lower molecular weight polymers; or by employing some combination of these techniques.

It is understood that when evaluating the tack or bond strength of a composite formed using an adhesive, the maximum achievable strength of the composite is dictated by the cohesive strength of the wood itself. To illustrate, if the adhesive is cohesively stronger than the wood, then wood failure will be the outcome. Further, it is contemplated that the adhesive composition may be tailored to provide a bond strength appropriate for particular applications by selecting particular polypeptide fractions, prepolymers, catalysts, and/or other additives.

Depending upon the application, the resulting adhesives may comprise from about 20% to about 80%, from about 30% to about 70%, from about 40% to about 60% (w/w) of prepolymer in the total adhesive (binder) composition.

Furthermore, depending upon the application, the resulting cured article can comprise from about 0.05% to about 10%, from about 0.05% to about 5.0%, from about 0.1% to about 4.0%, from about 0.2% to about 3.0%, or from about 0.3% to about 2.0% (w/w) of prepolymer. In certain embodiments, the cured article can comprise from about 0.05% to about 2.5% (w/w) of prepolymer. In other embodiments, the cured article can comprise from about 2.5% to about 4% (w/w) of prepolymer.

Furthermore, an article fabricated from one or more of the adhesives described herein can contain from about 1% to about 15%, or from about 2% to about 10%, or from about 3% to about 8%, or from about 4% to about 7%, or from about 3% to about 6% (w/w) of binder (adhesive) per cured article. In certain embodiments, the article fabricated from the adhesive may contain greater than 5% (w/w) of binder per cured article. In certain other embodiments, the article comprises from about 1.5% to about 2.5% of binder per cured article.

Composite materials can contain from about 5% to about 85% (w/w), about 15% to about 75% (w/w), about 30% to about 65% (w/w), about 1% to about 10%, about 10% to about 20%, or about 20% to about 70% (w/w) binder. Laminate materials can contain from about 0.1% to about 10% (w/w), about 0.5% to about 5%, about 1% to about 3% (w/w), about 1% to about 10%, about 20% to about 30%, or about 30% to about 70% (w/w) binder.

In certain embodiments, the adhesives described herein can be used in the manufacture of particle board, medium density fiberboard (MDF), high density fiberboard (HDF), or oriented strand board (OSB). With regard to the preparation of moisture-resistant cured particle board composites, the composites can comprise a total binder level ranging from about 1.5% to about 11% (w/w), or from about 2.5% to about 4.5% (w/w), of the cured composite, wherein the binder includes a protein component (i.e., ground plant meal or isolated polypeptide composition) and a PMDI fraction with an optional catalyst. The amount of PMDI can range from about 5% to about 30%, or from about 30% to about 70%, by weight of the cured binder. The PMDI fraction can comprise from about 0.8% to about 10% (w/w), from about 0.8% to about 4% (w/w), or from about 1.3% to about 2.3% (w/w), of the cured composite. In certain embodiments, the PMDI component can be replaced with a phenol-formaldehyde resin, lignin, or some combination thereof. In other embodiments, PMDI can be used in combination with a phenol-formladehyde resin, lignin, or both.

In another embodiment, a moisture resistant composites can be prepared with a total binder level ranging from about 1.5% to about 11% (w/w), or from about 1.5% to about 2.5% (w/w), of the cured composite, wherein the binder includes a protein component (i.e., ground plant meal or isolated polypeptide composition) and a PMDI fraction with an optional catalyst. The PMDI fraction can comprise from about 0.1% to about 10% (w/w), from about 0.1% to about 5% (w/w), from about 0.2% to about 2.5% (w/w), or from about 0.3% to about 1.4% (w/w) of the cured composite.

Moisture-Resistant Adhesive Compositions

In another embodiment, a moisture-resistant cured particle board composite can be prepared containing a total binder level ranging from about 1.5% to about 15%, from about 1.5% to about 11%, or from about 2.5% to about 3.1%, by weight of the cured composite, wherein the binder comprises a protein component (i.e., ground plant meal or isolated polypeptide composition), an optional polymer latex fraction, and a PMDI fraction with optional catalyst. The PMDI comprises from about 5% to about 65% by weight of the cured binder and from about 0.1% to 10%, from about 0.1% to about 5%, from about 0.2% to about 2.5%, or from about 0.3% to about 2% by weight of the cured composite. The optional polymer latex is an EVA latex polymer comprising from about 0% to about 45% by weight of the cured binder and from about 0% to about 1.2% by weight of the cured composite. In certain other embodiments, a moisture-resistant cured MDF composite, HDF composite, or OSB composite can be prepared containing a total binder level ranging from about 1.5% to about 15%, from about 1.5% to about 11%, or from about 2.5% to about 3.1%, by weight of the cured composite, wherein the binder comprises a protein component (i.e., ground plant meal or isolated polypeptide composition), an optional polymer latex fraction, and a PMDI fraction with optional catalyst. In certain embodiments, the PMDI component can be replaced with a phenol-formaldehyde resin, lignin, or a combination thereof. In other embodiments, PMDI can be used in combination with a phenol-formladehyde resin, lignin, or both.

In another embodiment, a moisture-resistant cured particle board composite can be prepared with a total binder level ranging from about 1.5% to about 15%, from about 1.5% to about 11%, or from about 1.2% to about 2.5%, by weight of the cured composite. The binder comprises a protein component (i.e., ground plant meal or isolated polypeptide composition), an optional polymer latex fraction, and a PMDI fraction with optional catalyst. The PMDI fraction comprises from about 0.1% to about 10%, from about 1.5% to about 5%, or from about 0.1% to about 1.1% by weight of the cured composite. In certain other embodiments, a moisture-resistant cured MDF composite, HDF composite, or OSB composite can be prepared with a total binder level ranging from about 1.5% to about 15%, from about 1.5% to about 11%, or from about 1.2% to about 2.5%, by weight of the cured composite. In certain embodiments, the PMDI component can be replaced with a phenol-formaldehyde resin, lignin, or a combination thereof. In certain other embodiments, PMDI can be used in combination with a phenol-formaldehyde resin, lignin, or both.

In the event that moisture-resistance is not a requirement for the end-use application, cured composites can also be prepared with a total binder level of less than approximately 5% by weight of the cured composite, wherein the binder comprises a protein component (i.e., ground plant meal or isolated polypeptide composition) and a PMDI fraction with an optional catalyst. The PMDI fraction can comprise from about 0.05% to about 2.5% (w/w) of the cured composite. Depending upon the level of water that can be tolerated during the manufacture of the composite, binder levels of greater than 5% can also be employed, wherein the PMDI fraction comprises at least 0.05% by weight of the cured composite. In certain embodiments, the PMDI component can be replaced with a phenol-formaldehyde resin, lignin, or a combination thereof. In other embodiments, PMDI can be used in combination with a phenol-formladehyde resin, lignin, or both.

Similar formulation considerations apply to the fabrication and manufacture of plywood composites. For example, moisture-resistant cured plywood assemblies can be laminated with bondline adhesive levels ranging from approximately 0.008 pounds/ft.$^2$ up to approximately 0.056 pounds/ft.$^2$, wherein the adhesive includes a protein component (i.e., ground plant meal or isolated polypeptide composition), an optional polymer latex fraction, and a PMDI fraction with an optional catalyst. The PMDI can comprise from about 10% to about 80% (w/w), or from about 20% to about 70% (w/w), of the cured adhesive. The optional polymer latex can be an EVA polymer latex comprising between about 0% and 45% of the cured binder. It is contemplated that plywood composites prepared with these types of adhesive compositions will be capable of withstanding boiling water and hence will be extremely moisture resistant. In certain embodiments, the PMDI component can be replaced with a phenol-formaldehyde resin, lignin, or a combination thereof. In certain other embodiments, PMDI can be used in combination with a phenol-formaldehyde resin, lignin, or both.

Adhesive Composition Cure Temperature

Adhesives can be cured by allowing the adhesive to stand under ambient conditions, or the adhesive may be cured by exposing the adhesive to heat, pressure, or both. Furthermore, in certain embodiments, these adhesives are stable but can cure when exposed to moisture in air. In certain other embodiments, the adhesive compositions are cold curable. In certain embodiments, the adhesives include a cure catalyst (for example, DMDEE in the case of adhesives containing a polyisocyanate) that facilitates curing in the absence of applied heat. In certain embodiments, the adhesives (for example, the polyisocyanate containing adhesives) are cured in the presence of moisture at a temperature of about 10° C. to about the ambient temperature range (25° C., to as high as 30° C.). In certain other embodiments, the cold cure temperature ranges from 20° C. to 27° C. In other embodiments, the adhesives are hot cured, at temperatures greater than 30° C. Hot curing may at temperatures in the range from 50° C. to 300° C., or from 90° C. to 275° C., or from 110° C. to 250° C.

X. Applications of Adhesive Compositions

The adhesive compositions described herein can be used in a variety of different applications, which include, for example, bonding together many different types of substrates and/or creating composite materials.

Accordingly, the invention provides a method of bonding a first article to a second article. The method comprises the steps of (a) depositing on a surface of the first article any one of the foregoing adhesive compositions thereby to create a binding area; and (b) contacting the binding surface with a surface of the second article thereby to bond the first article to the second article. The method optionally also comprises the step of, after step (b), permitting the adhesive composition to cure, which can be facilitated by the application of pressure, heat or both pressure and heat.

The adhesive compositions can be applied to the surfaces of substrates in any conventional manner. The surfaces can be coated with the composition by spraying, brushing, doctor blading, wiping, dipping, pouring, ribbon coating, or combinations of these different methods, and the like.

The invention also provides a method of producing a composite material. The method comprises the steps of (a) combining a first article and a second article with any one of the foregoing adhesive compositions to produce a mixture;

and (b) curing the mixture produced by step (a) to produce the composite material. The curing can comprise applying pressure, heat or both pressure and heat to the mixture.

The terms "substrate", "adherend" and "article" are interchangeable and refer to the substances being joined, bonded together, or adhered using the methods and compositions described herein. In certain embodiments, the first article, the second article or both the first and second articles are lignocellulosic materials, or composite materials containing lignocellulosic material. Furthermore, the first article, the second article or both the first and second articles can comprise a metal, a resin, a ceramic, a polymer, a glass or a combination thereof. It is understood that the first article, the second article, or both the first article and the second article can be a composite.

The compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied may be in the range of from about 5 to about 50 grams per square foot, from about 8 to about 60 grams per square foot, from about 10 to about 30 grams per square foot, from about 20 to about 50 grams per square foot, from about 15 to about 40 grams per square foot, of bond surface area (i.e., the bond surface area being the area of overlap between the substrates to be bonded by the adhesive composition).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particle board, fiberboard, fiberglass, composite wooden I-beams (I-joists), and the like.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass. The composite can be a thermosetting composite or a thermoplastic composite. As described above, the amount and identity of the components used to prepare the composite can be selected to optimize the performance properties of the composite. In one embodiment, the amount of protein component is selected in order to optimize the performance properties of the composite.

Accordingly, in certain other embodiments, the composite comprises from about 0.5% to about 10% (w/w), from about 0.5% to about 5% (w/w), from about 0.5% to about 3% (w/w), from about 1% to about 10% (w/w), from about 1% to about 5% (w/w), or from about 1% to about 3% (w/w) of ground plant meal or isolated polypeptide composition. In certain other embodiments, the composite comprises from about 0.1% to about 8% (w/w), from about 0.1% to about 5% (w/w), from about 0.1% to about 3% (w/w), from about 0.5% to about 5% (w/w), from about 0.5% to about 3% (w/w), or from about 1% to about 3% (w/w) of a polymeric material formed by reaction of the prepolymer. In certain other embodiments, the composite comprises from about 0.5% to about 10% (w/w), from about 0.5% to about 5% (w/w), from about 0.5% to about 3% (w/w), from about 1% to about 10% (w/w), from about 1% to about 5% (w/w), or from about 1% to about 3% (w/w) of formaldehyde scavenging agent (e.g., $H_2NC(O)NH_2$). In certain other embodiments, the composite comprises from about 0.5% to about 10% (w/w), from about 0.5% to about 5% (w/w), from about 0.5% to about 3% (w/w), from about 1% to about 10% (w/w), from about 1% to about 5% (w/w), or from about 1% to about 3% (w/w) of a diluent (e.g., glycerin, corn syrup, or a mixture thereof). In certain other embodiments, the composite comprises from about 0.001% to about 5% (w/w), from about 0.005% to about 4% (w/w), from about 0.005% to about 2% (w/w), from about 0.05% to about 1% (w/w), from about 0.05% to about 2% (w/w), or from about 0.05% to about 1% (w/w) of one or more additives, such as an agent that improves moisture resistance, a pH modulator, a composite-release promoter, tacking agent, fire retardant, or wood preservative. In certain other embodiments, the composite comprises from about 0.1% to about 8% (w/w), from about 0.1% to about 5% (w/w), from about 0.1% to about 3% (w/w), from about 0.5% to about 5% (w/w), from about 0.5% to about 3% (w/w), or from about 1% to about 3% (w/w) of lignin. In certain other embodiments, the composite comprises from about 0.1% to about 8% (w/w), from about 0.1% to about 5% (w/w), from about 0.1% to about 3% (w/w), from about 0.5% to about 5% (w/w), from about 0.5% to about 3% (w/w), or from about 1% to about 3% (w/w) of a polymeric material formed by reaction of a phenol-formaldehyde resin.

In certain embodiments, the composite (or other product formed using an adhesive composition described herein) comprises from about 0.5% w/w to about 20% w/w binder formed from the adhesive composition. In certain other embodiments, the composite (or other product formed using an adhesive composition described herein) comprises from about 1% w/w to about 10% w/w, about 1% w/w to about 5% w/w, about 1% w/w to about 4% w/w, about 2% w/w to about 4% w/w, about 5% w/w to about 10% w/w, about 6% w/w to about 10% w/w, or about 6% w/w to about 8% w/w binder formed from the adhesive composition. In yet other embodiments, the composite (or other product formed using an adhesive composition described herein) comprises less than about 20% w/w, about 15% w/w, about 10% w/w, about 5% w/w, or about 1% w/w binder formed from the adhesive composition.

In certain embodiments, the composite has an internal bond strength of at least about 25 PSI, 40 PSI, 50 PSI, 70 PSI, 100 PSI, 120 PSI, or 150 PSI. In certain other embodiments, the composite has a modulus of rupture of at least about 800, 900, 1000, 1100, 1200, 1300, 1400, or 1500 PSI. In certain other embodiments, the composite has a modulus of rupture ranging from about 900 to about 1700 PSI, about 1000 to about 1700 PSI, about 1000 to about 1500 PSI, about 1100 to about 1700 PSI, about 1100 to about 1500 PSI, or about 1200 to about 1500 PSI.

The adhesive composition can be mixed with cellulosic components such as wood fiber, sawdust (sometimes referred to as "furnish"), or other components, and then permitted to cured to create a composite material. Alternatively, Parts A and B can be mixed together before or during the addition of cellulosic components. Mixing can be accomplished using conventional mixers such as paddle mixers, static mixers and the like, currently known in the art. In certain embodiments, the mixing is accomplished using a high speed paddle mixing (e.g., with a Littleford blender or a Henchel-type mixer), sigma-blade mixing, ribbon blending, etc. Additional materials can also blended concurrently or sequentially with the mixture including fillers such as calcium carbonate, aluminosilicates, clays fumed silica, nano-sized inorganic particulates, latex polymers, or antimicrobial compounds, etc.

Viscosity, sprayability, and/or spreadability of the adhesive components can be controlled by adjusting the amount of water added (or other liquid diluents such as glycerin and corn syrup).

Adhesive compositions made using ground plant meal can provide advantages in certain situations because the use of ground plant meal allows for an adhesive composition comprising less water. It is often desirable to use an adhesive composition containing less water because cure of the adhesive may use elevated temperatures which converts the water to steam, partially complicating the procedures used to cure the adhesive. A related benefit of using an adhesive composition containing ground plant meal is that it permits more adhesive to be applied to the components being bound together. This helps ensure that the components being bound together are adequately coated with adhesive, which facilitates strong bonding between the components upon curing the adhesive.

Composite products can be prepared using a binder containing a formaldehyde scavenging agent, such as urea. The amount of urea can be adjusted based the on particular end-use application of the composite, such as interior use (where more formaldehyde scavenging agent is desired to minimize formaldehyde emissions) or exterior use (where less formaldehyde scavenging agent may be acceptable because the formaldehyde emission standards are less critical for exterior applications).

Under certain circumstances, pressure and/or heat can be used to facilitate curing. The amount of pressure and the time period for which the pressure is applied are not limited and specific pressures and times will be evident to one skilled in the art from the present disclosure (see the various Examples). In certain embodiments, a pressure of approximately 10 to 250 psi is applied from about 2 minutes to about 2 hours, from about 10 minutes to about 2 hours, from about 2 minutes to about 30 minutes, or from about 10 minutes to about 30 minutes (depending on the temperature). The pressure, heating, or application of both pressure and heat may decrease the viscosity adhesive compositions described herein, facilitating their flow in the contact area, such that a bonding region is created whereby there is a continuum between the adherends. The amount of pressure, heat time or their combination can be optimized to ensure such continuum and will depend on the adherends' physical or chemical properties as well as on the rate of the adhesive's viscosity-build throughout the cure cycle.

Depending upon the adhesive used, the resulting article can be moisture resistant. Furthermore, the article may remain intact after boiling in water for 5 minutes, 10 minutes, 30 minutes, 1 hour, 2 hours, or 3 hours. Furthermore, two or more components of the article may remain bonded after boiling in water for 5 minutes, 10 minutes, 30 minutes, 1 hour, 2 hours or 3 hours. Furthermore, the article when boiled in water for 5 minutes, 10 minutes or 30 minutes, may display less than a 20% increase, or less than a 10% increase in volume relative to the article prior to exposure to the water.

Furthermore, when the article (for example, a composite material, a laminate, or a laminate containing a composite material) contains a lignocellulosic material, the article exhibits no less than 75% cohesive failure of the lignocellulosic component when the article is placed under a loading stress sufficient to break the article. In certain embodiments, when an article (resulting product) contains a lignocellulosic material, the article has a block shear strength as measured under the D905 and D2559 ASTM standards of greater than 3,000 lbs., 4,000 lbs., 5,000 lbs. or 6,000 lbs.

Additional adhesive compositions, emulsions, methods of making adhesive compositions, methods of using adhesive compositions, and articles are described in U.S. patent application Ser. Nos. 12/719,521 and 13/154,607, the contents of which are hereby incorporated by reference.

The description above describes multiple aspects and embodiments of the invention, including adhesive compositions, methods of using the adhesive compositions, and articles and composites prepared using the adhesive compositions. The patent application specifically contemplates all combinations and permutations of the aspects and embodiments. Further, throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

Practice of the invention will be more fully understood from the foregoing examples, which are presented herein for illustrative purposes only, and should not be construed as limiting the invention in any way.

EXAMPLES

Example 1: Isolation of Polypeptide Compositions

Exemplary procedures for isolating and characterizing the water-insoluble polypeptide composition, water-soluble polypeptide composition, or a mixture thereof are described below.

Procedure A: Preparation of Water-Insoluble Polypeptide Composition and Preparation of Water-Soluble Polypeptide Composition.

Everlase digested protein from castor (experimental sample lot 5-90) was obtained from Prof. S. Braun at the Laboratory of the Department of Applied Biology at the Hebrew University of Jerusalem, Israel. Digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16L Type EX® (NOVOZYMES') is added at the ratio of 20 g per kg of castor meal protein, and the mixture is stirred at the same temperature for about 4 hours. Finally, the resulting mixture is brought to a pH 3.5 with citric acid and spray-dried to provide a powder.

The Everlase digested protein from castor (lot 5-90) was fractionated to yield a water-soluble fraction, and a water-insoluble, dispersible fraction. In the first step, 300 g of digested castor was slurried into 1 liter of distilled water. The mixture was shaken by hand, and was then placed into a sonicator bath for a period of 30 minutes. The slurry then was removed and was allowed to set idle for a period of up to two days to allow the insoluble portion to settle (in separate experiments, it was found that centrifuging was equally adequate). At that point, the clear yellow/amber supernatant was pipetted away and was retained for future use. Fresh distilled water was then added to the sediment to bring the total volume back to the 1-Liter mark on the container. The process of shaking, sonicating, settling, supernatant extracting, and replenishing with fresh distilled water (washing) then was repeated (6 times in total). In the final step, the water was pipetted from the top of the grayish-black sediment, and the sediment was then dried in a vacuum oven at 45° C. Based on the sediment's dry weight, the water-insoluble/water-dispersible polypeptide fraction was determined to comprise of approximately 50% by weight of the digested castor. Separately, the $1^{st}$ and $2^{nd}$ supernatants were combined and were then dried to yield a transparent yellow-colored, water-soluble polypeptide fraction.

After drying the fractions, it was verified that the grayish-black sediment (the water-insoluble and dispersible fraction) could not be re-dissolved in water. On the other hand, the dried supernatant fraction (clear/amber, glassy solid) was completely soluble in water.

Figure 2:
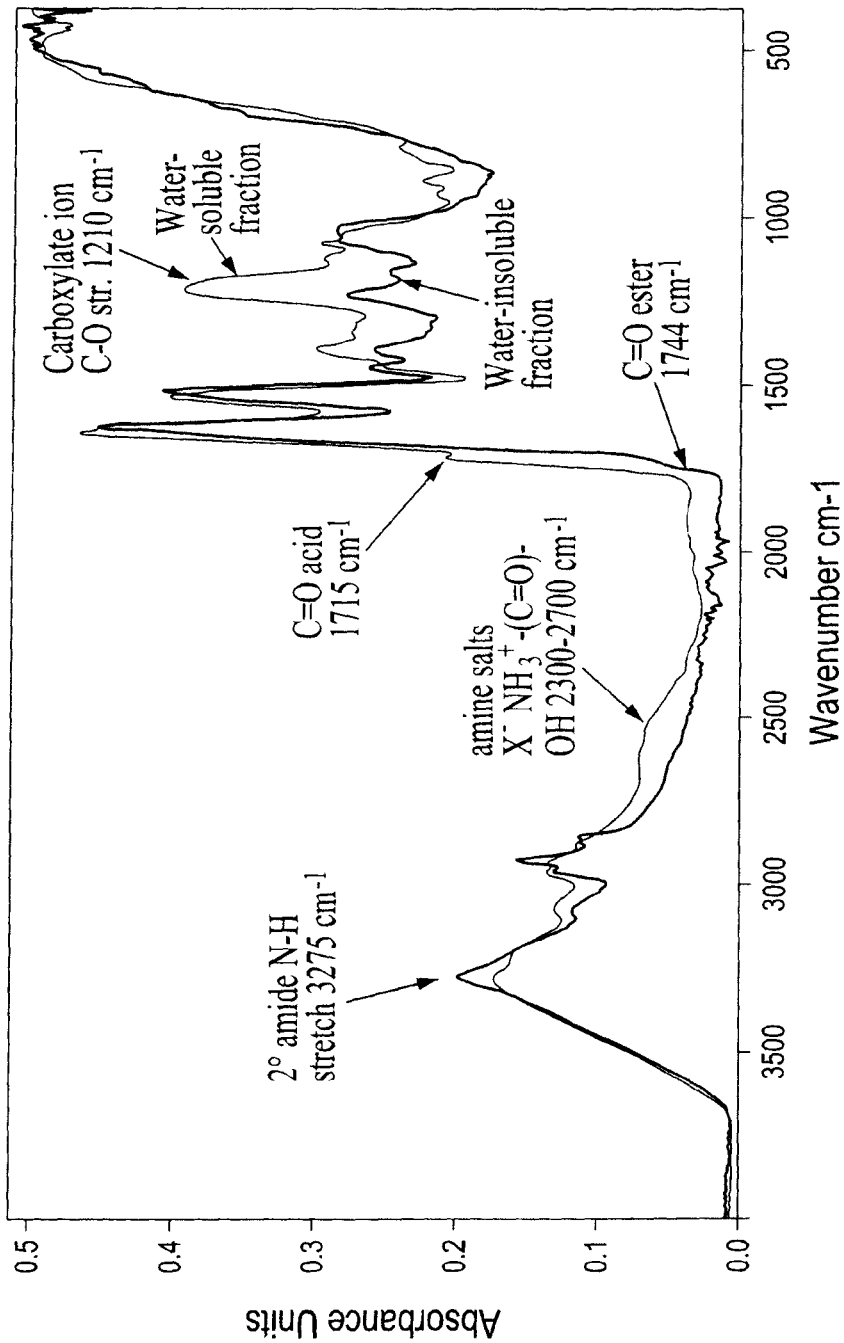
FIG. 2 shows overlaid solid state FTIR spectra for water-soluble and water-insoluble protein fractions isolated from digested castor lot 5-90.
Figure 3:
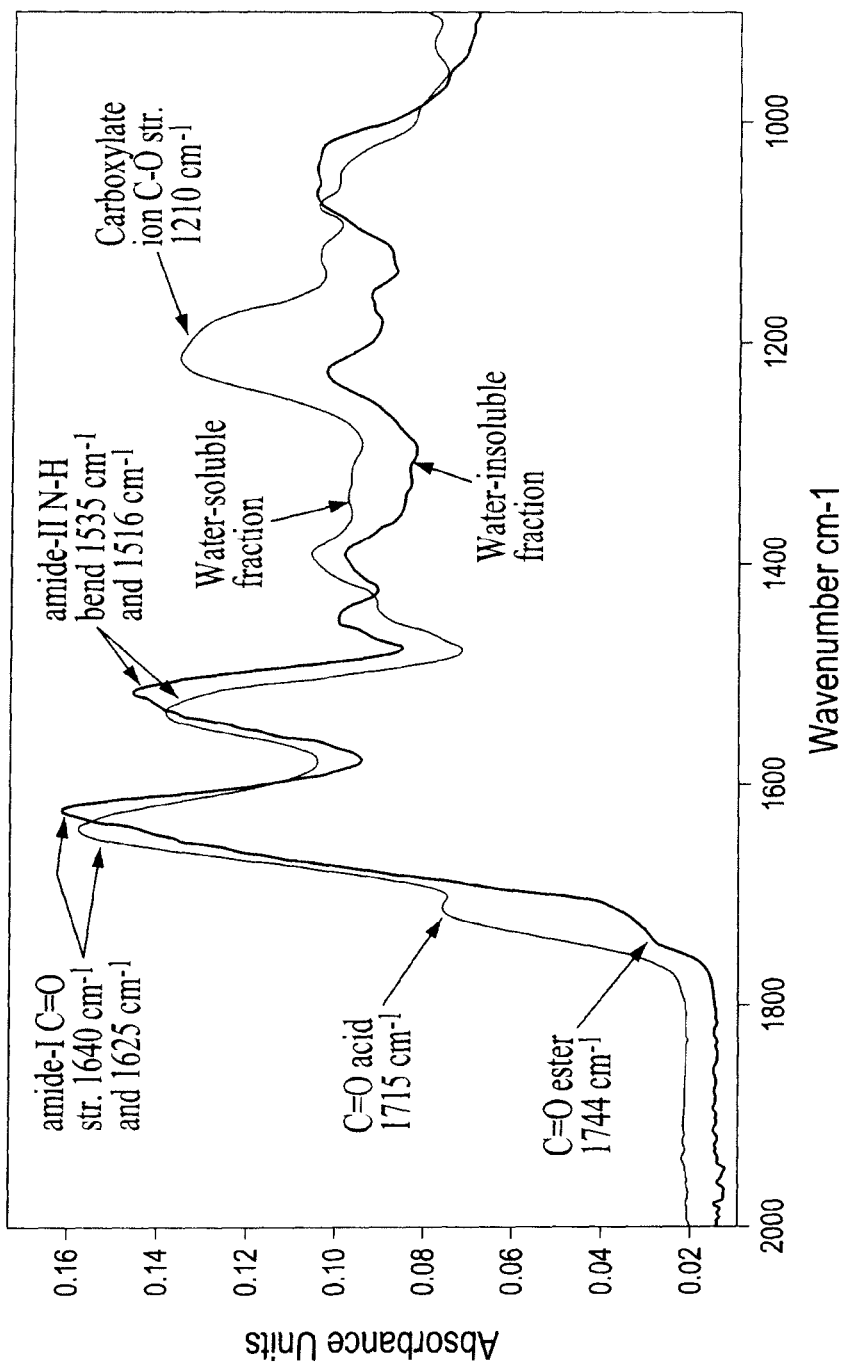
FIG. 3 shows solid state FTIR spectra of isolated water-soluble and water-insoluble fractions from digested castor, where the carbonyl amide region is expanded.
Figure 4:
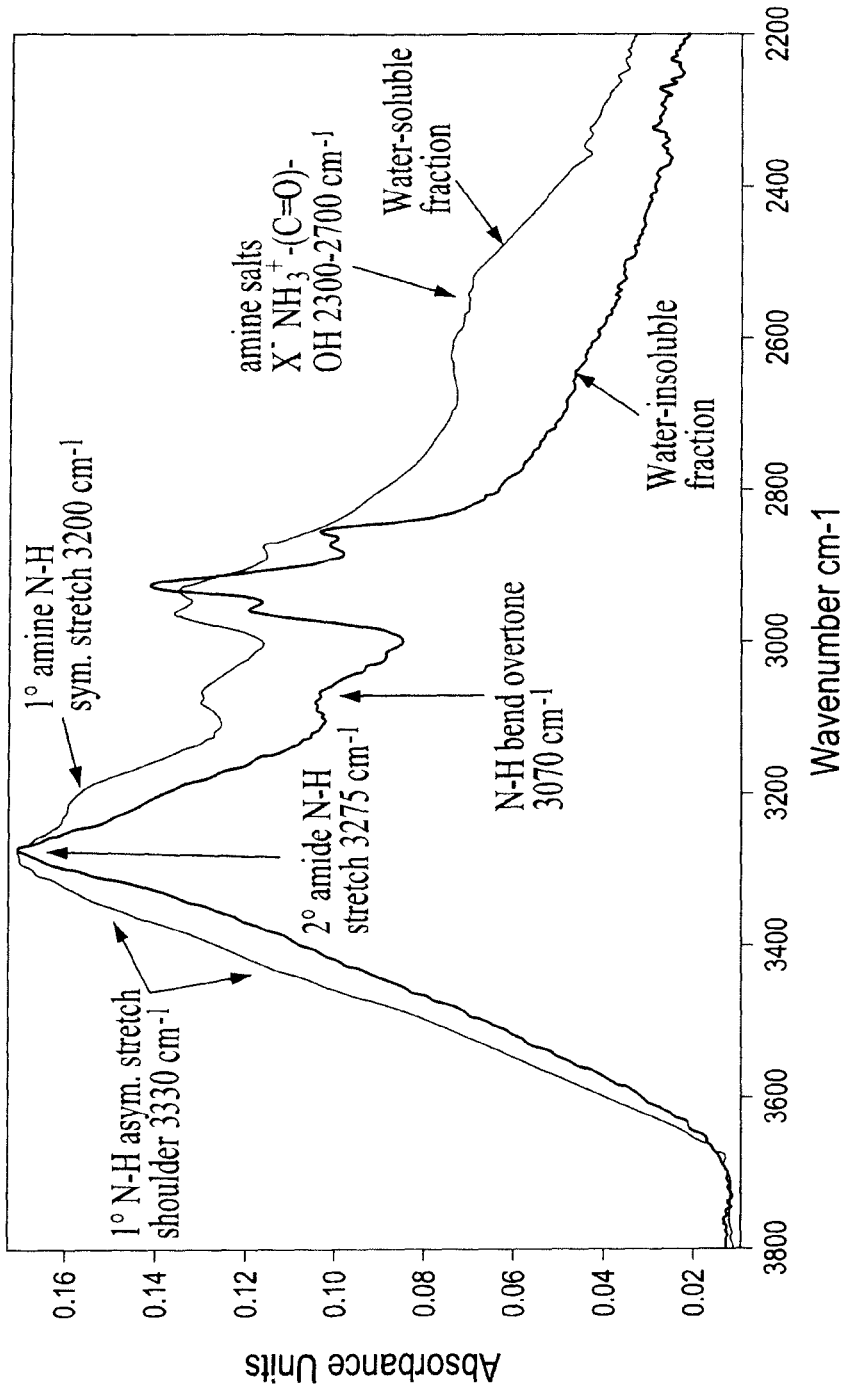
FIG. 4 shows solid state FTIR spectra of isolated water-soluble and water-insoluble fractions from digested castor where the N—H stretching region is expanded.

The two fractions were separately analyzed by solid state FTIR (see FIGS. 2-4). The spectra in FIG. 2 show that carboxylate and amine salt moieties are primarily associated with the water-soluble fraction. FIG. 3 shows that the amide carbonyl stretch band and the amide N—H bend bands are shifted to higher wavenumbers in the water-soluble polypeptide fraction. These components also appear to be present in the water-insoluble dispersible polypeptide fraction, but the predominant amide-I and amide-II bands are shifted to lower wavenumbers. Aside from hydrogen bonding effects, these differences also appear to be related to the presence of a higher fraction of primary amide groups in the water-soluble polypeptide fraction, and to a higher fraction of secondary amide groups in the water-dispersible polypeptide fraction (from the main-chain polypeptide chains). This is corroborated by the N—H stretching region depicted in FIG. 4.

FIG. 4 shows solid state FTIR spectra of isolated fraction from digested castor where the N—H stretching region from FIG. 2 is expanded. The spectra were vertically scaled to achieve equivalent absorbance intensities for the secondary amide N—H stretch band centered at 3275 $cm^{-1}$. FIG. 4 shows that the predominant type of amide in the water-dispersible fraction is the secondary main-chain amide as evidenced by the single, highly symmetric band centered at 3275 $cm^{-1}$. Although the water-soluble fraction also contains this type of amide, it also contains significantly higher fractions of primary amides as evidenced by the presence of the two primary N—H stretching bands at approximately 3200 $cm^{-1}$ (symmetric) and at approximately 3300 $cm^{-1}$ (asymmetric), respectively.

These spectra show that the water-soluble polypeptide fraction contained a relatively high concentration of primary amines, free carboxylic acids, acid salts, and amine salts. Conversely, the water-insoluble/water-dispersible polypeptide fraction had a higher fraction of secondary amides. In addition, the amide-I carbonyl absorption band for the water-insoluble/water-dispersible fraction was observed to appear at a wavenumber of approximately 1625 $cm^{-1}$, whereas that of the water-soluble fraction was observed at approximately 1640 $cm^{-1}$. As will be discussed elsewhere, this feature is one of the distinguishing differences between the water-soluble and water-insoluble polypeptide fractions; not only for castor proteins, but for soy proteins and canola proteins as well.

Procedure B: Additional Procedure for Preparation of Water-Insoluble Polypeptide Composition and Preparation of Water-Soluble Polypeptide Composition.

Digested soy protein was obtained as an experimental sample (lot 5-81) from Prof. S. Braun, the Laboratory of Applied Biology at the Hebrew University of Jerusalem, Israel. The digested soy protein was prepared as follows. Soy protein isolate (Soy protein isolate SOLPRO 958® Solbar Industries Ltd, POB 2230, Ashdod 77121, Israel) was suspended in water at a ratio of 1:10 (w/w). The pH of the suspension was adjusted to pH 7 with 10N NaOH, and was then heated to 55° C. while stirring. Neutrase 0.8 L® (NOVOZYMES') then was added at a ratio of 20 g per kg of soy protein, and the mixture was stirred at the same temperature for 4 hours. The resulting mixture (pH 6.5) was spray-dried to yield a light tan powder.

Digested soy (lot 5-81) was fractionated to yield a water-soluble polypeptide fraction, and a water-insoluble/water-dispersible polypeptide fraction. In the first step, 300 g of digested soy was slurried into 1 liter of distilled water. The mixture was shaken by hand, and was then placed into a sonicator bath for a period of 30 minutes. Aliquots were placed into centrifuge tubes, and the tubes were then spun at 3,400 rpm for a period of approximately 35 minutes. The centrifuged supernatant, which contained the water-soluble fraction, was decanted off of the remaining water-insoluble sediment, and was poured into a separate container for later use (this clear yellow supernatant was placed into an open pan and was allowed to evaporate dry at a temperature of 37° C.). After the first washing step, fresh distilled water was then added to the tubes, and the remaining sediment was dispersed into the water by means of hand-stirring with a spatula. The combined centrifugation, decanting, and re-dispersion procedures were performed for a total of 5 cycles. After the final cycle, the free liquid containing residual water-soluble protein was decanted from the residual paste-like dispersion (yellowish-peach in color). The resulting dispersion (gravimetrically determined to be 16.24% solids by weight) contained the water-insoluble/water-dispersible proteins.

The paste-like dispersion was observed to be stable for a period of several weeks. It was also discovered that the dispersion could be readily combined with water-soluble polymers, and with water-dispersible polymer latexes. Moreover, the dispersion was readily compatible with PMDI (a stable dispersion was formed when PMDI was added to the slurry, and there was no evidence of PMDI phase separation, even after 24 hours). By contrast, neither the water soluble extract from the digested soy, nor the digested soy itself was capable of stabilizing a dispersion of PMDI in water.

After drying aliquots of both fractions, it was verified that the yellow sediment (the water-insoluble/water-dispersible extract) could not be re-dissolved in water. On the other hand, the dried supernatant fraction (clear/yellow solid) was completely soluble in water. The two dried extracts were separately analyzed by solid state FTIR (see FIGS. 5-8). FIG. 6 shows overlaid solid state FTIR spectra of isolated fractions from digested soy, where the N—H region is expanded. The spectra were vertically scaled to achieve equivalent absorbance intensities for the secondary amide N—H stretch band centered at 3275 $cm^{-1}$. FIG. 6 shows that the predominant type of amide in the water-dispersible fraction is the secondary main-chain amide as evidenced by the single, highly symmetric band centered at 3275 cm$^{-1}$. Although the water-soluble polypeptide fraction also contains this type of amide, it also contains significantly higher fractions of primary amides as evidenced by the presence of the two primary N—H stretching bands at approximately 3200 cm$^{-1}$ (symmetric) and at approximately 3300 cm$^{-1}$ (asymmetric), respectively. Collectively, these spectra revealed that the water-soluble polypeptide fraction was comprised of a relatively high concentration of primary amines. Conversely, the water-insoluble, dispersible polypeptide fraction was comprised of a higher fraction of secondary amines.

Figure 5:
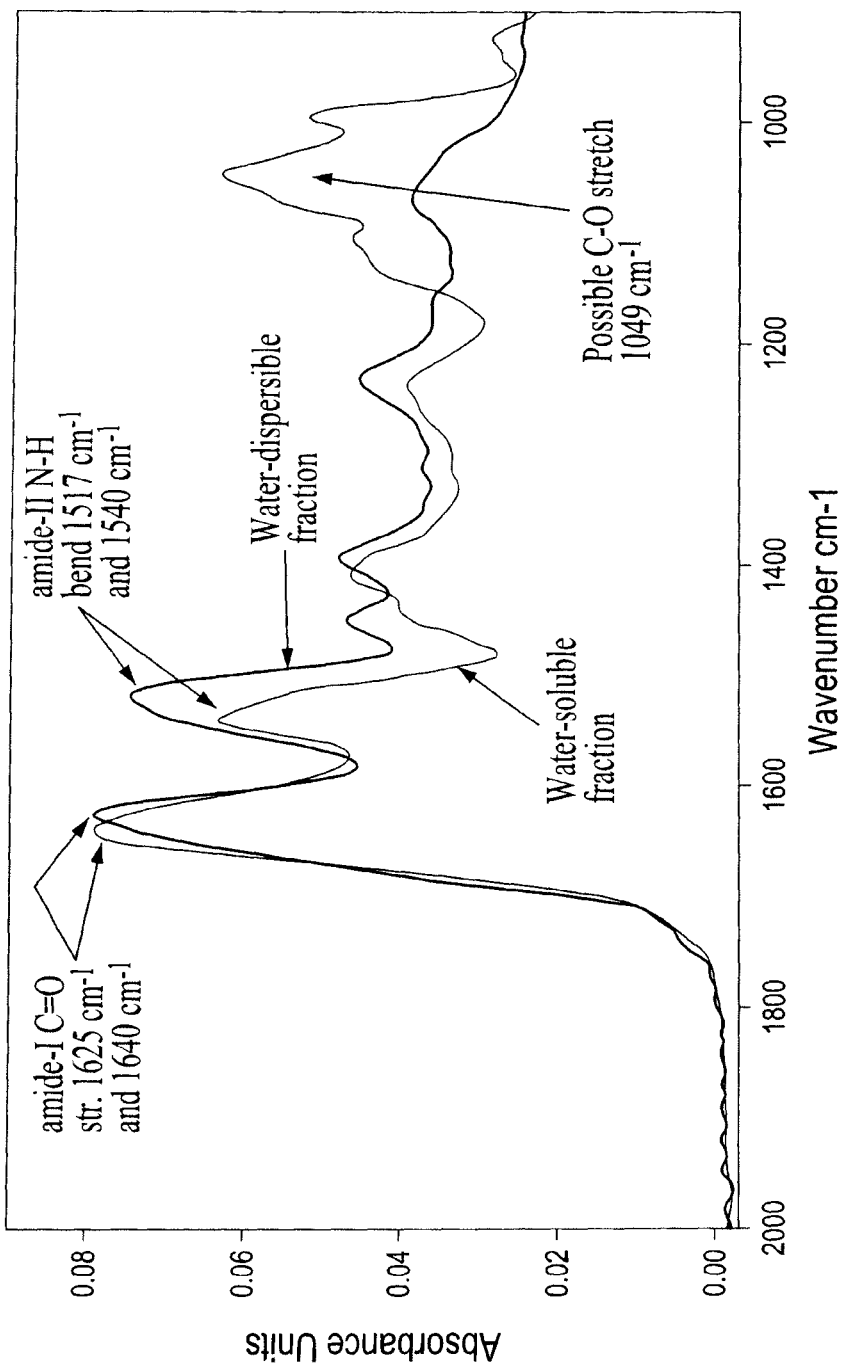
FIG. 5 shows overlaid solid state FTIR spectra of isolated fractions from castor protein (lot 5-94), showing an expansion of the carbonyl amide region (water-soluble fraction, and water-insoluble/water-dispersible fraction)
Figure 6:
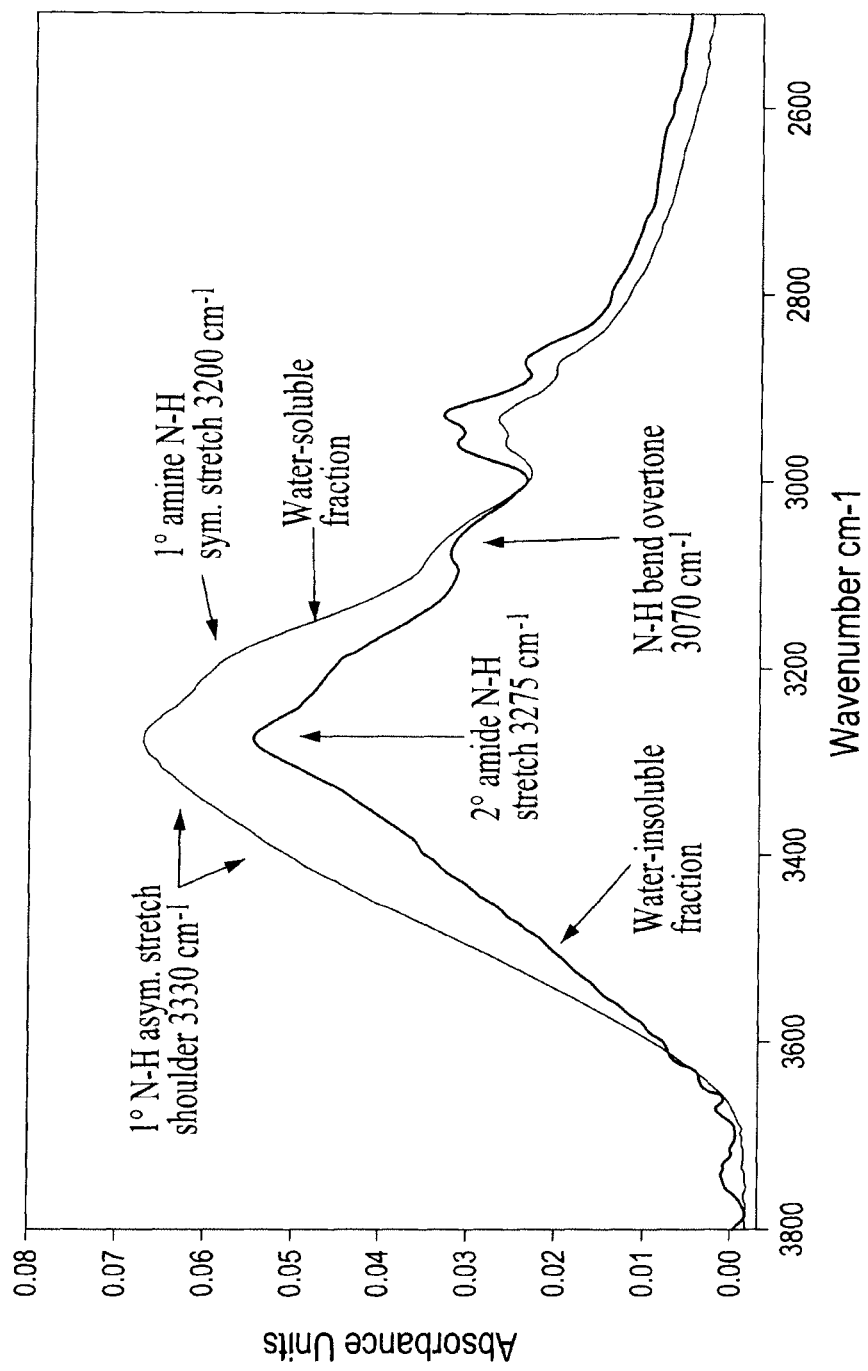
FIG. 6 shows the solid state FTIR spectra of isolated water-soluble and water-insoluble fractions from castor protein (lot 5-94), where the N—H and O—H stretch regions are expanded.
Figure 7:
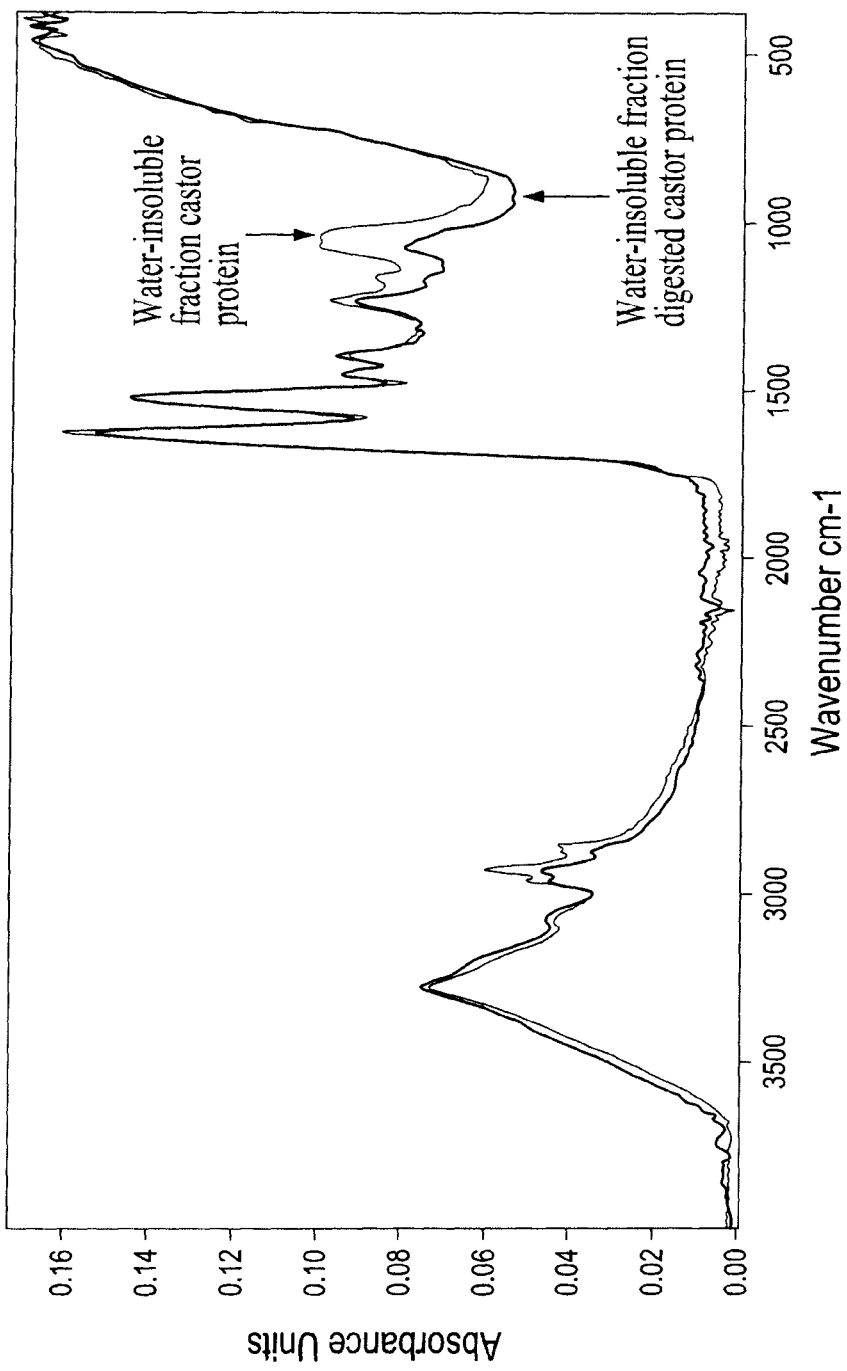
FIG. 7 shows overlaid solid state FTIR spectra of the isolated water-insoluble/water-dispersible fractions from castor protein (lot 5-94) and from enzyme digested castor (lot 5-90)
Figure 8:
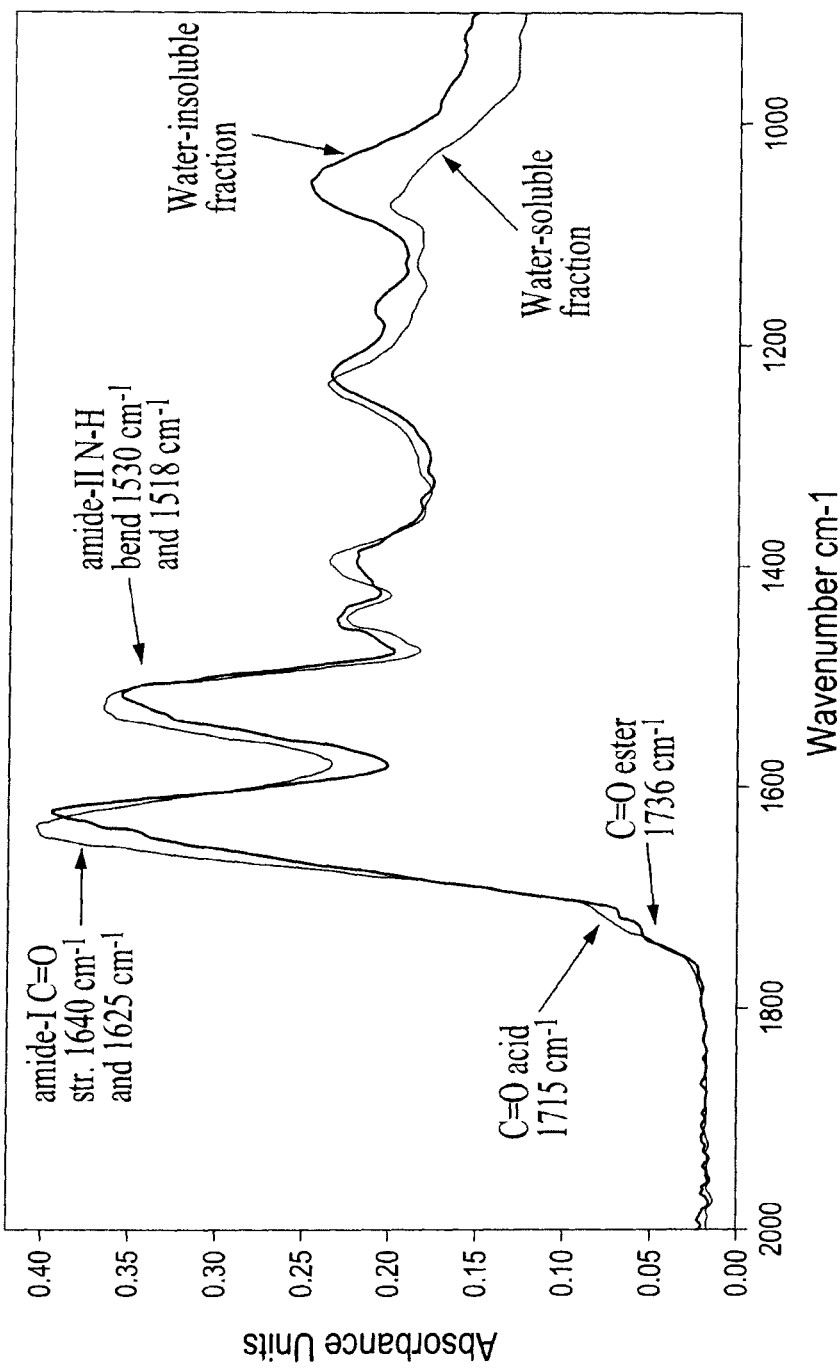
FIG. 8 shows overlaid solid state FTIR spectra of isolated water-soluble and water-insoluble fractions from digested soy, where the carbonyl amide region is expanded, where the spectra were vertically scaled to achieve equivalent absorbance intensities for the amide-I carbonyl stretch.
Figure 9:
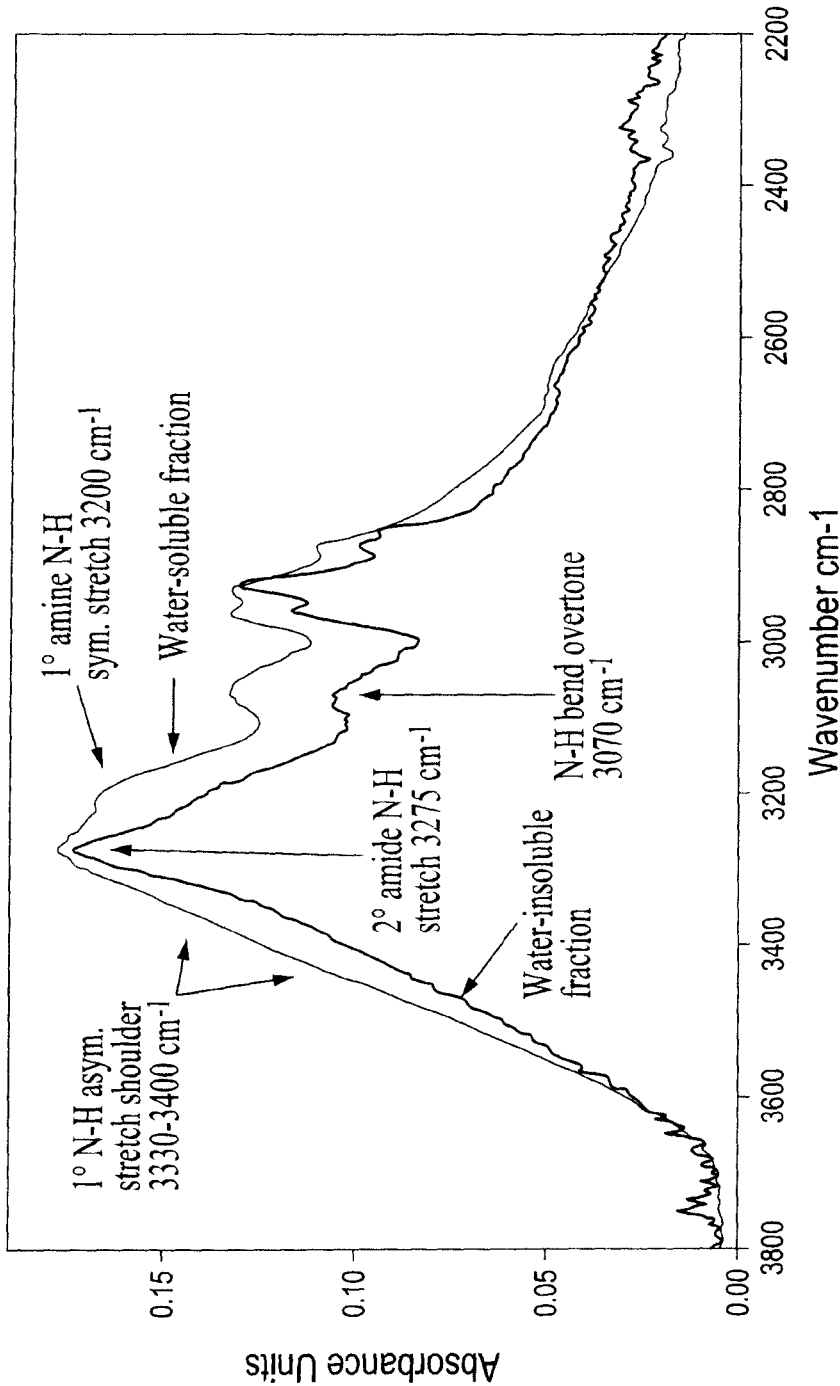
FIG. 9 shows overlaid solid state FTIR spectra of isolated water-soluble and water-insoluble fractions from digested soy, where the N—H stretching region is expanded.

As shown in FIG. 5, the amide carbonyl stretch band and the amide N—H bend band are shifted to higher wavenumbers in the water-soluble fraction. These components also appear to be present in the water-insoluble dispersible fraction, but the predominant amide-I and amide-II bands are shifted to lower wavenumbers. Aside from hydrogen bonding effects, these differences appear to be related to the presence of a higher fraction of primary amide groups (and/or primary amines) in the water-soluble polypeptide fraction (from lower molecular weight amino acid fragments), and to a higher fraction of secondary amide groups in the water-dispersible polypeptide fraction (from the main-chain polypeptide chains). This is supported by the N—H stretching region depicted in FIG. 4.

FIG. 6 shows that the predominant type of amide in the water-dispersible fraction is the secondary main-chain amide as evidenced by the single, highly symmetric band centered at 3275 cm$^{-1}$. Although the water-soluble fraction also contains this type of amide, it also contains significantly higher fractions of primary amines as evidenced by the presence of the two primary N—H stretching bands at 3200 cm$^{-1}$ (symmetric) and at approximately 3300 cm$^{-1}$ (asymmetric), respectively.

Figure 10:
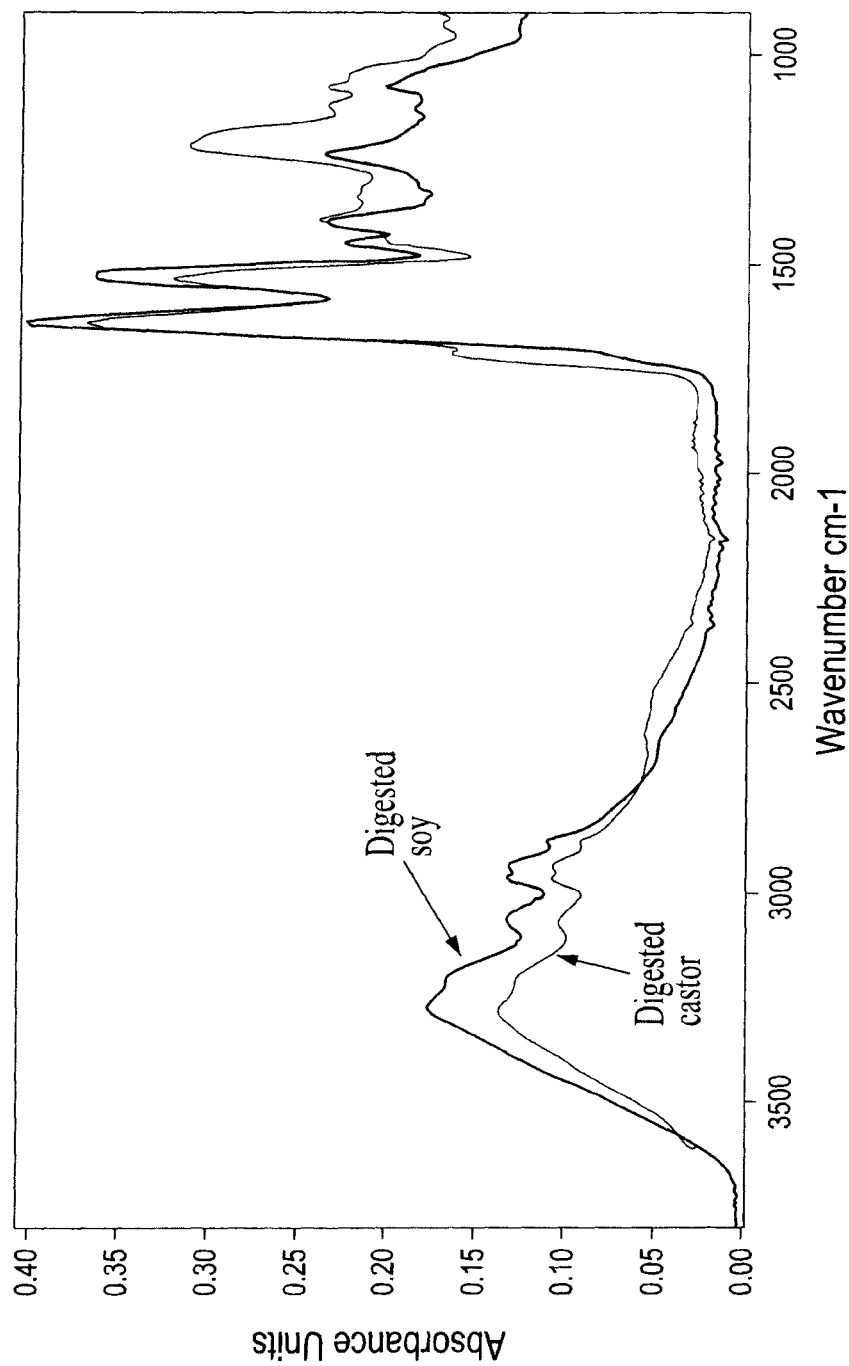
FIG. 10 shows overlaid solid state FTIR spectra of isolated water-soluble polypeptide fractions from digested soy and digested castor.
Figure 11:
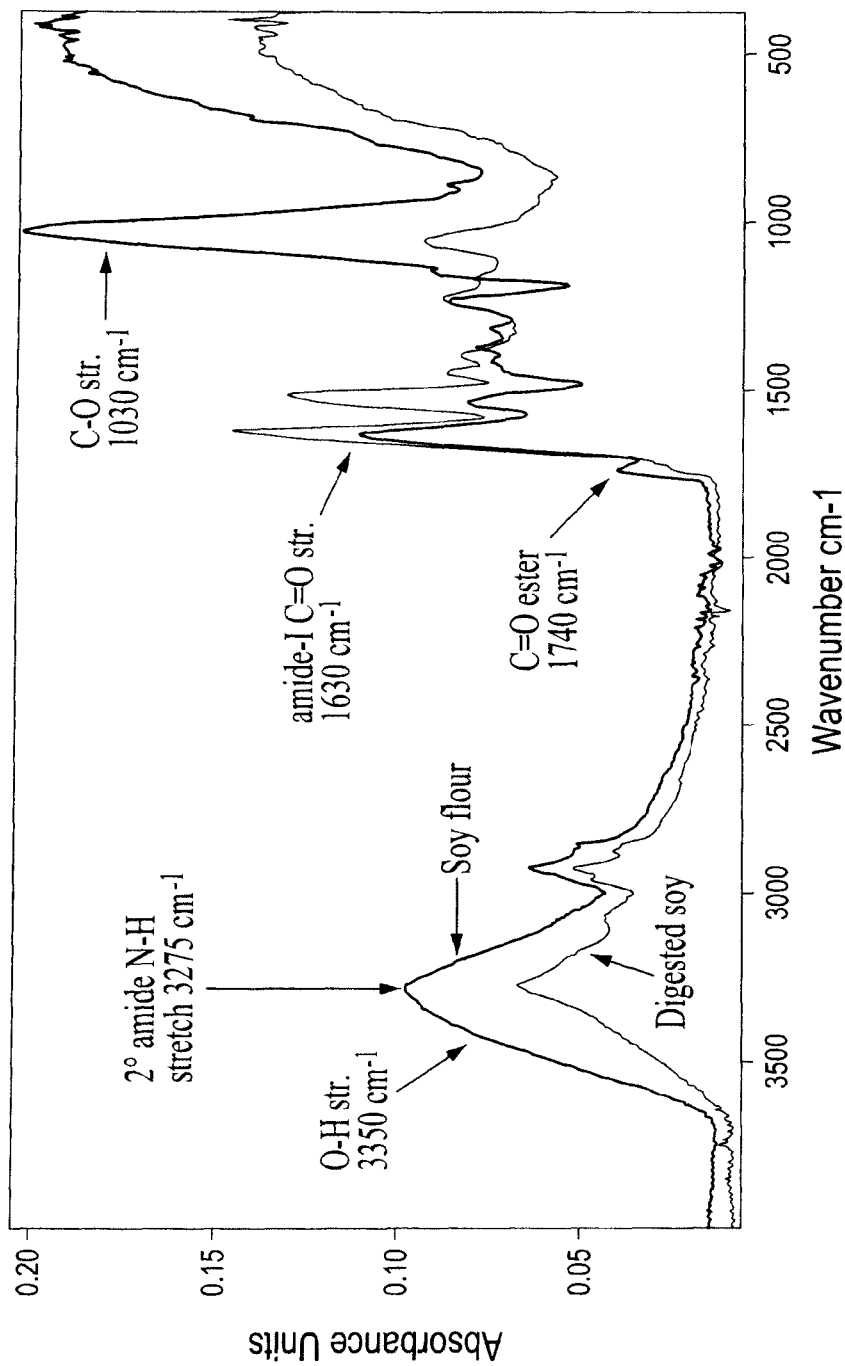
FIG. 11 shows overlaid solid state FTIR spectra of isolated water-insoluble fractions from digested soy and soy flour.
Figure 12:
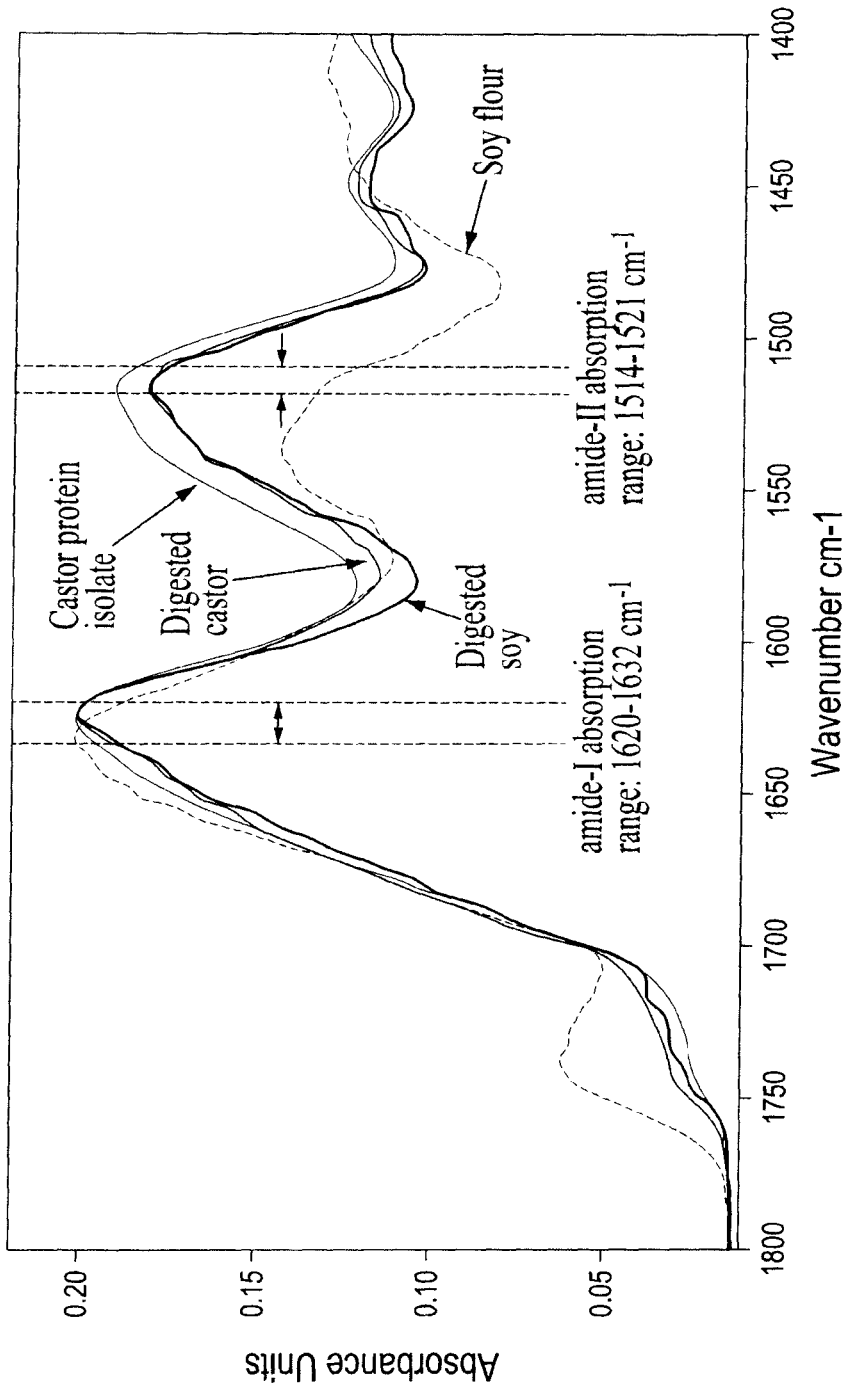
FIG. 12 shows overlaid solid state FTIR surface ATR spectra of the isolated water-insoluble/water-dispersible fractions from multiple protein samples (digested soy lot 5-81, soy flour, castor protein isolate lot 5-94, digested castor lot 5-90) where the carbonyl amide region is expanded.

In spite of being derived from different plant sources, the water-insoluble dispersible fractions from digested soy and digested castor are spectrally similar to one another (see FIG. 12). Conversely, the water-soluble polypeptide fractions appear to have different FTIR spectral characteristics (see FIG. 10). Further, MALDI mass spectroscopic indicates the water-soluble polypeptide fractions from digested soy and digested castor have different molecular weight characteristics. The commonality between the two types of water-soluble fractions is that they both appear to contain primary amines/amides.

Procedure C: Additional Procedure for Preparation of Water-Insoluble Polypeptide Composition and Preparation of Water-Soluble Polypeptide Composition Castor meal (4.0 kg containing 24.8% protein) was suspended in 0.1M NaOH at a 10:1 w/w meal to alkali ratio. The suspension was stirred for 18 hours at ambient temperature and the solids were then removed by centrifugation. The supernatant (about 32 liters) was acidified to pH 4.5 with 10 N HCl. The protein was allowed to sediment for about 10° C. for 12 hours, the clear supernatant solution was decanted, and the heavy precipitate (about 2 kg) was collected by centrifugation. The wet precipitate was freeze-dried yielding 670 g protein isolate.

The water-insoluble and water-soluble polypeptide fractions were obtained by means of extraction with water. In the first step, 10 g of the castor protein isolate (lot 5-94) was slurried into 50 g of distilled water. The mixture was dispersed via mechanical stirring for 2 hours. Aliquots then were placed into centrifuge tubes, and the tubes were then spun at 3,400 rpm for a period of approximately 35 minutes. The centrifuged supernatant, which contained the water-soluble fraction, was decanted from the remaining water-insoluble sediment, and was poured into a separate container (this clear yellow supernatant was saved and dried at 37° C. for subsequent dispersion experiments and solid state FTIR analyses). After the first washing step, fresh distilled water was then added to the tubes, and the remaining sediment was dispersed into the water by means of hand-stirring with a spatula. The combined centrifugation, decanting, and re-dispersion procedures were performed for a total of 13 cycles. After the final cycle, the free liquid was decanted from the residual paste-like dispersion (the water-insoluble polypeptide fraction from the starting castor protein). Upon drying, the paste was determined to contain 28.58% solids, and the total yield of the water-insoluble fraction was determined to be 62.87%. Thus, the starting castor protein itself contained 62.87% water-insoluble polypeptide material, and 37.12% water-soluble polypeptide material.

Procedure D: Preparation of Digested Whey Protein.

Digested whey protein (lot 5-72, referred to herein as digested whey protein pH 6.5) was obtained as an experimental sample from Prof. S. Braun, the Laboratory of Applied Biology at the Hebrew University of Jerusalem, Israel, and was prepared as follows; Whey protein (WPI-95® Whey Protein Isolate; Nutritteck, 24 Seguin Street, Rigaud, QC, Canada J0P 1P0) was suspended in water at a ratio of 1:6 (w/w). The pH of the suspension was adjusted to pH 7 with 5N NaOH, and was heated to 55° C. while stirring. FLAVOURZYME 500MG® (from NOVOZYMES') then was added at a ratio of 20 g per kg of whey protein, and the mixture was stirred at the same temperature for 4 hours. The resulting aqueous mixture was pH 6.5. The resulting mixture then was spray-dried to yield digested whey protein as a pale yellow powder containing a mixture of water-soluble and water-insoluble polypeptide.

Procedure E: Preparation of Digested Castor Protein Reacted with Sodium Nitrite.

Castor meal protein was suspended in water at a ratio of 1:10 (w/w). Calcium chloride was added at an effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at a ratio of 10 g per kg of castor meal protein, and the mixture was stirred at the same temperature for 4 hours. L-lactic acid (90%, 120 g per kg castor protein) then was added to bring the mixture to pH 4.4 followed by gradual addition (over a 20 hour period) of sodium nitrite solution in water (0.4 kg/l, 0.4 liter per kg castor protein) while stirring. The reaction then was left to stand at ambient temperature for 40 hours. Na$_2$S$_2$O$_5$ (0.2 kg per kg castor protein) was then added, and the reaction was heated to 60° C. and stirred for 15 minutes. After cooling to ambient temperature, the reaction was brought to pH 2.0 with concentrated HCl. It was then left at 10° C. for 18 hours, and the resulting precipitate was separated by centrifugation for 15 minutes at 24,000×g. The precipitate was re-suspended in 10 mM citric acid (3 vol. per vol. precipitate), and then it was collected and subsequently freeze-dried to yield a tan powder containing a mixture of water-soluble and water-insoluble polypeptide.

Procedure F: Isolation of Water-Insoluble/Water-Dispersible Protein Fraction and Water-Soluble Protein Fraction by Washing Ground Soy Meal with Water, and Characterization of Same Part I: Isolation of Water-Insoluble/Water-Dispersible Protein Fraction and Water-Soluble Protein Fraction Soy meal (same as Example 1) having a particle size range of 20-70 μm was mixed with distilled water (pH approximately 7) to yield a 27.83% meal dispersion in water (w/w). In the first "wash" step, an aliquot of the dispersion was centrifuged for 60 minutes, and the clear supernatant containing a water-soluble protein fraction was decanted from the wet slurry that remained on the bottom of the centrifuged tube (in a separate experiment, this wet slurry was gravimetrically determined to contain approximately 33% solids in water (w/w); and the supernatant was gravimetrically determined to contain approximately 15% by weight solids (w/w)). The yield of the water-insoluble/ water-dispersible protein fraction after the first "wash" step was determined to be approximately 80% of the starting meal weight.

In a second step, the 33% solids fraction from the first wash step was mixed and dispersed in fresh distilled water (pH approximately 7), and the dispersion was centrifuged for a second time. Again, the clear supernatant was decanted, and the remaining slurry was subjected to a third wash cycle (addition of fresh distilled water followed by centrifuging). After the third "wash" step and supernatant decanting, the resulting slurry of water-insoluble/water-dispersible protein fraction was gravimetrically determined to contain approximately 24% solids, and the yield was determined to be approximately 53% of the starting meal weight. Thus, the ground soy meal itself was comprised of approximately 53% of a water-insoluble/water-dispersible protein fraction, and approximately 47% of a water-soluble protein fraction.

Part II: Disperion Analysis for Water-Insoluble/Water-Dispersible Protein Fraction, Water-Soluble Protein Fraction, and Ground Soy Meal An aliquot of the 24% solids dispersion of the isolated water-insoluble/water-dispersible protein fraction (washed 3 times as noted above) was blended with PMDI at a w/w ratio of 1 part PMDI to 1 part of protein fraction. The resulting mixture formed a stable dispersion, and remained stable during a 1 hour period of observation with no visual signs of phase separation.

In order to test dispersion ability of ground soy meal, a dispersion of 24% (w/w) ground soy meal in water was mixed with PMDI at a 1:1 w/w ratio of PMDI to soy meal solids. The soy meal comprised approximately 53% by weight of a water-insoluble/water-dispersible protein fraction and approximately 47% by weight of a water-soluble protein fraction. The mixture of ground meal and PMDI formed a stable dispersion which remained stable during a 1 hour period of observation with no visual signs of phase separation.

In order to test dispersion ability of water-soluble protein faction, water-soluble protein fraction obtained from the soy meal (by first washing the soy meal, then isolating the water-soluble fraction by drying the supernatant after centrifuging) was dissolved in water to yield a 24% solids solution (w/w). When PMDI was added to this solution (at a 1:1 weight ratio of PMDI to water-soluble protein fraction), the resulting mixture was unstable, and phase separation was visually evident—immediately after mixing.

The experimental results above demonstrate that water-emulsified PMDI-containing adhesive compositions can be prepared with i) water-insoluble/water-dispersible protein fractions obtained by washing ground plant meals, and ii) ground plant meal compositions that are comprised of both a water-insoluble/water-dispersible protein fraction and a water-soluble protein fraction. The water-soluble protein fraction does not facilitate dispersion, but the water-insoluble/water-dispersible protein fraction is present in an amount sufficient to facilitate dispersion.

Various commercially available compositions derived from plant meals, such as soy flour, are solvent-extracted which result in removal of water-insoluble protein components. Such compositions are unable to facilitate dispersion, and, thus, are less desirable for use making an adhesive.

Part III: FTIR Analysis of Water-Insoluble/Water-Dispersible Protein Fraction, Water-Soluble Protein Fraction, and Ground Soy Meal Solid state surface ATR FTIR experiments were performed on water-insoluble/water-dispersible protein fraction (this sample was collected after the third wash cycle and was allowed to dry at 23° C., and water-soluble protein fraction (this sample was collected from the clear supernatant after the third wash cycle, and was allowed to dry at 23° C. to yield a transparent amber solid) obtained by washing soy meal with water. Characteristics of the FTIR spectra are described below.

Figure 16:
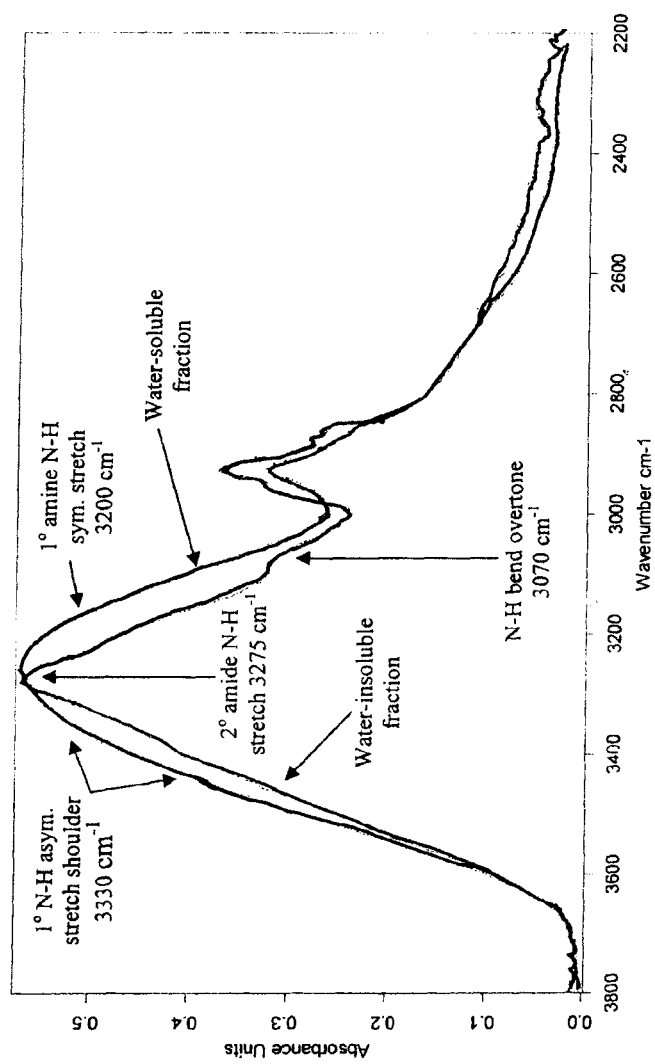
FIG. 16 shows solid state FTIR spectra of isolated water-soluble and water-insoluble fractions obtained from ground soy meal, where the N—H and O—H stretch regions are expanded.

FIG. 16 shows the solid state FTIR spectra for the isolated water-insoluble/water-dispersible protein fraction from soy meal together with the water-soluble protein fraction where the N—H stretching region has been expanded. The spectra were vertically scaled to achieve equivalent absorbance intensities for the secondary amide N—H stretch band centered at 3275 cm$^{-1}$. FIG. 16 shows that the predominant type of amide in the water-insoluble/water-dispersible protein fraction is the secondary main-chain amide as evidenced by the single, highly symmetric band centered near 3275 cm$^{-1}$. Although the water-soluble fraction also contains this type of amide, it also contains significantly higher fractions of primary amides as evidenced by the presence of the two primary N—H stretching bands at approximately 3200 cm$^{-1}$ (symmetric) and at approximately 3300 cm$^{-1}$ (asymmetric), respectively.

Figure 17:
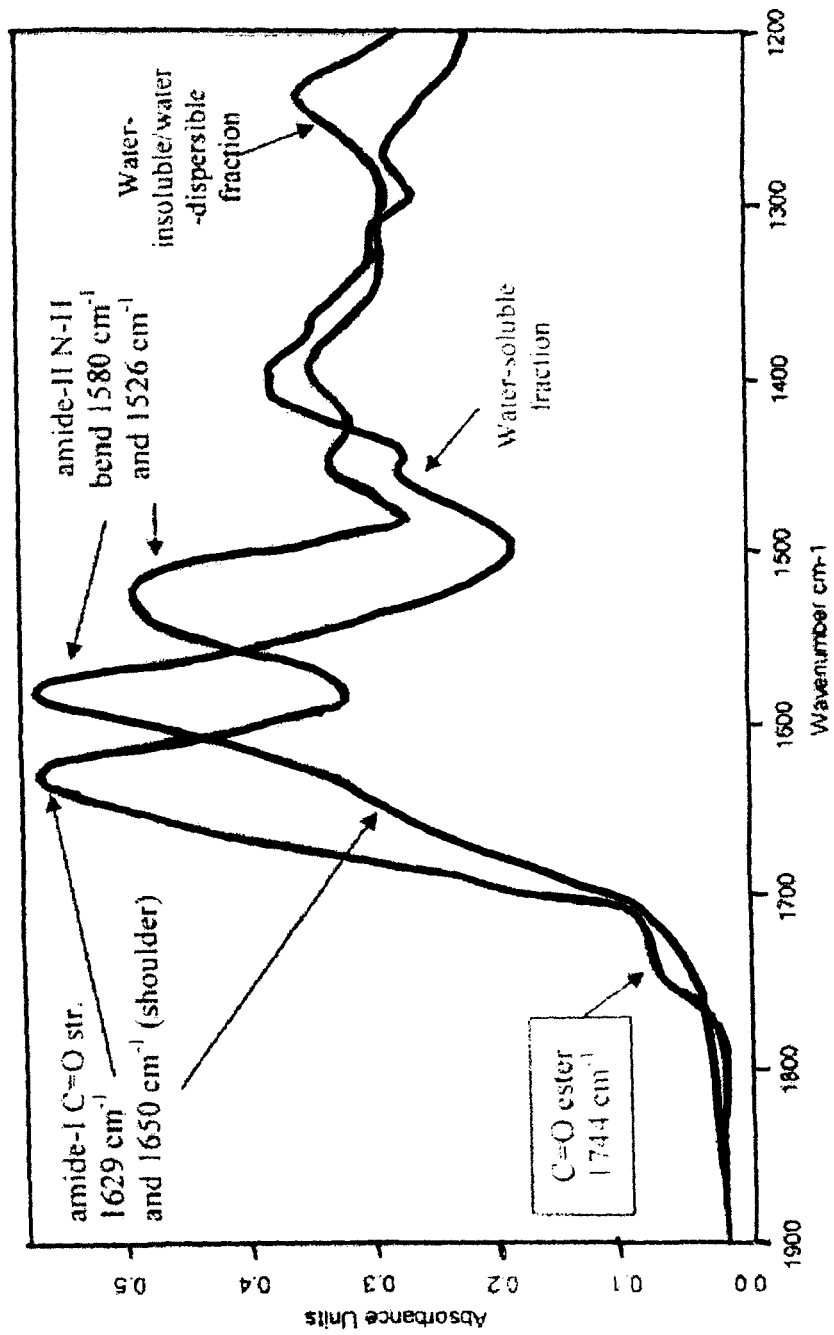
FIG. 17 shows overlaid solid state FTIR spectra of isolated water-soluble and water-insoluble fractions obtained from ground soy meal, where the carbonyl amide region is expanded and the spectra were vertically scaled to achieve equivalent absorbance intensities for the amide-I carbonyl stretch.

As shown in FIG. 17, the amide-I carbonyl absorption band for the water-insoluble/water-dispersible protein fraction was observed to appear at a wavenumber of approximately 1629 cm$^{-1}$, whereas that of the water-soluble protein fraction was observed to appear at approximately 1650 cm$^{-1}$. This feature is one of the distinguishing differences between the water-soluble protein fraction and water-insoluble/water-dispersible protein fraction, not only for isolated polypeptides from castor and soy proteins, but for protein-containing fractions that are isolated directly from plant meals like soy meal. Moreover, the amide-II band for the water-insoluble/water-dispersible protein fraction was observed to appear as a broad band centered at approximately 1526 cm$^{-1}$, whereas that of the water-soluble protein fraction was observed to appear at approximately 1580 cm$^{-1}$ together with a weak shoulder at approximately 1547 cm$^{-1}$.

Example 2: Characterization of Polypeptide Compositions by Mass Spectrometry

This Example describes characterization of the various protein samples via MALDI Mass Spectrometry using an Ultraflex III instrument from Bruker.

The instrument was set in positive mode, in order to detect positive ions generated during the ionization process. The voltage applied to accelerate the ion into the TOF analyzer was set at 25 KV. The analysis was carried out by using the instrument in reflection mode which improves the resolution. Solid samples were dissolved in DMSO at a concentration of 10 mg/mL. Water-soluble supernatant fractions which were solvated in water.

Each sample solution was mixed with a matrix solution (for analytical purposes). The matrix was an inert compound of low molecular weight which absorbs at the same wavelength of the laser, Nd:YAG 355 nm. The matrices used were: α-CHCA, alpha-cyano-4-hydroxycinnamic acid, dissolved in a solution of ACN/$H_2O$ (70:30) with 0.1% of TFA at a concentration of 10 mg/mL; and DCTB, T-2-[3-(4-t-Butyl-phenyl)-2-methyl-2-propenylidene]malononitrile, dissolved in THF at a concentration of 10 mg/mL. The first matrix was mainly used for the analysis of peptides and proteins while the second one, DCTB, was suitable for the analysis of polymers.

The matrix solutions and the sample solutions were mixed at a 10:1 volume ratio respectively. For the analysis where DCTB was used as matrix, NaTFA (10 mg/mL in THF) was added to the solution matrix/sample as a cationizing agent at a ratio 10:2:1 by volume (matrix:sample:salt, respectively). 0.8 μL of the resulting solutions were spotted on a target plate made of polished steel, and only after the solvents were completely dried was the target loaded into the instrument. The spectra were collected and manipulated by using FlexAnalysis software released by Bruker Daltonics.

Relative fragment intensities were normalized and used to calculate number average (Mn), weight average (Mw), and z-average (Mz) molecular weight parameters for various samples. The results are summarized in Table 2.

TABLE 2

| Sample ID | Mn | Mw | Mz | Mw/Mn |
|---|---|---|---|---|
| Castor protein isolate lot 5-94 [1] | 1149 | 1162 | 1179 | 1.01 |
| Digested castor lot 5-83 [2] | 951 | 1081 | 1250 | 1.13 |
| Digested castor lot 5-108 [3] | 897 | 1011 | 1169 | 1.12 |
| Digested castor Water-insoluble/dispersible fraction (lot 5-108) [3] | 1009 | 1371 | 1928 | 1.35 |
| Digested castor Water-soluble fraction (lot 5-108) [3] | 1532 | 1697 | 1894 | 1.10 |
| Soy Protein Isolate | 2023 | 2104 | 2161 | 1.03 |
| Digested Soy (lot 5-81) [4] | 894 | 989 | 1104 | 1.10 |
| Digested Soy Water-insoluble/dispersible fraction (lot 5-81) [4] | 910 | 1119 | 1512 | 1.22 |
| Digested Soy Water-soluble fraction (lot 5-81) [4] | 837 | 888 | 941 | 1.06 |

[1] see Example 1, Procedure C
[2] Castor meal protein digested with Everlast (Lot No. 5-83) was obtained from Prof. Sergei Braun of The Hebrew University of Jerusalem
[3] see Example 4
[4] see Example 1, Procedure B The results indicate that the molecular weight characteristics (as determined by MALDI mass spectroscopy) of the polypeptide composition can depend on the process used to obtain the polypeptide composition. For example, castor protein isolate was observed to have a higher number average molecular weight than its digested counterpart. Further, upon digestion, the number average molecular weight was observed to decrease while the polydispersity increased. The same trend was observed for the soy protein isolate and its digested counterpart.

Other experimental results indicate that proteins in the water-soluble polypeptide composition from digested castor have a higher number average molecular weight than its parent protein isolate. However, proteins in the water-soluble polypeptide composition from digested soy had a lower number average molecular weight than its parent soy protein isolate.

Collectively, these results indicate that it is possible to prepare compositions that both i) have particular molecular weight features, and ii) have the ability to disperse an oil in water or water in oil, by selecting a particular procedure for preparing the polypeptide composition.

Example 3: Characterization of Polypeptide Compositions by Two-Dimensional Proton-Nitrogen NMR Correlation Spectra and Characterization of a Water-Insoluble/Water-Dispersible Polypeptide Fraction The water-insoluble and water-soluble protein fractions were prepared as follows. Digested castor (lot 5-83) was suspended in water at the ratio of 1:10 w/w. Calcium chloride was added to the effective concentration of 10 mM, and the pH of the suspension was adjusted to pH 9 by the addition of 10 N NaOH. The reaction was heated to 55° C. while stirring. Everlase 16L Type EX® (NOVOZYMES') then was added at the ratio of 10 g per kg of castor meal protein, and the mixture was stirred at the same temperature for 4 hours. The resulting mixture then was brought to a pH 3.5 with citric acid and was spray-dried to yield a tan powder. Then, the water-insoluble and water-soluble protein fractions were harvested as described in Example 1 (Procedure A) and were allowed to air-dry at 23° C.

The dried powder containing the water-insoluble protein fraction was dissolved in d6-DMSO (6.8% by weight) to yield a red homogeneous solution (Sample A). An aliquot of the as-made dried digested castor was also dissolved in d6-DMSO (6.8% solids by weight) to yield a comparative homogeneous red solution (Sample B). Solid-state FTIR analyses of the same dried powders revealed distinct differences in both the N—H stretching and carbonyl stretching regions of the solid state FTIR spectra. These spectral differences were attributed to differences in bonding environments for the polypeptide N—H moieties, possibly resulting from differences in secondary and tertiary structure. One of the specific differences involved a shift to lower wavenumbers for the amide-I carbonyl band in the water-insoluble/water-dispersible fraction. In order to further characterize these types of differences, a two-dimensional NMR technique was employed for the purpose of characterizing a very specific subset of bonded atomic nuclei; namely, protons bonded to nitrogens.

The samples were dissolved in DMSO-d6 and were placed into 5 mm NMR tubes. All $^1H$ NMR spectra were recorded on a Varian INOVA 750 MHz spectrometer equipped with an HCN-PFG (pulsed field gradient) triple resonance Cryo Probe at 30° C. For one-dimensional (1D) $^1H$ NMR spectra, a spectral window of 10000 Hz was used with an acquisition time of 3 seconds and relaxation delay of 5 seconds. The spectra were signal averaged for 16 transients using a proton 90° pulse width of 8.6 microseconds. The spectral data were zero filled to 132 k points and were processed with 1 Hz line broadening, then baseline corrected and referenced to an internal residual solvent DMSO-d6 peak at 2.50 ppm before integrating and making plots.

Phase sensitive two-dimensional (2D) $^1H$-$^{15}N$ gradient-HSQC (heteronuclear single quantum coherence) data were collected with 2048 acquisition points in the F2 dimension and 768 points in the F1 dimension (90° pulse widths of 6.3 microseconds, and 33.5 microseconds were used for proton and nitrogen, respectively) 48 transients were collected for each increment, with a repetition delay of 1.2 seconds and acquisition time of 0.124 seconds with GARP decoupling during acquisition. The acquired data were processed with sine bell weighting and zero filled to 8196×8196 points in F2 and F1 dimensions before final transformation to produce the 2D correlation data.

Figure 13:
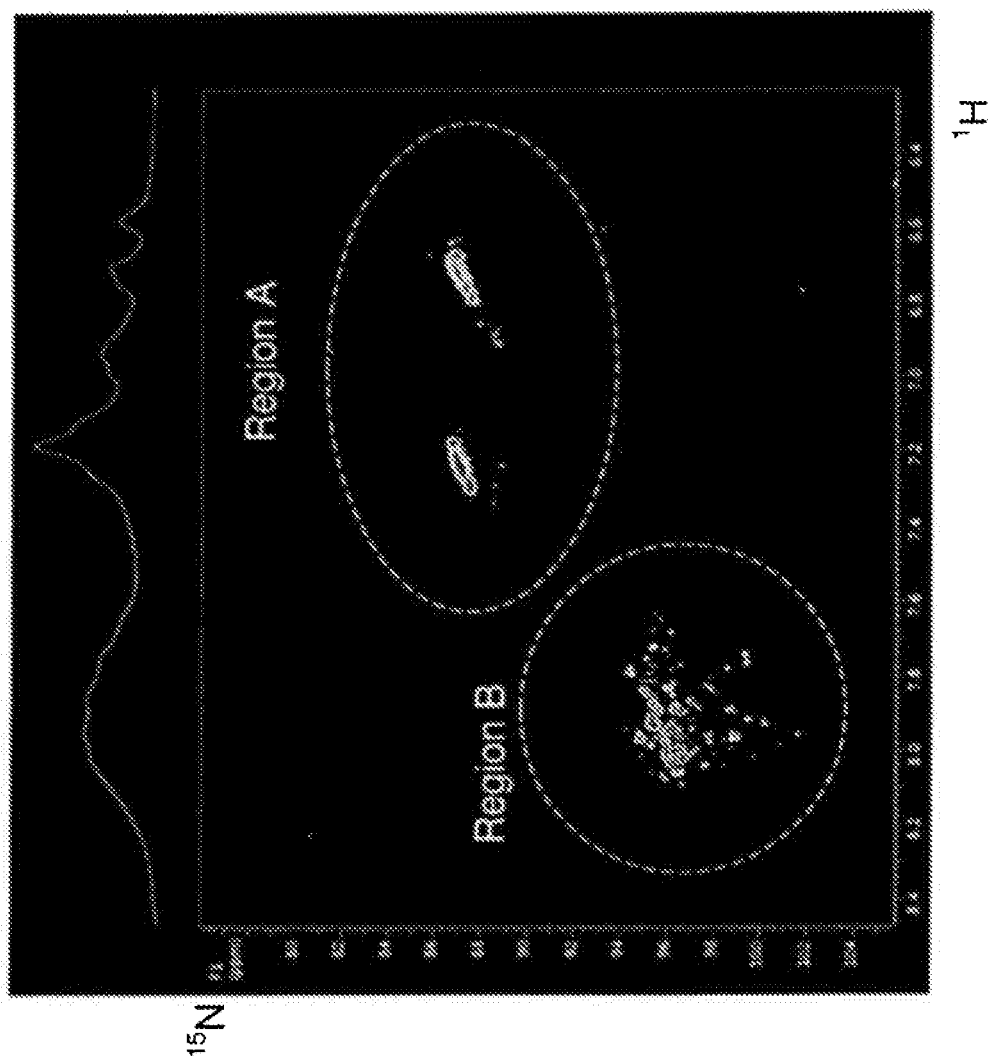
FIG. 13 is a two-dimensional HSQC $^1$H-$^{15}$N NMR spectrum for digested castor (lot 5-83) in d6-DMSO, showing two regions of interest denoted Region A and Region B.
Figure 14:
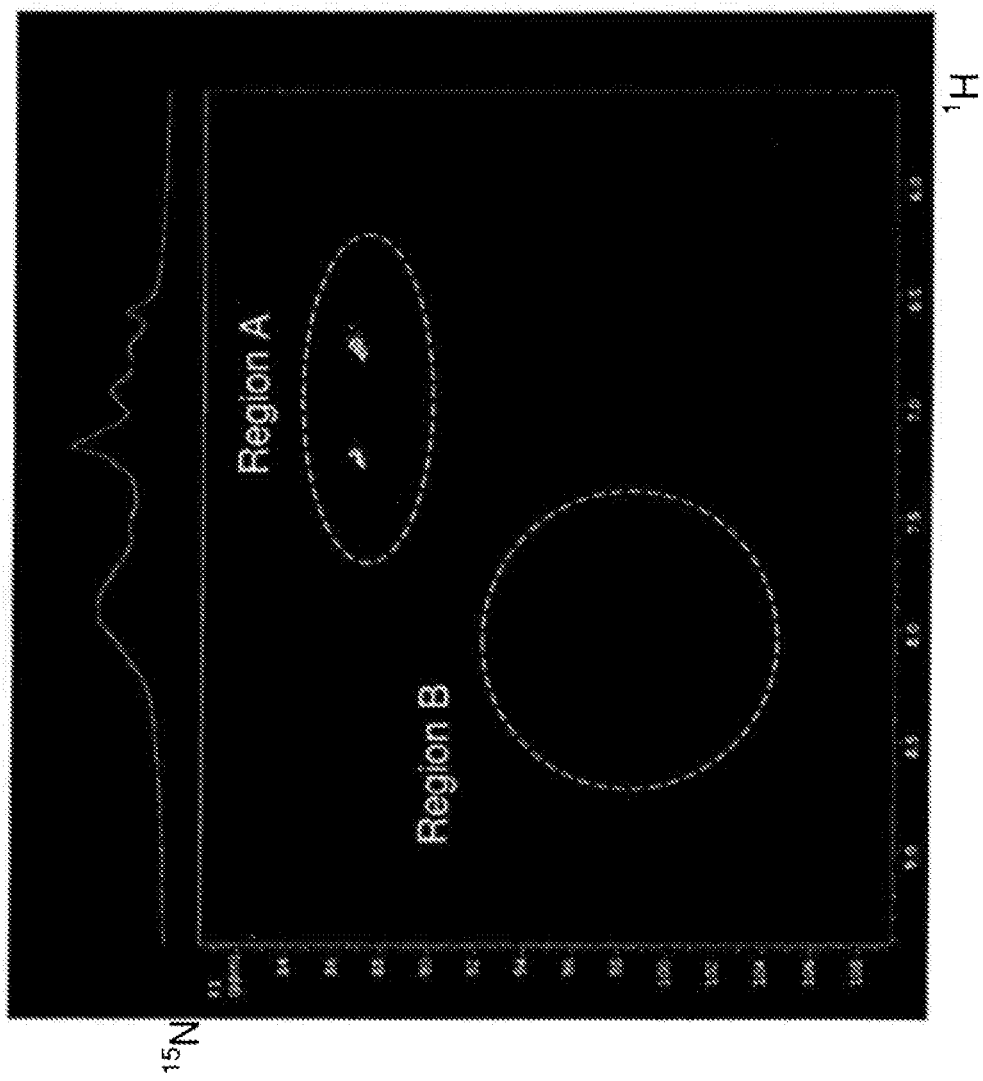
FIG. 14 is a two-dimensional HSQC $^1$H-$^{15}$N NMR spectrum for water-insoluble/water-dispersible polypeptide fraction derived from digested castor (lot 5-83) in d6-DMSO, again showing Region A and Region B.
Figure 15:
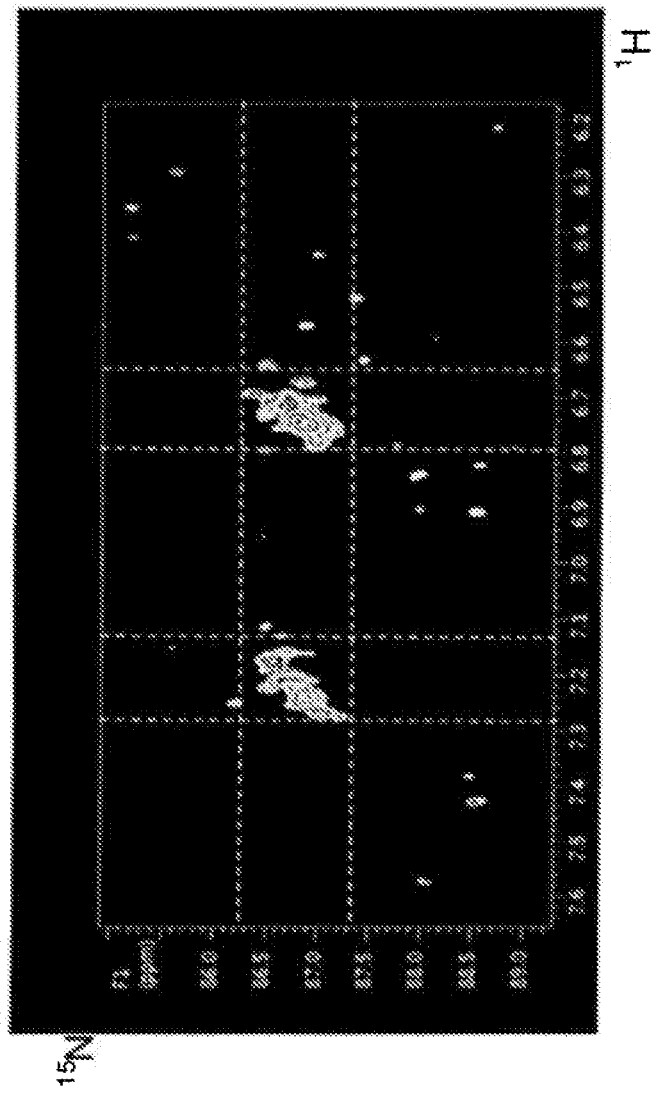
FIG. 15 is a two-dimensional HSQC $^1$H-$^{15}$N NMR spectrum, where Region A from FIG. 14 has been magnified.

The results are presented in FIGS. 13-15. FIG. 13 represents the two-dimensional HSQC $^1H$-$^{15}N$ NMR spectrum for digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from all of the fractions that were present within the as-made digested castor (i.e., the water-insoluble/water-dispersible polypeptide fractions plus the water-soluble polypeptide fractions). The multiple peaks in region B were observed to disappear upon removal of the water-soluble fractions (see FIG. 14). This indicates that these protonated nitrogens are specific to the water-soluble polypeptide fractions, whereas at least a portion of the peaks in region A are specific to the water-insoluble/water-dispersible fraction.

FIG. 14 represents the two-dimensional HSQC $^1$H-$^{15}$N NMR spectrum for the water-insoluble/water-dispersible polypeptide extract from digested castor lot 5-83 in d6-DMSO. The y-axis represents $^{15}$N chemical shift scale (ppm), and the x-axis represents $^1$H chemical shift scale (ppm). The peaks within the spectrum represent protonated nitrogen atoms from the water-insoluble/water-dispersible polypeptide fraction. The peaks within Region B were observed to be very weak in comparison to the analogous peaks within the digested castor before extraction (see FIG. 13). Conversely, the remaining peaks were predominantly from the protonated nitrogens in Region A. This indicates that these particular protonated nitrogens are specific to the water-insoluble polypeptide fractions. A magnified view of this region is presented in FIG. 15.

As shown in FIG. 14, the peaks within the spectrum represent protonated nitrogen atoms that are specific to the water-insoluble/water-dispersible polypeptide fraction. Upon expansion, the two "peaks" appear as narrow clusters that can be readily defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

The results of these studies revealed that while the water-soluble polypeptide fraction was composed of multiple types of protonated nitrogen atoms (see FIG. 13), the water-insoluble/water-dispersible fraction contained significantly fewer types of protonated nitrogens, and was predominantly characterized by the presence of two major proton-nitrogen cross peak clusters (see FIG. 14). These differences, like those as seen by solid state FTIR, illustrate that the chemical bonding environments within the water-soluble polypeptide fraction are distinctly different from those that exist within the water-insoluble/water-dispersible fraction.

Together, the solid state FTIR and NMR data characterize the water-insoluble/water-dispersible polypeptide fraction, where there is a solid-state infrared amide-I absorption band between 1620-1632 cm$^{-1}$; a solid-state infrared amide-II absorption band between 1514-1521 cm$^{-1}$; and a solution-state pair of protonated nitrogen clusters as determined by a $^1$H-$^{15}$N nuclear magnetic resonance correlation technique. More specifically, when the pair of protonated nitrogen clusters is observed by means of NMR with deuterated d6-DMSO as the solvent using a two-dimensional HSQC $^1$H-$^{15}$N NMR technique, the clusters are defined by the $^{15}$N and $^1$H chemical shift boundaries that define them: the $^{15}$N boundaries for both clusters occur at approximately 86.2 ppm and 87.3 ppm; and the $^1$H boundaries occur at approximately 7.14 and 7.29 ppm for the first cluster; and at approximately 6.66 and 6.81 ppm for the second cluster.

Together, the solid state FTIR and NMR data also characterize the water-soluble polypeptide fraction, where there is a solid-state infrared amide-I absorption band between about 1633-1680 cm$^{-1}$; a solid-state infrared amide-II absorption band between 1522-1560 cm$^{-1}$; two prominent 1° amide N—H stretch absorption bands centered at about 3200 cm$^{-1}$, and at about 3300 cm$^{-1}$, as determined by solid state FTIR, and a prominent cluster of protonated nitrogen nuclei defined by $^{15}$N chemical shift boundaries at about 94 ppm and at about 100 ppm, and $^1$H chemical shift boundaries at about 7.6 ppm and at about 8.1 ppm, as determined by solution state, two-dimensional proton-nitrogen coupled NMR.

Example 4: Oil Dispersion Characteristics of Water-Soluble and Water-Insoluble/Water-Dispersible Protein Fractions A water-insoluble/water-dispersible polypeptide fraction and a water-soluble polypeptide fraction were isolated from digested castor (lot 5-108) based on procedures described in Example 1 (Procedure A). The digested castor can be prepared as follows: castor meal protein is suspended in water at the ratio of about 1:10 w/w. Calcium chloride is added to an effective concentration of about 10 mM, and the pH of the suspension adjusted to pH 9 by the addition of 10 N NaOH. The reaction is then heated to 55° C. while stirring. Next, Everlase 16L Type EX® (NOVOZYMES') is added at the ratio of 10 g per kg of castor meal protein, and the mixture is stirred at the same temperature for about 4 hours. Finally, the resulting mixture is brought to a pH 3.5 with citric acid and spray-dried to provide a powder.

The MALDI fragmentation molecular weight characteristics of the isolated fractions are provided in Example 2. The solid state FTIR spectroscopic absorption characteristics for the isolated water-insoluble/water-dispersible polypeptide fraction conform with those as described in FIGS. 2-4, 7, and 9-12 (amide-I absorption range: 1620-1632 cm$^{-1}$; amide-II absorption range: 1514-1521 cm$^{-1}$). Solution state two-dimensional proton-nitrogen coupled NMR on the isolated water-insoluble/water-dispersible polypeptide fraction show two protonated nitrogen clusters enveloped by $^{15}$N chemical shift boundaries at approximately 86.2 ppm and 87.3 ppm; and with $^1$H chemical shift boundaries at approximately 7.14 and 7.29 ppm for the first cluster; and at approximately 6.66 and 6.81 ppm for the second cluster. Solution state two-dimensional proton-nitrogen coupled NMR on the isolated water-soluble polypeptide fraction show a cluster of protonated nitrogen nuclei defined by $^{15}$N chemical shift boundaries at about 94 ppm and at about 100 ppm, and $^1$H chemical shift boundaries at about 7.6 ppm and at about 8.1 ppm.

The water-insoluble/water-dispersible polypeptide fractions with these spectral characteristics (unlike their water-soluble counterparts) exhibit the unique ability to emulsify and stabilize dispersions of oil in water and water in oil. This unique oil-dispersing capability is observed with water-insoluble/water-dispersible polypeptide compositions that are extracted and isolated from multiple sources, including but not limited to (1) whole meals or protein-isolates from either soy, canola, or castor that are extracted of their water-soluble polypeptide components at or near pH-neutral conditions; (2) whole meals or protein-isolates from soy, canola or castor that are subjected to base catalyzed hydrolysis followed by acid addition and subsequent extraction of water-soluble polypeptide components; (3) whole meals or protein-isolates from soy, canola or castor that are subjected to acid catalyzed hydrolysis followed by base addition and subsequent extraction of their water-soluble polypeptide components; (4) whole meals or protein-isolates from soy, castor, or canola that are subjected to combinations of base catalyzed hydrolysis with enzyme digestion followed by acid addition and subsequent extraction of water-soluble polypeptide components.

It is understood that the stabilization of an oil-in-water or water-in-oil emulsion/dispersion depends on several factors, including but not limited to the presence or absence of a stabilizing entity such as a surfactant or a dispersant; the nature of the oil (i.e., its polarity, hydrophilicity, hydrophobicity, solubility parameter, etc.); the nature of the surfactant or dispersant (i.e., HLB value, charge characteristics, molecular weight, water solubility, oil solubility, etc.); the ionic strength of the water-phase; the presence or absence of additives and impurities in either the oil or water phases; the concentration of the oil (i.e., its weight percent in water); and the concentration of the stabilizing entity. It is further understood that the efficiency of a stabilizing entity (a "stabilizing entity" being a dispersant, an emulsifier, a surfactant, or the water-insoluble/water-dispersible polypeptide composition of the present invention) is often judged according to its ability stabilize an emulsion for some specified period of time (i.e., to prevent the macroscopic phase separation of immiscible oil and water components under shear or under static conditions).

In order to further demonstrate the generality of this finding, several oil-in-water dispersions were prepared with a water-insoluble/water-dispersible polypeptide composition that was isolated from a digested castor protein. The water-insoluble/water-dispersible polypeptide fraction was isolated as a paste-like dispersion in water. The paste was diluted with water to 16% solids, and separately to 14% solids. In the next step, 3-gram aliquots of each paste were separately weighed into 15 mL plastic beakers. Next, aliquots of the oils shown in Table 3 were separately added to individual paste aliquots at a ratio of 1 part oil to 1 part solid water-insoluble/water-dispersible polypeptide composition on a weight basis (20 mixtures in total). The mixtures were stirred by hand with a spatula, and were observed to form homogenous creams. The creams remained homogeneous with no visible signs of macroscopic phase separation for prolonged periods of time after mixing including periods ranging from 1 minute after mixing, 5 minutes after mixing, 10 minutes after mixing, 15 minutes after mixing, 30 minutes after mixing, 1 hour after mixing, and 2 hours after mixing. By contrast, the analogous water-soluble extract from the digested castor was incapable of stabilizing dispersions of the oils in water.

TABLE 3

| Oil Type | Source |
|---|---|
| PMDI | Rubinate-M from Huntsman Corporation |
| Mineral oil | Drakeol 35 from Penreco |
| Soybean oil | RBD from ADM Processing Co. |
| Motor oil | Castrol Syntec, 5W-50 |
| Castor oil | Pale Pressed Castor Oil from Alnor Oil Company, Inc. |
| Dibutyl Phthalate | 99% from Acros |
| Epoxidized soybean oil | From Aldrich |
| Caprylic triglyceride | Neobee M-5 from Stepan Co. |
| *Eucalyptus* oil | From Aromas Unlimited |
| Tributyl o-acetylcitrate | 98% from Aldrich |

Protein compositions not enriched for the water-insoluble/water-dispersible fractions are unable to disperse oils. For example, a 16% solids dispersion of soy protein isolate, Lot 5-81, (Soy protein isolate SOLPRO 958® Solbar Industries Ltd, POB 2230, Ashdod 77121, Israel; protein content approximately 90%) was prepared by adding 32 grams of soy protein isolate to 168 grams of water at a pH of approximately 4 to 6 (JM-570-1). Seven 10 gram aliquots of JM-570-1 were weighed into 20 mL disposable beakers. A 10 gram aliquot contained 1.6 grams of soy protein isolate and 8.4 grams of water. Seven different oils (namely, PMDI, mineral oil, soybean oil, motor oil, castor oil, dibutyl phthalate and epoxidized soybean oil) were added separately at a w/w ratio of 1 part oil to 1 part protein solids (1.6 grams oil was added to each 10 gram aliquot). The mixtures were stirred by hand with a spatula. None of the oils was observed to be dispersible in the 16% solids dispersion of the soy protein isolate.

Example 5: Physical Characterization by Gravimetric Analysis, FTIR Spectroscopy, and Oil-Dispersing Capacity of Ground Canola Meal, Water-Insoluble/Water-Dispersible Protein Fraction Extracted from Ground Canola Meal, and Water-Soluble Protein Fraction Extracted from Ground Canola Meal Ground canola meal, a water-insoluble/water-dispersible protein fraction that was extracted from ground canola meal, and a water-soluble protein fraction that was extracted from ground canola meal were subjected to physical characterization by gravimetric analysis, FTIR Spectroscopy, and ability to disperse oil. Experimental procedures and results are provided below.

General Experimental Procedure:

Water-insoluble/water-dispersible protein fraction and water-soluble protein fraction were isolated from ground canola meal using the isolation method described in Procedure F of Example 1. FTIR spectra were obtained using solid state FTIR procedures outlined in Part-III of Example 1. Ability of the ground plant meal and ability of the individual protein fractions (or a mixture of individual protein fractions) to disperse PMDI in water was tested using procedures described in Part-II of Example 1.

Gravimetric Solids Analysis:

After washing and supernatant decanting (3 cycles per the protocol in Procedure F of Example 1), the resulting slurry of water-insoluble/water-dispersible components (ca. 35% oven dried solids by weight) was gravimetrically adjusted to achieve a dispersion containing approximately 26% by weight solids (by adding water as necessary). The overall yield of water-insoluble/water-dispersible components was determined to be approximately 55% by weight of the starting meal weight. Thus, the ground canola meal contained (i) approximately 55% by weight of a water-insoluble/water-dispersible protein fraction, and (ii) approximately 45% by weight of a water-soluble fraction.

FTIR Spectroscopic Analysis:

To further characterize extracts from the ground canola meal, solid state surface ATR FTIR experiments were performed on the water-insoluble/water-dispersible protein fraction (this sample was collected after the third wash cycle and was allowed to dry at 23° C.), and on the water-soluble protein fraction (this sample was collected from the clear supernatant after the third wash cycle, and was allowed to dry at 23° C. to yield a transparent amber solid).

Figure 18:
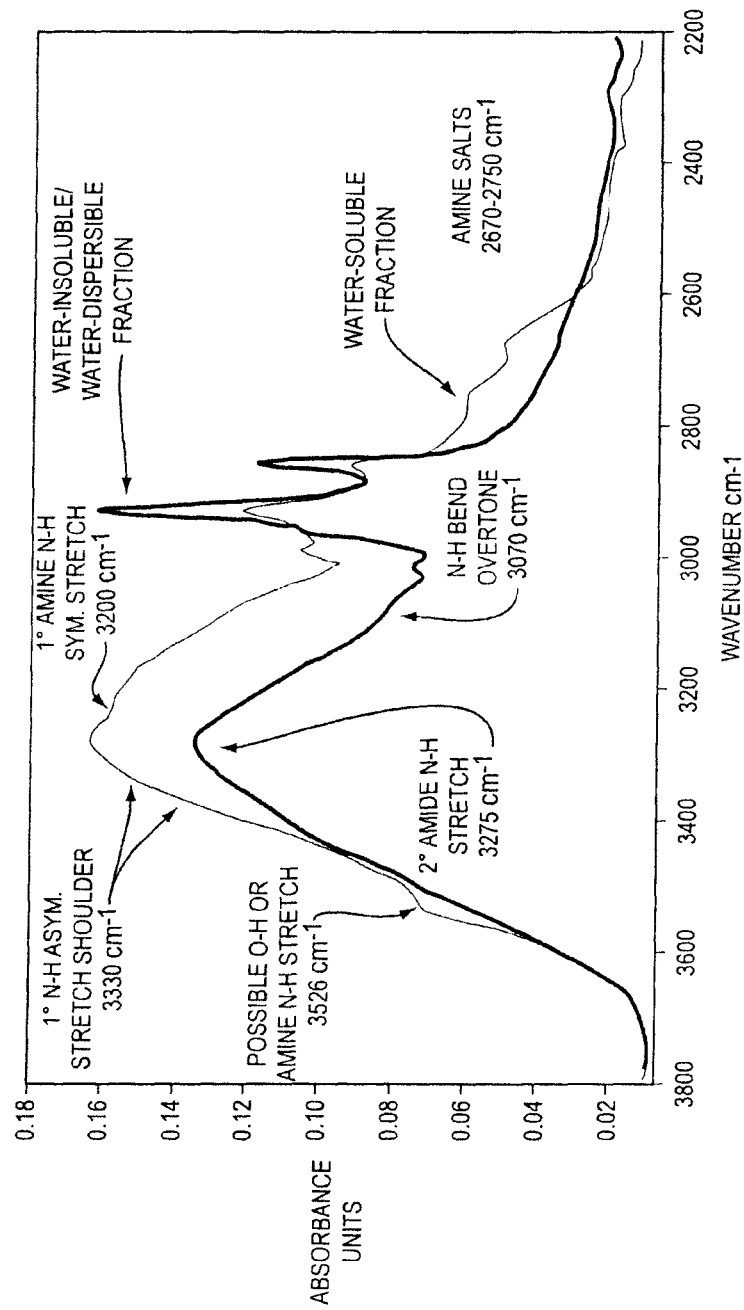
FIG. 18 shows overlaid solid state FTIR spectra of isolated water-soluble and water-insoluble/water-dispersible protein fractions obtained from ground canola meal, where the N—H and O—H stretch regions are expanded, as described further in Example 5.

FIG. 18 shows the solid state FTIR spectra for the water-insoluble/water-dispersible protein fraction isolated from canola meal together with the water-soluble protein fraction where the N—H stretching region has been expanded. This figure shows that the predominant type of amide in the water-insoluble/water-dispersible protein fraction is the secondary main-chain amide as evidenced by the single, highly symmetric N—H stretch band centered near 3275 cm$^{-1}$. Although the water-soluble protein fraction also contains this type of amide, it contains a significantly higher amount of amine salts (as evidenced by absorption over the region spanning from approximately 2670-2750 cm$^{-1}$) and primary amides as evidenced by the presence of the two primary N—H stretching bands at approximately 3200 cm$^{-1}$ (symmetric) and at approximately 3330 cm$^{-1}$ (asymmetric), respectively. The spectra also reveal that both fractions contain the characteristic spectroscopic signatures of proteins, even though both fractions were isolated from raw meal (raw meal contains other residual water-soluble and water-insoluble components such as grain hulls, carbohydrates, sugars, and oils).

Figure 19:
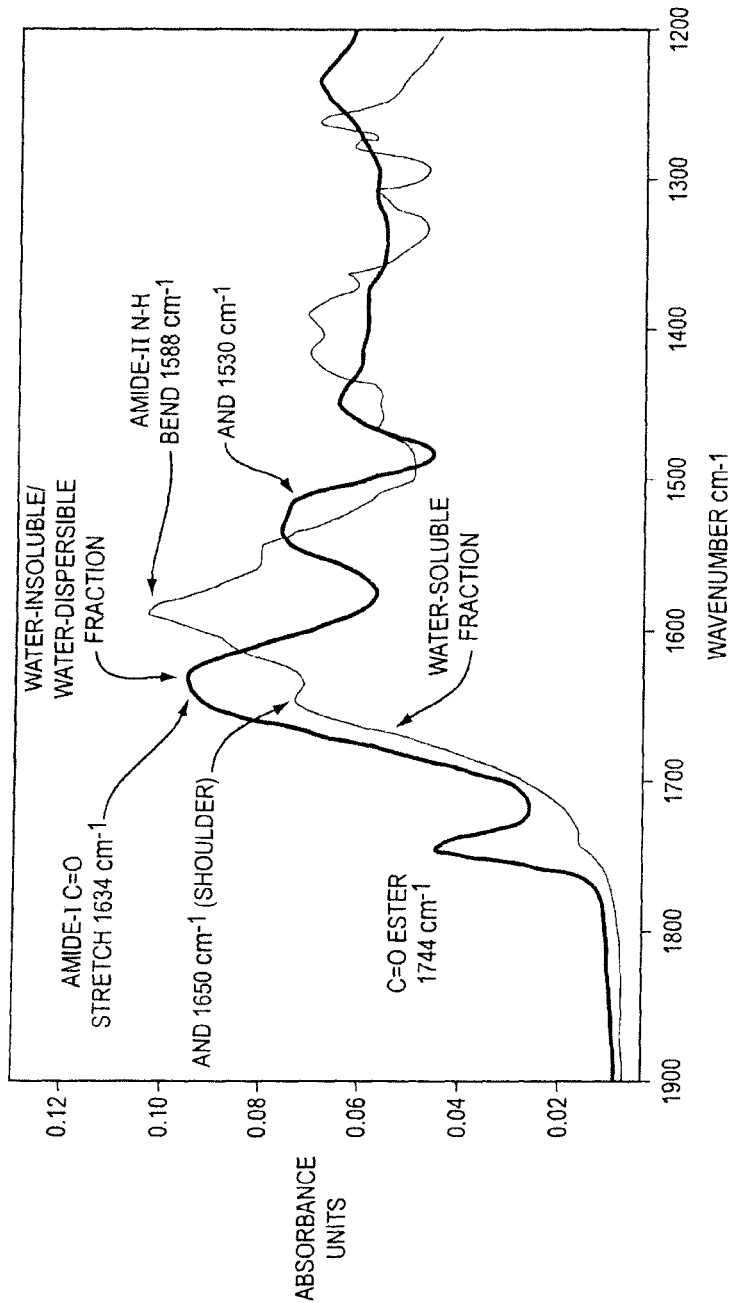
FIG. 19 shows overlaid solid state FTIR spectra of isolated water-soluble and water-insoluble/water-dispersible protein fractions obtained from ground canola meal, where the carbonyl amide region is expanded and the spectra were vertically scaled to achieve equivalent absorbance intensities for the amide-I carbonyl stretch, as described further in Example 5.

Further, as shown in FIG. 19, the amide-I carbonyl absorption band for the water-insoluble/water-dispersible protein fraction was observed to appear as a predominant component at a wavenumber of approximately 1634 cm$^{-1}$, whereas that of the water-soluble protein fraction was observed to appear as a lower-intensity shoulder at approximately 1650 cm$^{-1}$. As discussed elsewhere, this feature distinguishes the water-insoluble/water-dispersible protein fraction from the water-soluble protein fraction, not only for isolated protein fractions from castor proteins and soy proteins, but for protein-containing fractions that are isolated directly from plant meals like soy meal and canola meal. Moreover, the amide-II band for the water-insoluble/water-dispersible protein fraction was observed to appear as a broad band centered at approximately 1530 cm$^{-1}$, whereas that of the water-soluble protein fraction was observed to appear at approximately 1588 cm$^{-1}$ together with a weak shoulder at approximately 1550 cm$^{-1}$.

Analysis of the Capacity of Ground Plant Meal and Isolated Protein Fractions to Disperse Oil:

A dispersion of 26% (w/w) ground whole canola meal in water was mixed with PMDI at a 1:1 w/w ratio of PMDI to canola meal solids. The canola meal contained (i) approximately 55% by weight water-insoluble/water-dispersible protein fraction and (ii) approximately 45% by weight water-soluble protein fraction. The dispersion of ground whole canola meal formed a stable dispersion, which remained stable during a 1 hour period of observation with no visual signs of phase separation.

An aliquot of 26% by weight solids dispersion of water-insoluble/water-dispersible protein fraction (obtained from canola plant meal by washing three times per the protocol described in Procedure F of Example 1) was blended with PMDI at a w/w ratio of 1 part PMDI to 1 part of the water-insoluble/water-dispersible protein fraction (on a w/w PMDI/protein fraction-solids basis). This resulting mixture formed a stable dispersion, which remained stable during a 1 hour period of observation with no visible signs of phase separation.

The water-soluble protein fraction (obtained by extracting the canola meal and drying the supernatant after centrifuging) was dissolved in water to yield a 26% (w/w) solids solution. When PMDI was added to this solution (at a 1:1 weight ratio of PMDI to water-soluble protein fraction solid material), the resulting mixture was unstable, and it phase separated immediately after mixing.

The results above illustrate that water-emulsified PMDI-containing adhesive compositions can be prepared using water-insoluble/water-dispersible protein fraction obtained from ground plant meal. In addition, the results above illustrate that water-emulsified PMDI-containing adhesive can be prepared using ground plant meal compositions (that contain a sufficient amount of water-insoluble/water-dispersible protein fraction; it is understood that the ground plant meal composition also comprises some water-soluble protein fraction). Although the water-soluble protein fraction did not facilitate dispersion by itself in these experiments, the dispersion of PMDI (and other oils) is understood to be achievable so long as a sufficient amount of water-insoluble/water-dispersible protein fraction is present in the adhesive composition (or the ground plant meal used in the adhesive composition).

To further illustrate the oil-dispersing ability of mixtures containing a sufficient amount of water-insoluble/water-dispersible protein fraction, the oil-dispersing characteristics of a meal containing a large amount of water-insoluble/water-dispersible protein fraction was compared to the oil-dispersing characteristics of a commercially available soy-flour product containing a relatively small amount of water-insoluble/water-dispersible protein fraction. The commercially available soy-flour product used was Prolia PDI-90, which is a de-fatted soy flour obtained from Cargill).

As is understood, various commercially available derivatives from plant meals are themselves solvent-extracted (e.g., soy flour), which results in the removal of a substantial amount of the water-insoluble/water-dispersible protein fraction. Such compositions have not been found to facilitate dispersion of oil, and, thus, are less desirable for use in making an adhesive. For example, when PMDI was added to a 26% by weight solids dispersion of soy flour in water at a 1/1 (w/w) of soy flour/PMDI, the PMDI was observed to immediately phase separate from the mixture. By contrast, soy meal was used under similar conditions in Example 1 produced a stable dispersion.

Figure 20:
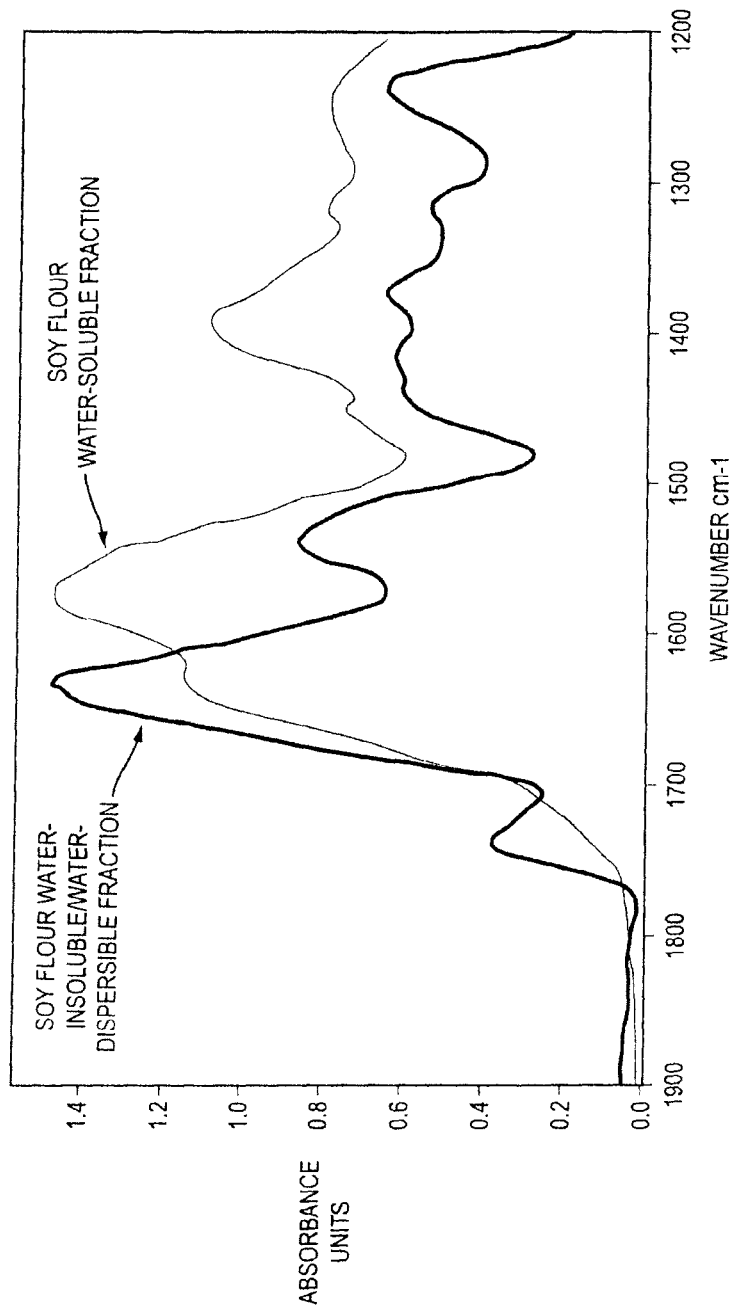
FIG. 20 shows overlaid solid state FTIR spectra of isolated water-soluble and water-insoluble/water-dispersible protein fractions obtained from soy flour, as described further in Example 5.

When soy flour was extracted using procedures discussed herein, the isolated water-insoluble/water-dispersible protein fraction was capable of dispersing PMDI in water. However, this fraction was gravimetrically determined to comprise only approximately 10% by weight of the starting soy flour mixture. Thus, the component needed for oil dispersion was present in the starting soy flour, but its effective concentration was too low for the soy flour to disperse PMDI in water. FTIR spectra for the isolated water-insoluble/water-dispersible protein fraction and water-soluble protein fraction extracted from soy flour are provided in FIG. 20.

Figure 21:
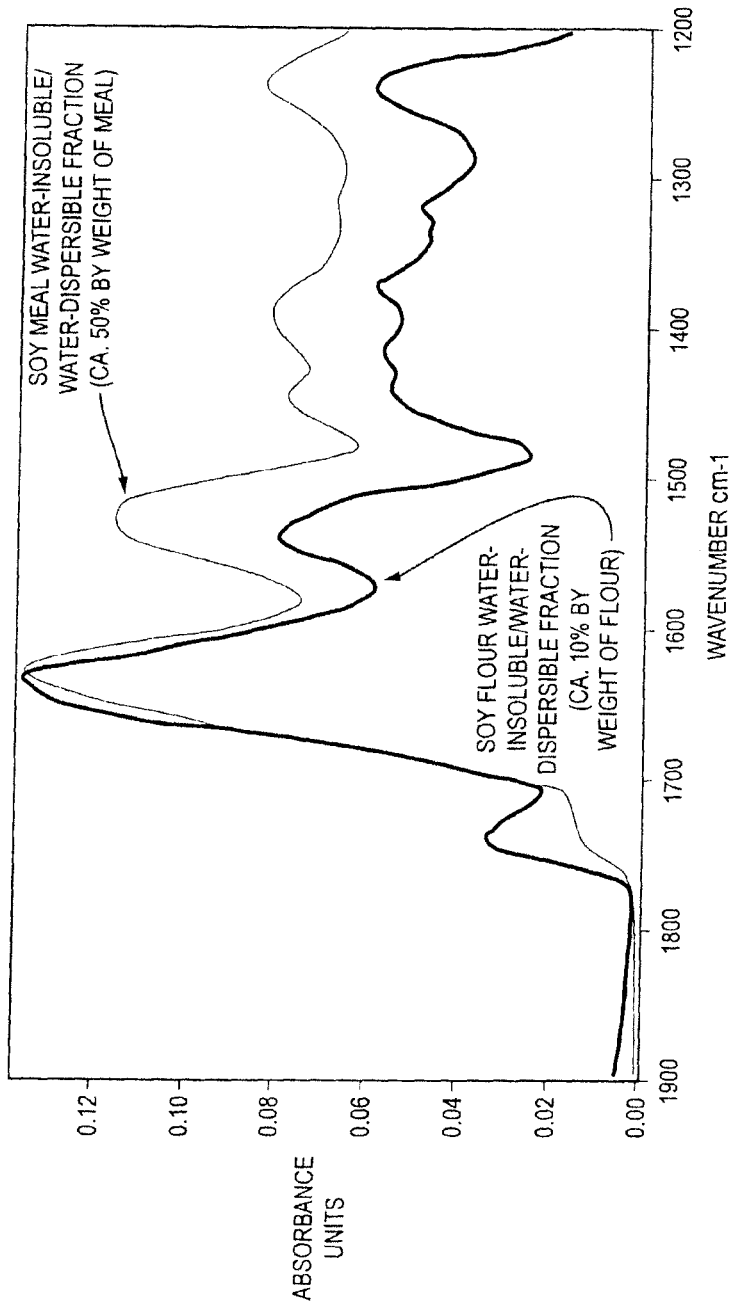
FIG. 21 shows overlaid solid state FTIR spectra of isolated water-insoluble/water-dispersible protein fractions obtained from soy meal and soy flour, as described further in Example 5.

In contrast to soy flour, the water-insoluble/water-dispersible protein fraction is a major component in soy meal (at a level of approximately 50% by weight), thus rendering the soy meal an effective dispersing agent for PMDI in water. Upon isolation, the water-insoluble/water-dispersible protein fraction extracted from both soy meal and soy flour (both of which were able to facilitate the dispersion of PMDI in water) were observed to contain similar spectral features as measured by FTIR. Solid state FTIR of the water-insoluble/water-dispersible protein fraction obtained from soy flour and soy meal are provided in FIG. 21.

Example 6: Particle Board Composites Made Using Lignin-Containing Adhesive Compositions Lignin and lignin with epoxy additives were used as alternatives to PMDI in a protein adhesive composition. Adhesive compositions (described in Table 4) were prepared for the purpose of creating particle board composites (compositions are given in Tables 5 and 6). The epoxy additives in this example were mixed together to form a 50/50 (w/w) blend of glycidyl end-capped poly(bisphenol-A-co-epichlorohydrin) (BPA; CAS #25036-25-3; Aldrich Chemical), and trimethylolpropane triglycidyl ether (TMPGE; CAS #3454-29-3; Aldrich Chemical). The levels of the ingredients were controlled for the purpose of delivering a constant level of binder to the finished composites (total binder level=7.65% on a wet wood basis).

The sample with partially exfoliated I-44P clay (TP-11, Nanomer I-44 P from Nanocor, Inc., Arlington Heights, Ill.) was prepared by adding a premixed 30/70 w/w amalgam of I-44P in an oil carrier (where the oil carrier was a 50/50 w/w blend of Tego-Protect-5000 silicone with (R)-(+)-limonene (Sigma-Aldrich, Corp)) to form a mixture and subjecting the mixture of conditions for achieving at least partial exfoliation. Specifically, the amalgam was prepared based on the following general procedure: a 30/70 mixture (w/w) of Nanomer I-44P/oil carrier was prepared by mixing 30 grams of I-44P from Nanocor, Inc. into 70 grams of oil carrier to form a mixture. Then, the mixture was mixed using a laboratory mixer and a dispersion-mixing blade. Next, the mixture was mixed under high shear conditions, then covered and placed in an ultrasonic bath to facilitate further exfoliation. Partial exfoliation of the clay in the oil carrier was evidenced by the formation of a gel-like amalgam.

In addition, the combined levels of lignin and epoxy were proportionally reduced to account for the presence of the clay (this was done to maintain a constant overall binder level). Thus, in the case where clay was added to the binder, the total organic content of the binder was lower than that of the comparable control sample (TP-10).

Figure 22:
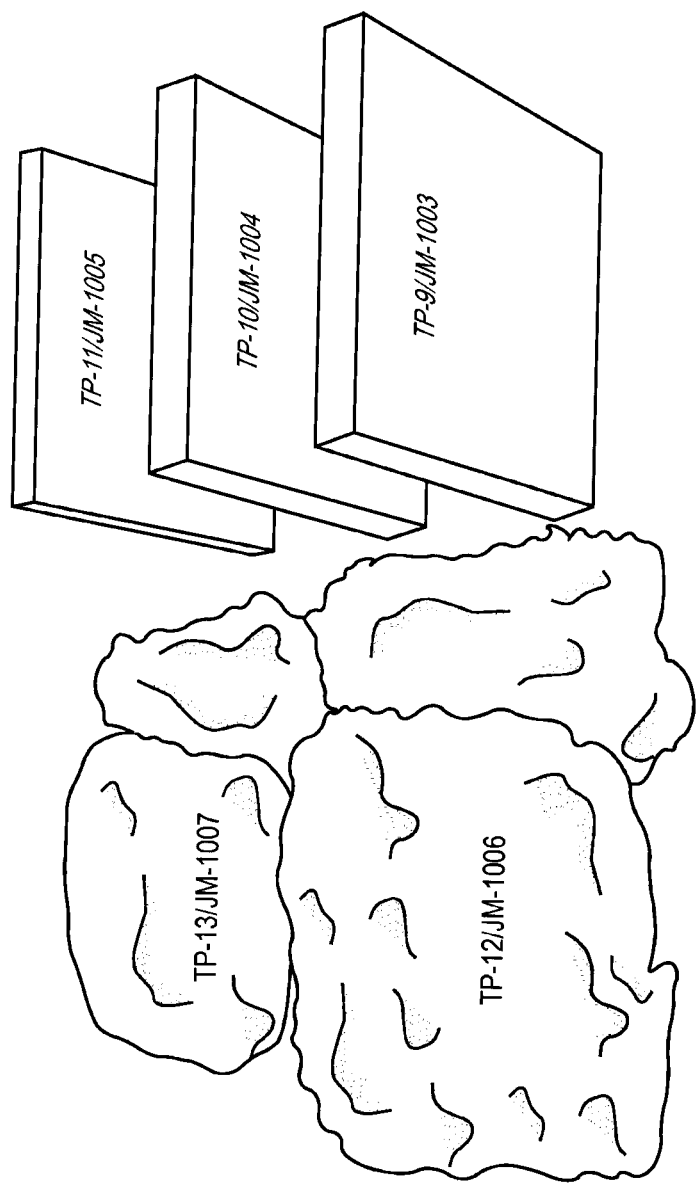
FIG. 22 shows particle board composites prepared in Example 6, along with samples TP-12 and TP-13 that cohesively disintegrated upon removing them from the press.

Particle board composites were made according to the following procedure. 100 g of wet adhesive was slowly added to 600 g of wood particulate and the composition was mixed with a mechanical mixer. A 9-inch×9-inch×9-inch wood forming box was centered on a 12"×12"×⅛" stainless steel plate, which was covered with aluminum foil. The treated-wood was added slowly into the forming box to try to get a uniform density of adhesive-coated wood particles. After all the treated-wood was added, the composition was compressed by hand with a 8⅞"×8⅞"×¼" plywood board, and the forming box was carefully removed so that the treated particle board matte would not be disturbed. The board was removed from the top of the matte and a piece of aluminum foil was placed on top together with another 12"×12"×⅛" stainless steel plate. The particleboard matte was pressed and cured to a thickness of ¾" using the following conditions: 117 psi pressure for 10 minutes at a press platen temperature of 205° C. The composites were cut into 6 inch by 4 inch samples. Qualitative observations are provided in Table 7, and the pressed composites are shown in FIG. 22.

Particle board composites made with lignin alone or with protein alone cohesively disintegrated upon being removed from the press (TP-12 and TP-13). Surprisingly however, composites made with combinations of protein and lignin were observed to remain cohesively intact. Thus, the combination of plant meal and lignin led to an unexpected and surprising response that neither component was able to provide on its own. Namely, when used in combination, a protein meal and lignin can be used to formulate adhesive binders to produce densified wood composites that remain cohesively intact after pressing.

TABLE 4

WET ADHESIVE COMPOSITIONS*

| | Description: Canola Protein Meal; Other | Weight Percent of Components in Wet Adhesive Composition | | | | | | | |
|---|---|---|---|---|---|---|---|---|---|
| Sample No. | Additives & Oil Carrier | Water | Canola Meal | Urea | Lignin | BPA epoxy | TMPGE epoxy | Nanocor I-44P | Carrier Oil |
| TP-9 | protein + lignin | 55.28 | 20.45 | 0.90 | 23.37 | 0 | 0 | 0 | 0 |
| TP-10 | protein + 50/50 w/w lignin/epoxy | 55.28 | 20.45 | 0.90 | 11.69 | 5.84 | 5.84 | 0 | 0 |
| TP-11 | protein + 50/50 w/w lignin/epoxy with 70/30 w/w I44P/(50/50 w/w Tego/limonene) | 55.28 | 20.45 | 0.90 | 10.23 | 5.11 | 5.11 | 0.88 | 2.04 |
| TP-12 | lignin only | 72.60 | 0 | 0.55 | 26.85 | 0 | 0 | 0 | 0 |
| TP-13 | protein meal only | 71.59 | 27.84 | 0.57 | 0 | 0 | 0 | 0 | 0 |

*Expressed as percent by weight.

TABLE 5

AMOUNT OF WET ADHESIVES FROM TABLE 4 ADDED TO 600 GRAMS OF WOOD FOR PREPARING PARTICLE BOARD COMPOSITES

| Sample No. | Components in the Adhesive Composition: Canola Protein Meal; Other Additives & Oil Carrier | Weight of wood grams | Weight wet adhesive grams |
|---|---|---|---|
| TP-9 | protein + lignin | 600 | 111.21 |
| TP-10 | protein + 50/50 w/w lignin/epoxy | 600 | 111.21 |
| TP-11 | protein + 50/50 w/w lignin/epoxy with 70/30 w/w I44P/(50/50 w/w Tego/limonene) | 600 | 111.22 |
| TP-12 | lignin only | 600 | 181.48 |
| TP-13 | protein only | 600 | 175.03 |

* Composites had a constant binder level of 7.65% by weight.

TABLE 6

DRY/CURED PARTICLE BOARD COMPOSITIONS USING
THE WET ADHESIVES DESCRIBED IN TABLE 4

| Sample No. | Description of the Adhesive (Canola Protein Meal, Other Additives, & Oil Carrier) | Weight Percent of Components in Dry/Cured Particle Board Composition | | | | | | | |
|---|---|---|---|---|---|---|---|---|---|
| | | Wood | Canola Meal | Urea | Lignin | BPA epoxy | TMPGE epoxy | Nanocor I-44P | Carrier Oil |
| TP-9 | protein + lignin | 92.35 | 3.50 | 0.15 | 4.00 | 0 | 0 | 0 | 0 |
| TP-10 | protein + 50/50 w/w lignin/epoxy | 92.35 | 3.50 | 0.15 | 2.00 | 1.00 | 1.00 | 0 | 0 |
| TP-11 | protein + 50/50 w/w lignin/epoxy with 70/30 w/w I44P/(50/50 w/w Tego/limonene) | 92.35 | 3.50 | 0.15 | 1.75 | 0.875 | 0.875 | 0.15 | 0.35 |
| TP-12 | lignin only | 92.35 | 0 | 0.15 | 7.50 | 0 | 0 | 0 | 0 |
| TP-13 | protein only | 92.35 | 7.50 | 0.15 | 0 | 0 | 0 | 0 | 0 |

*Composites had a constant binder level of 7.65% by weight. Amount of components in the adhesive composition are presented in percent by weight of the adhesive composition.

TABLE 7

OBSERVATIONS OF THE WET ADHESIVE AND PARTICLE
BOARD COMPOSITES MADE THEREFROM

| Sample No. | Mixing Observations | Board Quality |
|---|---|---|
| TP-9 | The formulation mixed well using a mechanical mixer. The resulting mixture was a viscous, tar-like liquid. | The board was a tough solid composite having a measured density of 0.57 g/cm$^3$ (35.86 lb/ft$^3$) |
| TP-10 | The formulation mixed easily with a mechanical mixer. The resulting mixture was a low to moderate-viscosity pourable liquid. | The board was a tough solid composite having a measured density of 0.56 g/cm$^3$ (34.99 lb/ft$^3$) |
| TP-11 | The formulation mixed easily with a mechanical mixer. The resulting mixture was a moderate-viscosity pourable liquid. | The board was a tough solid composite having a measured density of 0.55 g/cm$^3$ (34.64 lb/ft$^3$) |
| TP-12 | The formulation mixed easily with a mechanical mixer. The resulting mixture was a low to moderate-viscosity pourable liquid. | The surfaces stayed together but the center of the board was delaminated. The center portion of the board consisted of very loose wood particles (cohesive failure). |
| TP-13 | The formulation mixed easily with a mechanical mixer. The resulting mixture was a low to moderate-viscosity pourable liquid. | The surfaces stayed together but the center of the board was delaminated. The center portion of the board consisted of very loose wood particles (cohesive failure). |

Example 7: Particle Board Composites Made Using Phenol-Formaldehyde-Containing 2-Part Adhesive Compositions Phenol-Formaldehyde (PF) resin (Woodweld™ GP190080 from Georgia Pacific) was used together with urea (from Sigma-Aldrich), PMDI (Mondur™ 541 from Bayer) and ground canola meal (20-70 micrometers, obtained from Columbia Innovations, a division of Columbia Forest Products, Inc.) to create a series of 2-part adhesive compositions. The "Part-B" components of the 2-part adhesive were first premixed (i.e., water, canola meal, PF, and urea), and were then combined with the "Part-A" component (PMDI) to yield the wet adhesive compositions as described in Table 1. These adhesives were then used to make particle board composites (compositions are given in Tables 2 and 3).

Particle board composites were made according to the following procedure. The appropriate aliquot of wet adhesive (Table 2) was slowly added by means of spraying the mixture into a 4-foot diameter rotary tumbler containing 12.315 kilograms of wood furnish particulate (western pine, wood moisture content=8.5% by weight) over a period of approximately 1 to 2 minutes using a pneumatic sprayer (The Professional Hopper Gun C.M.T.™ equipped with a 5/16 in. brass air nozzle using 38-40 psi of compressed air). The treated wood was allowed to tumble for approximately 5-10 minutes before being removed. Approximately 3,837 g of treated-wood furnish was added into a forming box to achieve a uniform distribution of the adhesive-coated wood particles (this was the weight needed to achieve a 2'×2' board with a target thickness of 5/8" and with a target density of ca. 45 pounds per cubic foot). The pre-form was inserted into a press (a 36"×36" hydraulic press), and the internal gas pressure and temperature were monitored using a Pressman™ monitoring system with platen set-temperatures=330° F. for a dwell time of approximately 3 minutes and 40 seconds (the platens were protected with silicone-coated release paper, and the total cycle time was approximately 4.5 to 5 minutes). The densities of the finished composites were measured, and multiple sample specimens were cut from the boards for the purpose of measuring physical properties (e.g., modulus of rupture (MOR) and modulus of elasticity (MOE)). Physical property data are provided in Table 4.

TABLE 1

WET ADHESIVE COMPOSITIONS*

| Sample No. | Materials Combined with Canola Meal and Ratios | Weight Percent of Components in Wet Adhesive Composition | | | | |
|---|---|---|---|---|---|---|
| | | Water | Canola Meal | Urea | PF Resin | PMDI |
| TP23-10 | (PMDI + PF)/Meal = 1.68/1; PF/PMDI = 1/5; pH neutral | 58.56 | 14.64 | 2.19 | 4.10 | 20.51 |
| TP23-2 | (PMDI + PF)/Meal = 1.68/1; PF/PMDI = 1/1; pH neutral | 64.71 | 17.20 | 1.74 | 8.17 | 8.17 |
| TP23-3 | (PMDI + PF)/Meal = 0.95/1; PF/PMDI = 0; pH neutral | 58.11 | 20.42 | 2.07 | 0.00 | 19.40 |
| TP23-4 | (PMDI + PF)/Meal = 1.4/1; PF/PMDI = 1/9; pH neutral | 59.61 | 15.84 | 2.37 | 2.22 | 19.96 |
| TP23-5 | (PMDI + PF)/Meal = 1.4/1; PF/PMDI = 1/4; pH neutral | 61.07 | 15.27 | 2.28 | 4.28 | 17.10 |

*Expressed as percent by weight after mixing Parts A + B.

TABLE 2

AMOUNT OF WET ADHESIVES FROM TABLE 1 ADDED TO 12.315 KILOGRAMS OF WOOD FURNISH FOR PREPARING PARTICLE BOARD COMPOSITES

| Sample No. | Materials Combined with Canola Meal and Ratios | Weight of Wood (kilograms) | Weight Wet Adhesive (grams) |
|---|---|---|---|
| TP23-10 | (PMDI + PF)/Meal = 1.68/1; PF/PMDI = 1/5; pH neutral | 12.315 | 929.01 |
| TP23-2 | (PMDI + PF)/Meal = 1.68/1; PF/PMDI = 1/1; pH neutral | 12.315 | 1,168.21 |
| TP23-3 | (PMDI + PF)/Meal = 0.95/1; PF/PMDI = 0; pH neutral | 12.315 | 984.18 |
| TP23-4 | (PMDI + PF)/Meal = 1.4/1; PF/PMDI = 1/9; pH neutral | 12.315 | 856.13 |
| TP23-5 | (PMDI + PF)/Meal = 1.4/1; PF/PMDI = 1/4; pH neutral | 12.315 | 888.43 |

TABLE 3

DRY/CURED PARTICLE BOARD COMPOSITIONS USING THE WET ADHESIVES DESCRIBED IN TABLE 1 (OVEN-DRY WEIGHT BASIS)

| Sample No. | Materials Combined with Canola Meal and Ratios | Weight Percent of Components in Dry/Cured Particle Board Composition | | | | | |
|---|---|---|---|---|---|---|---|
| | | Wood | Canola Meal | Urea | PF Resin | PMDI | Binder* |
| TP23-10 | (PMDI + PF)/Meal = 1.68/1; PF/PMDI = 1/5; pH neutral | 96.97 | 1.07 | 0.16 | 0.30 | 1.50 | 3.03 |
| TP23-2 | (PMDI + PF)/Meal = 1.68/1; PF/PMDI = 1/1; pH neutral | 96.76 | 1.58 | 0.16 | 0.75 | 0.75 | 3.24 |
| TP23-3 | (PMDI + PF)/Meal = 0.95/1; PF/PMDI = 0; pH neutral | 96.76 | 1.58 | 0.16 | 0.00 | 1.50 | 3.24 |
| TP23-4 | (PMDI + PF)/Meal = 1.4/1; PF/PMDI = 1/9; pH neutral | 97.27 | 1.07 | 0.16 | 0.15 | 1.35 | 2.73 |
| TP23-5 | (PMDI + PF)/Meal = 1.4/1; PF/PMDI = 1/4; pH neutral | 97.27 | 1.07 | 0.16 | 0.30 | 1.20 | 2.73 |

*Weight percent binder is the sum of the weight percent of canola meal, urea, PF resin, and PMDI

TABLE 4

PHYSICAL PROPERTIES OF COMPOSITES (AVERAGES AND STANDARD DEVIATIONS FROM MULTIPLE SPECIMENS SAMPLED FROM 2 TO 3 BOARDS PER SAMPLE-TYPE)

| Sample No. | Density (lbs. per cubic ft.) | Flex Modulus (psi) | Modulus of Rupture (psi) | Number of Samples | Number of Boards | Weight Percent Binder |
|---|---|---|---|---|---|---|
| TP23-10 | 44.3 ± 1.3 | 290,000 ± 30,000 | 1410 ± 220 | 12 | 3 | 3.03% |
| TP23-2 | 42.4 ± 1.5 | 215,000 ± 30,000 | 840 ± 130 | 8 | 2 | 3.24% |

TABLE 4-continued

PHYSICAL PROPERTIES OF COMPOSITES (AVERAGES AND
STANDARD DEVIATIONS FROM MULTIPLE SPECIMENS
SAMPLED FROM 2 TO 3 BOARDS PER SAMPLE-TYPE)

| Sample No. | Density (lbs. per cubic ft.) | Flex Modulus (psi) | Modulus of Rupture (psi) | Number of Samples | Number of Boards | Weight Percent Binder |
|---|---|---|---|---|---|---|
| TP23-3 | 44.7 ± 1 | 290,000 ± 19,000 | 1400 ± 100 | 12 | 3 | 3.24% |
| TP23-4 | 44.1 ± 1 | 273,000 ± 14,000 | 1300 ± 120 | 12 | 3 | 2.73% |
| TP23-5 | 46.6 ± 1.1 | 319,000 ± 25,000 | 1490 ± 120 | 8 | 2 | 2.73% |

Experimental results (e.g., the data in Table 4) demonstrate that the composite boards had good mechanical stability. A comparison of physical property data from Sample Nos. TP23-10, TP23-2, and TP23-3 indicates that PF can be included in the plant meal/PMDI based adhesives up to a certain amount without adversely affecting the strength of the composite. For example, the composite Sample No. TP23-3 (which did not contain PF) had a Modulus of Rupture of 1400±100 PSI and composite Sample No. TP23-10 (which contained PF) had a Modulus of Rupture of 1410+/−220 PSI, but the Modulus of Rupture was less for composite Sample No. TP23-2 (which contained more PF than Sample Nos. TP23-10 and TP23-3).

Another observation from the data in Table 4 is that the amount of adhesive required to form a wood composite may be reduced when using a plant meal/PMDI based adhesive that contains PF. For example, composite Sample No. TP23-5 had the highest Modulus of Rupture of the samples prepared, even though it contained only 2.73 percent by weight binder.

It is understood that adhesives of the type described in this example can be prepared in various ways. For instance, instead of pre-dispersing or dissolving the PF in the Part-B dispersion (i.e., instead of premixing the PF with canola meal, water, and urea), dry PF powder can be mixed with the wood furnish prior to the applying the rest of the mixed wet adhesive components to the wood.

It is contemplated that adhesives described in this example can be used to prepare other types of wood composites such as, for example, oriented strand board and medium-density fiberboard.

Incorporation by Reference

The entire disclosure of each of the patent and scientific documents referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

We claim:

1. An adhesive composition in the form of a liquid comprising:
    (a) lignin in an amount of from about 5% w/w to about 35% w/w of the adhesive composition, wherein the lignin has a weight average molecular weight of about 10,000 g/mol to about 70,000 g/mol;
    (b) a plant protein composition that is a ground plant meal, wherein the ground plant meal is derived from corn, wheat, sunflower, cotton, rapeseed, canola, castor, soy, camelina, flax, jatropha, mallow, peanuts, sugarcane bagasse, tobacco, or a combination thereof, and the plant protein composition is present in an amount of from about 15 w/w to about 35 w/w of the adhesive composition;
    (c) water in an amount of from about 30% w/w to about 65% w/w of the adhesive composition; and
    (d) an epoxide compound.

2. The composition of claim 1, further comprising a formaldehyde scavenging agent.

3. The composition of claim 1, wherein the ground plant meal is canola meal, rapeseed meal, or sunflower meal.

4. The composition of claim 1, wherein the ground plant meal is canola meal.

5. The composition of claim 1, wherein the epoxide compound is an epoxy-based prepolymer.

6. The composition of claim 5, wherein the plant protein composition is derived from sunflower, rapeseed, canola, castor, or a combination thereof.

7. The composition of claim 5, wherein the ground plant meal is canola meal, rapeseed meal, or sunflower meal.

8. The composition of claim 5, wherein the epoxy-based prepolymer is a reaction product between an epoxy and a polypeptide, a polyol, an amine based polyol, an amine containing compound, a hydroxy containing compound, or a combination thereof.

9. The composition of claim 5, wherein the epoxy-based prepolymer is an epoxy resin comprising free epoxy groups.

10. The composition of claim 5, wherein the epoxy-based prepolymer is a glycidyl ether epoxy resin derived from a polyphenol by reaction with epichlorohydrin.

11. A solid binder composition formed by curing a composition of claim 1.

12. An article comprising two or more components bonded together using the adhesive composition of claim 1.

13. The article of claim 12, wherein the ground plant meal is canola meal.

14. A method of bonding a first article to a second article comprising:
    (a) depositing on a surface of the first article the adhesive composition of claim 1 thereby to create a binding area; and
    (b) contacting the binding area with a surface of the second article thereby to bond the first article to the second article.

15. The method of claim 14, further comprising the step of, after step (b), permitting the adhesive composition to cure.

* * * * *